US007627196B2

(12) United States Patent
Suzuki et al.

(10) Patent No.: US 7,627,196 B2
(45) Date of Patent: Dec. 1, 2009

(54) IMAGE PROCESSING DEVICE AND IMAGE CAPTURING DEVICE

(75) Inventors: Hiroaki Suzuki, Nagoya (JP); Takeo Iwasaki, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 717 days.

(21) Appl. No.: 11/374,252

(22) Filed: Mar. 14, 2006

(65) Prior Publication Data

US 2006/0164526 A1 Jul. 27, 2006

Related U.S. Application Data

(63) Continuation-in-part of application No. PCT/JP2004/013516, filed on Sep. 16, 2004.

(30) Foreign Application Priority Data

Sep. 18, 2003 (JP) .............................. 2003-326614
Dec. 15, 2003 (JP) .............................. 2003-416343

(51) Int. Cl.
*G06K 9/36* (2006.01)
*G06K 9/00* (2006.01)

(52) U.S. Cl. ...................................... 382/286; 382/154

(58) Field of Classification Search ................. 382/100, 382/106, 114, 154, 199, 203, 255, 286, 309, 382/312, 291; 348/42, 135, 136, 211.9; 250/208.1; 356/601

See application file for complete search history.

(56) References Cited

U.S. PATENT DOCUMENTS 5,719,968 A    2/1998  Hashimoto et al.

| 6,449,004 | B1 | 9/2002 | Okisu et al. |
|---|---|---|---|
| 7,164,786 | B2* | 1/2007 | Katayama et al. ............ 382/154 |
| 7,365,301 | B2* | 4/2008 | Sasaki ....................... 250/208.1 |
| 7,502,125 | B2* | 3/2009 | Suzuki ......................... 356/604 |
| 2002/0090115 | A1* | 7/2002 | Abe et al. ..................... 382/106 |
| 2002/0149808 | A1 | 10/2002 | Pilu |
| 2005/0074144 | A1 | 4/2005 | Abe et al. |

FOREIGN PATENT DOCUMENTS

| JP | A 7-245700 | 9/1995 |
|---|---|---|
| JP | A 9-138869 | 5/1997 |
| JP | A 9-289610 | 11/1997 |
| JP | A 2002-165083 | 6/2002 |
| JP | A 2002-334327 | 11/2002 |
| JP | A 2003-8841 | 1/2003 |
| JP | A 2003-234890 | 8/2003 |

OTHER PUBLICATIONS

Etsuro, Endo, "Deformation of Image," *Adobe Photoshop AtoZ*, pp. 145-154, Feb. 15, 1993 (with Partial Translation).

* cited by examiner

*Primary Examiner*—Yon Couso
(74) *Attorney, Agent, or Firm*—Oliff & Berridge, PLC

(57) ABSTRACT

An image processing device comprises: plane conversion means which receives a subject image in which a subject having a particular shape has been captured and shape information about three-dimensional shape of the subject from the outside and converts the subject image into a plane image in which the subject is viewed from a prescribed direction based on the shape information; and in-plane position detection means which recognizes a subject area in the plane image as an area representing the subject and determines a position of the subject in the plane image.

23 Claims, 35 Drawing Sheets

| idx | ccdx | ccdy |
|---|---|---|
| 0 | 0 | 1186.2 |
| 1 | 20 | 1186.5 |
| 2 | 40 | 1186.6 |
| ... | ... | ... |
| N−1 | 1180 | 1192.3 |

(a)

| idx | X VALUE | Y VALUE | Z VALUE |
|---|---|---|---|
| 0 | −134.95 | −66.32 | −1.87 |
| 1 | −132.04 | −66.63 | −1.79 |
| 2 | −127.18 | −65.66 | −1.66 |
| ... | ... | ... | ... |
| N−1 | 129.02 | 66.79 | 5.46 |

(b)

(a) POINTS CONVERTED FROM FOUR CORNERS OF SLIT-BEAMLESS IMAGE

POINTS CONVERTED FROM FOUR CORNERS OF SLIT-BEAMLESS IMAGE (b)

| idx | ccdx | ccdy |
|---|---|---|
| 0 | 0 | 1186.2 |
| 1 | 20 | 1186.5 |
| 2 | 40 | 1186.6 |
| ... | ... | ... |
| N − 1 | 1180 | 1192.3 |

433a (a)

| idx | X VALUE | Y VALUE | Z VALUE |
|---|---|---|---|
| 0 | − 134.95 | − 66.32 | − 1.87 |
| 1 | − 132.04 | − 66.63 | − 1.79 |
| 2 | − 127.18 | − 65.66 | − 1.66 |
| ... | ... | ... | ... |
| N − 1 | 129.02 | 66.79 | 5.46 |

434a (b)

POINTS CONVERTED FROM CORNERS OF SLIT-BEAMLESS IMAGE (a)

POINTS CONVERTED FROM CORNERS OF SLIT-BEAMLESS IMAGE (b)

(c)

(a)

(b)

(c)

(d)

IMAGE PROCESSING DEVICE AND IMAGE CAPTURING DEVICE

This is a Continuation-in-Part of Application No. PCT/JP2004/013516 filed Sep. 16, 2004, which claims the benefit of Japanese Patent Applications No. 2003-326614 filed Sep. 18, 2003 and No. 2003-416343 filed Dec. 15, 2003. The entire disclosure of the prior applications is hereby incorporated by reference herein in its entirety.

TECHNICAL FIELD

The present invention relates to an image processing device which converts an inputted image into an image in which a subject captured in the inputted image is viewed from a different viewpoint, and an image capturing device employing the image processing device.

BACKGROUND OF THE INVENTION

In order to record the contents of a document with ease, without using a device like a scanner, portable image capturing devices like digital cameras are sometimes used for capturing and recording an image of such a document. When a document is shot for such a purpose, it is ideal that the document be shot right from the front so that characters on the document will not be captured to be obscure or unreadable. However, there are cases where a person shooting a document can not stand up (during a meeting, etc.) and has to shoot the document on a desk from an oblique direction.

Japanese Patent Provisional Publication No. 2002-334327 (hereinafter referred to as a "document No. 1") describes an image processing device which converts an inputted image (in which the subject (e.g. a document) has been captured from an oblique direction and characters which are blurry or slanted are hard to read) into an image in which the subject captured in the inputted image is viewed from a different viewpoint allowing easy reading of the characters.

The image processing device described in the document No. 1 analyzes the image in which the document has been captured, recognizes line bundles (arrangement of characters, edges of the document, etc.), and judges the rotation angle of the document image in the whole image based on the line bundles. Further, the image processing device converts the image of the document into an output image in which the document has been rotated to a direction in which character strings in the document are arranged horizontally (such a direction will hereinafter be referred to as an "erect direction") and the document is viewed from the front.

DISCLOSURE OF THE INVENTION

However, the conventional image processing device described above executes the following complicated process as image analysis necessary for the conversion into the image in which the captured document rotated to the erect direction is viewed from the front.

(1) Recognize lines in the captured image.
(2) Find a horizontal line bundle (regarded as horizontal character strings in the document) from the recognized lines.
(3) Rotate the captured image so that all the horizontal line bundle will be in parallel with the horizontal direction in the image.
(4) Find a vertical line bundle made by left-end points of character strings, etc. in the rotated image.
(5) Make vertical conversion of the rotated image based on the lean of the vertical line bundle and the focal length of the camera.

As above, the conventional image processing device needs to recognize the direction of a dominant line bundle made by character strings, etc. in the captured image and thereby convert the image. In this case, the image processing takes a long time with a heavy workload of image analysis for the line bundle recognition, etc., and thus the image processing device is required high processing power.

Further, in the conventional image processing device, the accuracy of the line bundle recognition from the image and the accuracy of the image direction by the image conversion are necessitated to deteriorate for images in which the document is unclear and character strings are hard to recognize, images in which the contrast between the document and the background is low and the outer edge of the document is vague, etc.

The present invention has been made in consideration of the above problems. It is therefore the primary object of the present invention to provide an image processing device and an image capturing device capable of making the conversion from an inputted image into an image in which a subject captured in the inputted image is viewed from a different viewpoint, with still higher accuracy.

In order to achieve the above object, an aspect of the present invention provides an image processing device comprising: plane conversion means which receives a subject image in which a subject having a particular shape has been captured and shape information about three-dimensional shape of the subject and converts the subject image into a plane image in which the subject is viewed from a prescribed direction based on the shape information; and in-plane position detection means which recognizes a subject area in the plane image as an area representing the subject and determines a position of the subject in the plane image.

With the above configuration, the in-plane position of the subject is determined based on the plane image which is obtained by use of the three-dimensional shape of the subject. Therefore, the in-plane position of the subject can be determined more precisely compared to cases where the rotation angle of the document is determined by detecting a line bundle from the image (e.g. the conventional image processing device). Consequently, in cases where the image of the subject is corrected based on the in-plane position of the subject determined by the in-plane position detection means, for example, the image correction can be performed with high accuracy.

In order to achieve the above object, another aspect of the present invention provides an image processing device comprising: plane conversion means which receives a subject image in which a subject having a particular shape has been captured and shape information about three-dimensional shape of the subject and converts the subject image into a plane image in which the subject is viewed from a prescribed direction based on the shape information; and in-plane angle detection means which recognizes a subject area in the plane image as an area representing the subject and determines an angle between a prescribed side of the subject area and a prescribed direction in the plane image.

With the above configuration, the in-plane angle of the subject is determined based on the plane image which is obtained by use of the three-dimensional shape of the subject. Therefore, the in-plane angle of the subject can be determined more precisely compared to cases where the rotation angle of the document is determined by detecting a line bundle from the image (e.g. the conventional image processing device).

Consequently, in cases where the image of the subject is corrected based on the in-plane angle of the subject determined by the in-plane angle detection means, for example, the image correction can be performed with high accuracy.

In order to achieve the above object, another aspect of the present invention provides an image capturing device comprising: projection means which projects pattern light; image capturing means which obtains a captured image of a subject by shooting the subject; three-dimensional shape calculation means which figures out shape information about three-dimensional shape of the subject based on an image obtained by letting the image capturing means shoot the subject on which the pattern light is projected; and plane conversion means which converts the captured image of the subject into a plane image in which the subject is viewed from a prescribed direction based on the shape information figured out by the three-dimensional shape calculation means. The image capturing device further comprises display means which displays the plane image converted by the plane conversion means; input means for inputting a display status modification parameter for modifying display status of the plane image displayed on the display means; and first modification means which modifies the display status of the plane image displayed on the display means based on the display status modification parameter inputted through the input means.

With the above configuration, the display status of the plane image displayed on the display means is modified based on the display status modification parameter which is inputted by the user through the input means. Therefore, the plane image displayed on the display means can be edited according to the user's intention. Further, even when the captured image is not successfully converted into an expected plane image for some reason, the unexpected plane image can be corrected according to the user's intention.

BRIEF DESCRIPTION OF THE ACCOMPANYING DRAWINGS

FIG. 6(a) shows data stored in a difference image storage unit.

FIG. 6(b) shows data stored in a triangulation calculation result storage unit.

Figure 7:
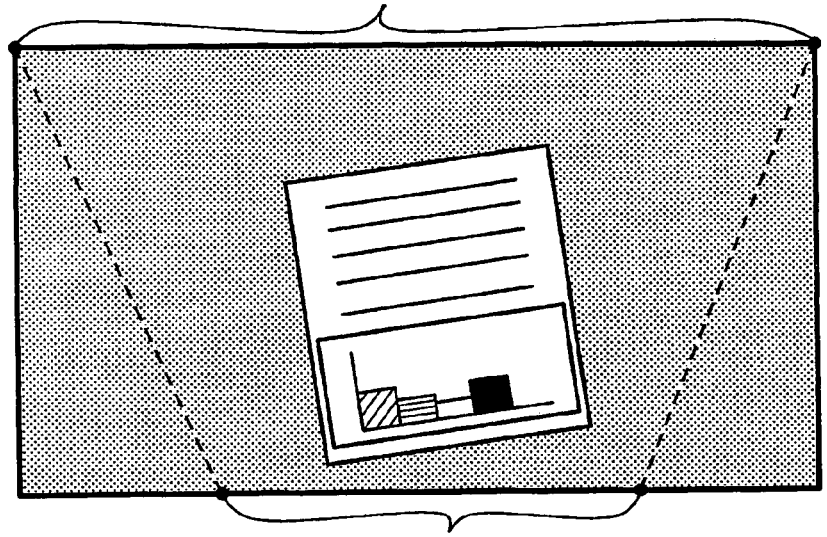
Figure 7:
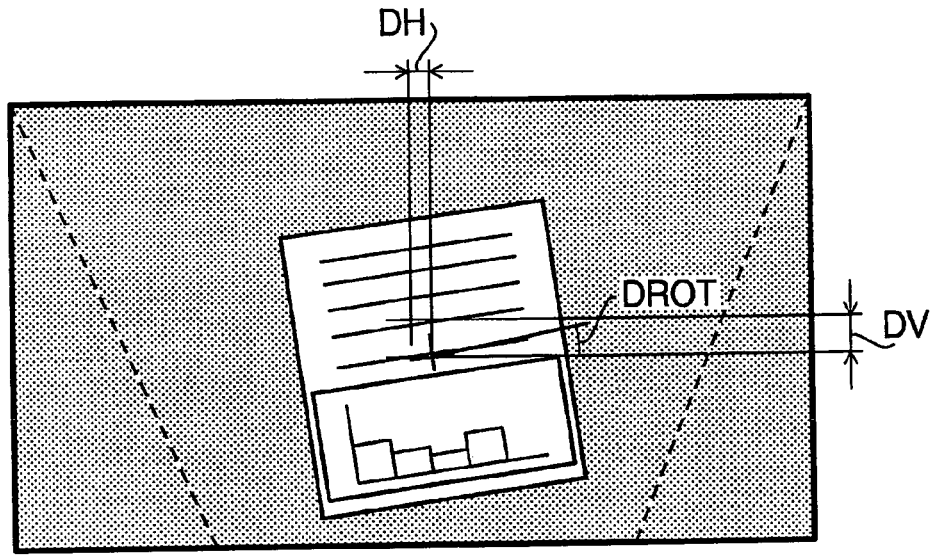
Figure 7:
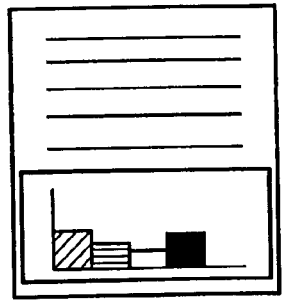

FIGS. 7(a), 7(b) and 7(c) are schematic diagrams for explaining image data being processed by the image capturing device.

FIGS. 8(a) and 8(b) are schematic diagrams for explaining a method for calculating a three-dimensional spatial position.

Figure 9:
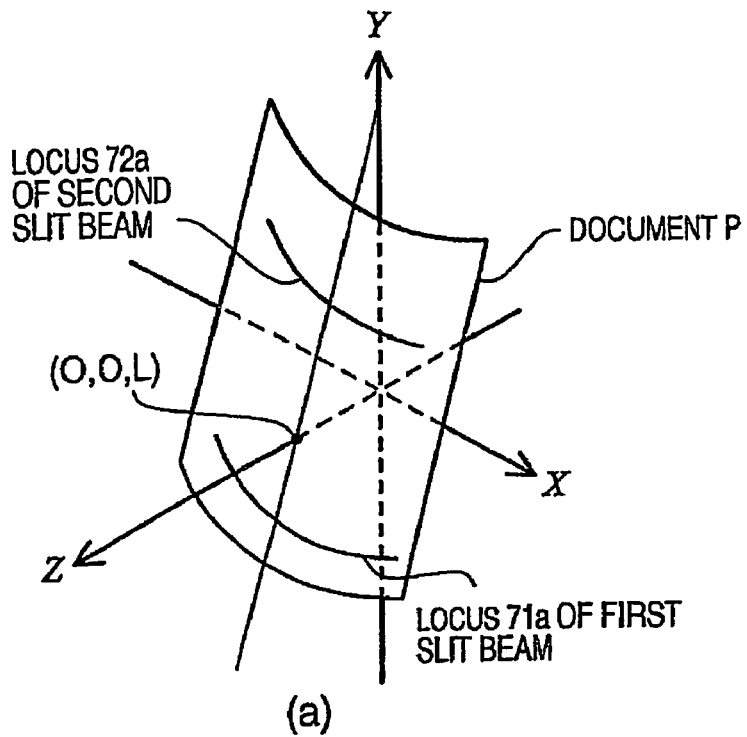
Figure 9:
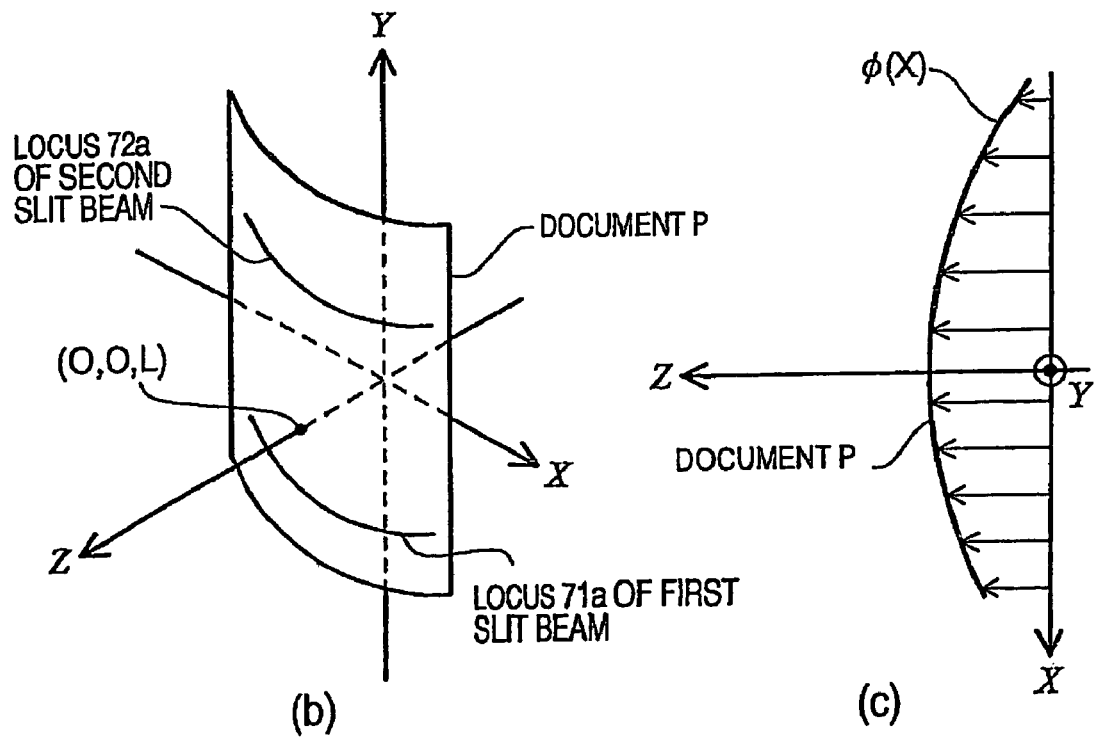

FIGS. 9(a), 9(b) and 9(c) are schematic diagrams for explaining a coordinate system used in a document attitude calculation process.

Figure 10:
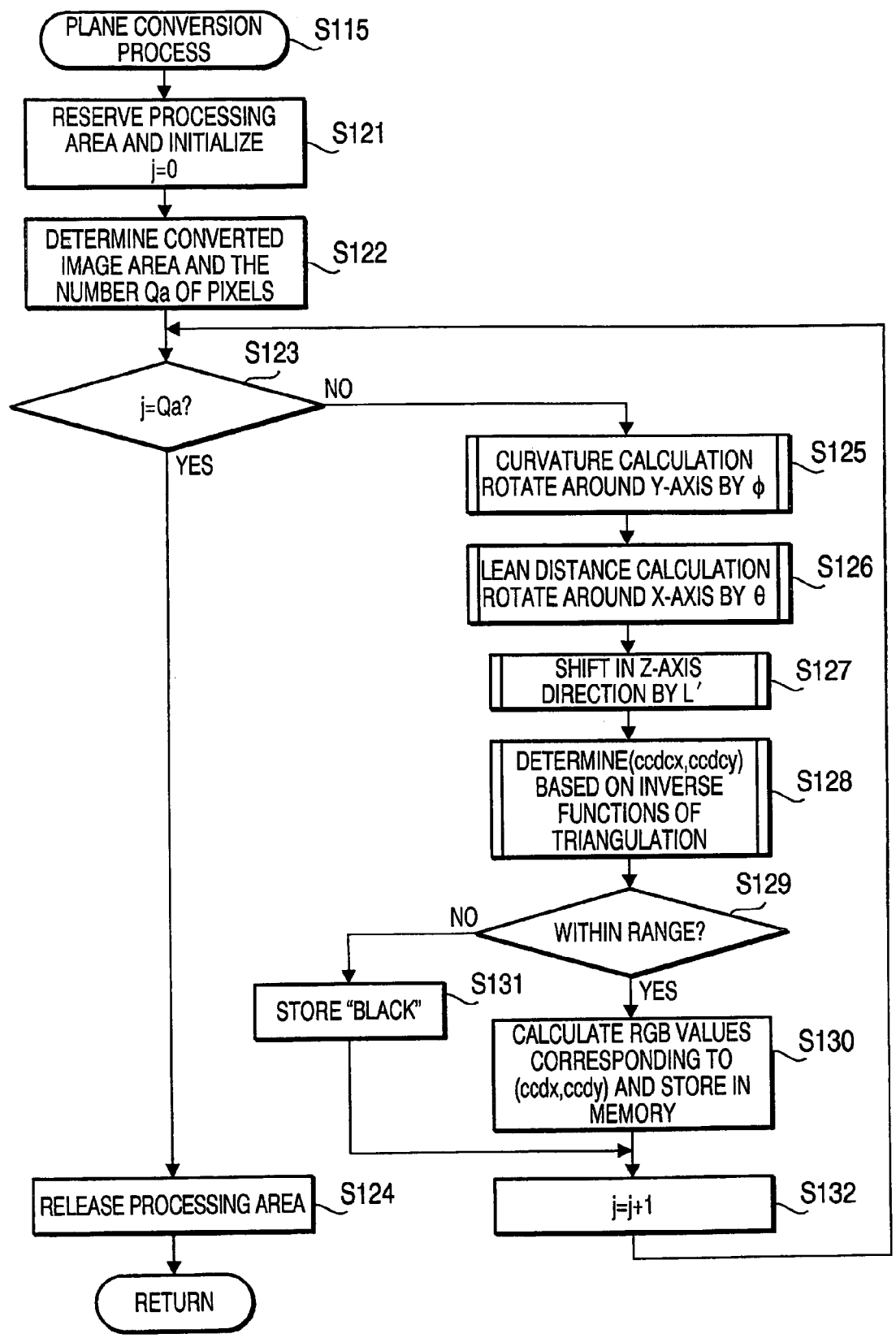

FIG. 10 is a flow chart showing the procedure of a plane conversion process.

Figure 11:
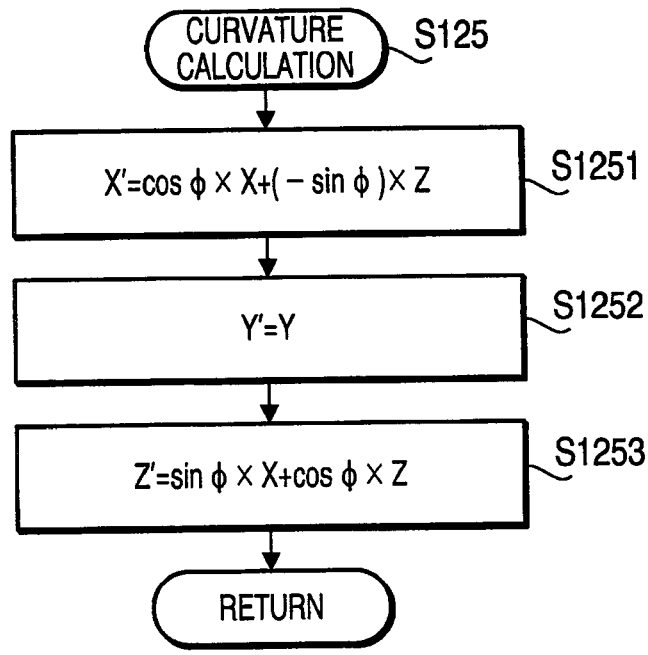
Figure 11:
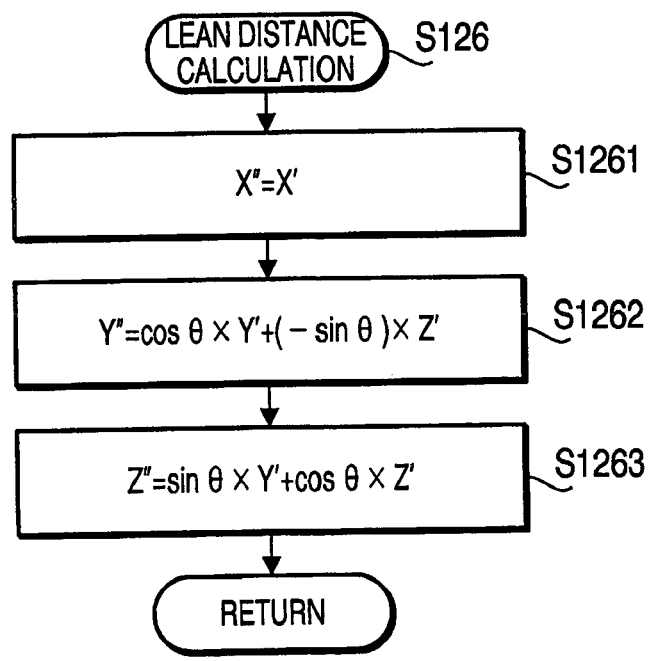

FIG. 11(a) is a flow chart showing curvature calculation.

FIG. 11(b) is a flow chart showing the procedure of lean distance calculation.

Figure 12:
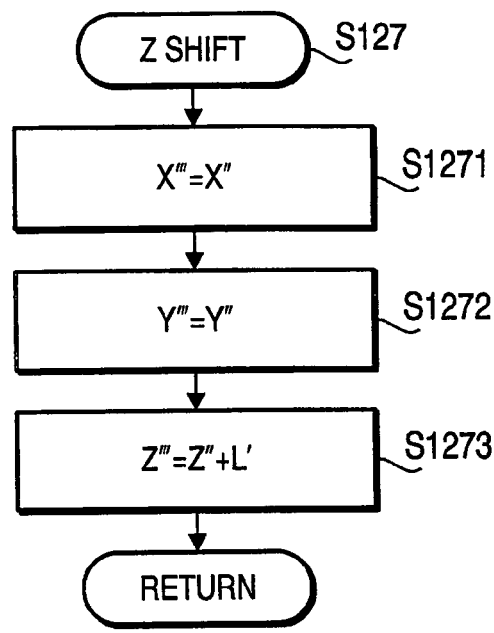
Figure 12:
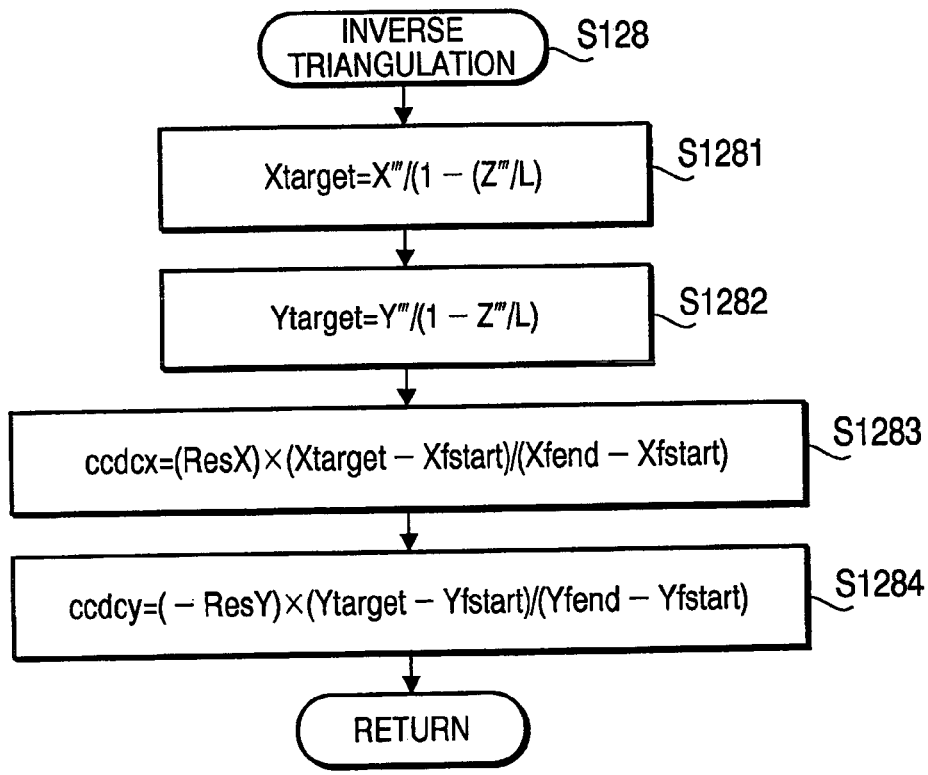

FIG. 12(a) is a flow chart showing the procedure of Z shift.

FIG. 12(b) is a flow chart showing the procedure of inverse triangulation.

Figure 13:
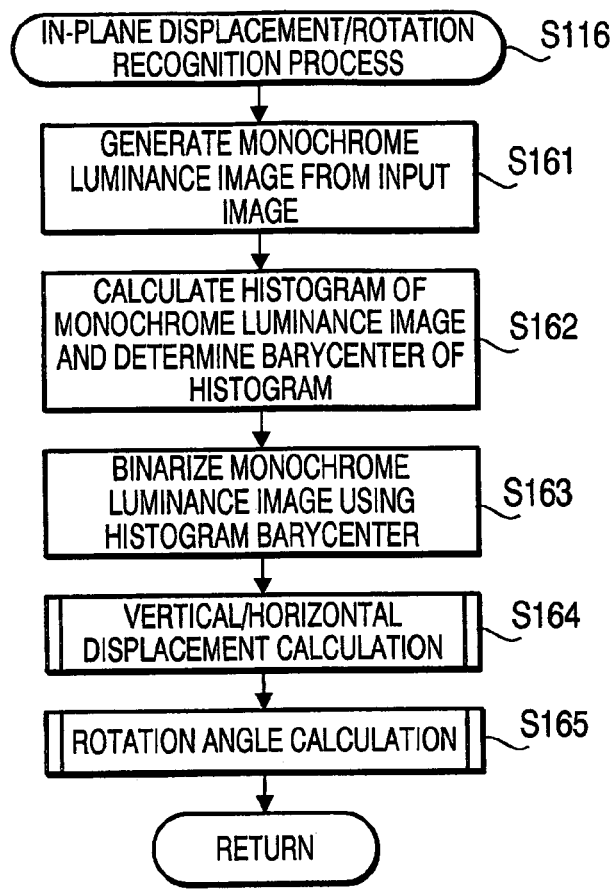

FIG. 13 is a flow chart showing the procedure of an in-plane displacement/rotation recognition process.

Figure 14:
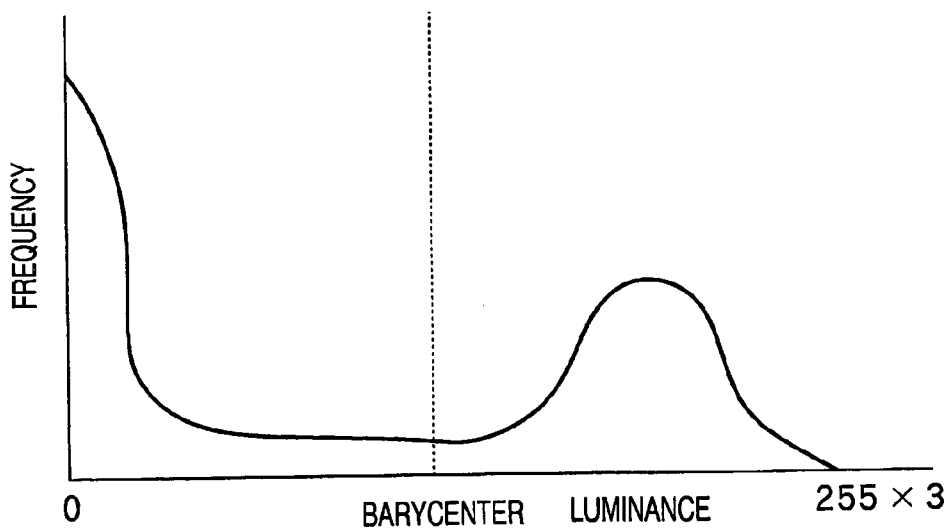

FIG. 14 is a graph showing a histogram of a plain luminance image.

Figure 15:
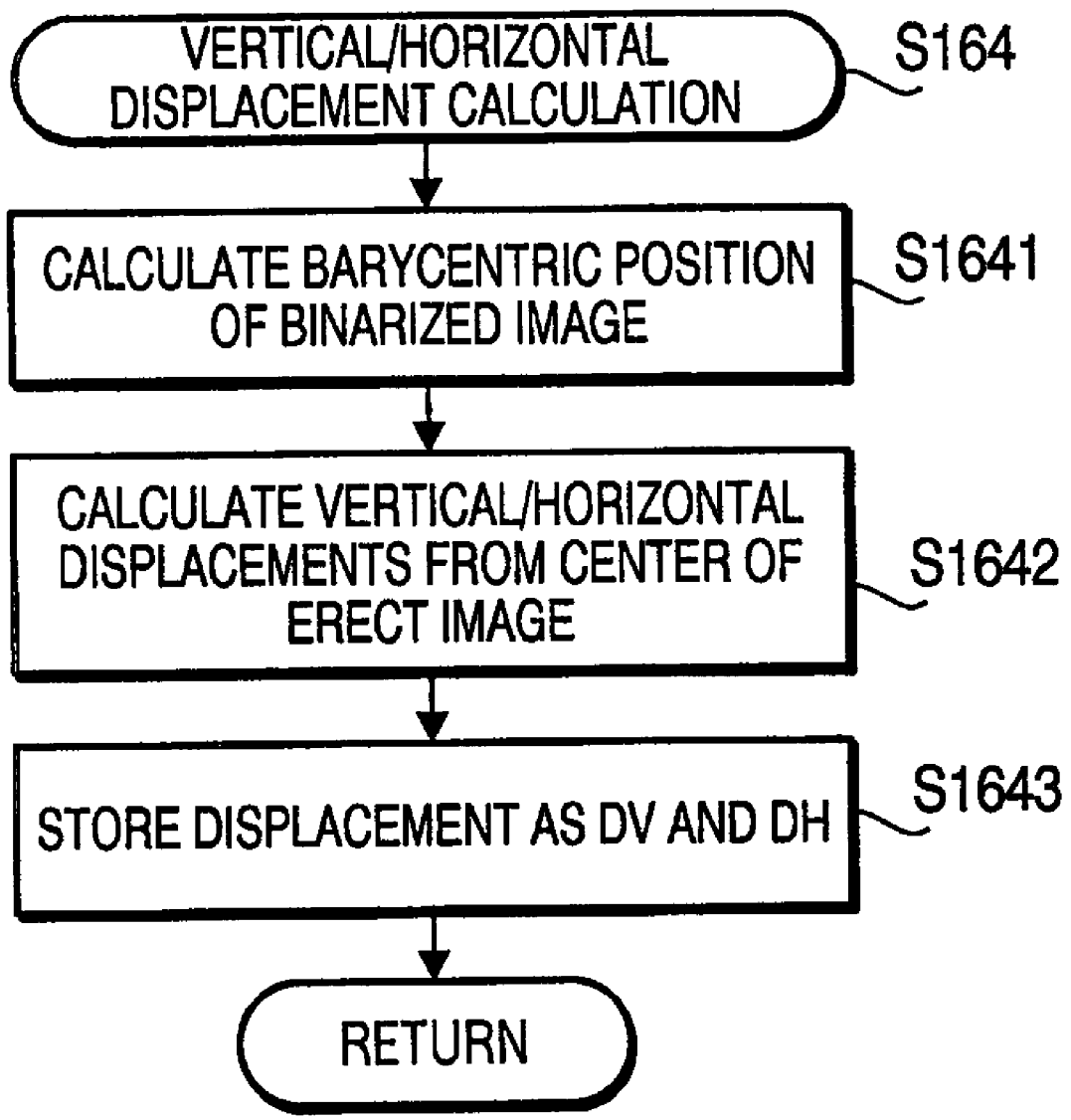

FIG. 15 is a flow chart showing the procedure of vertical/horizontal displacement calculation.

Figure 16:
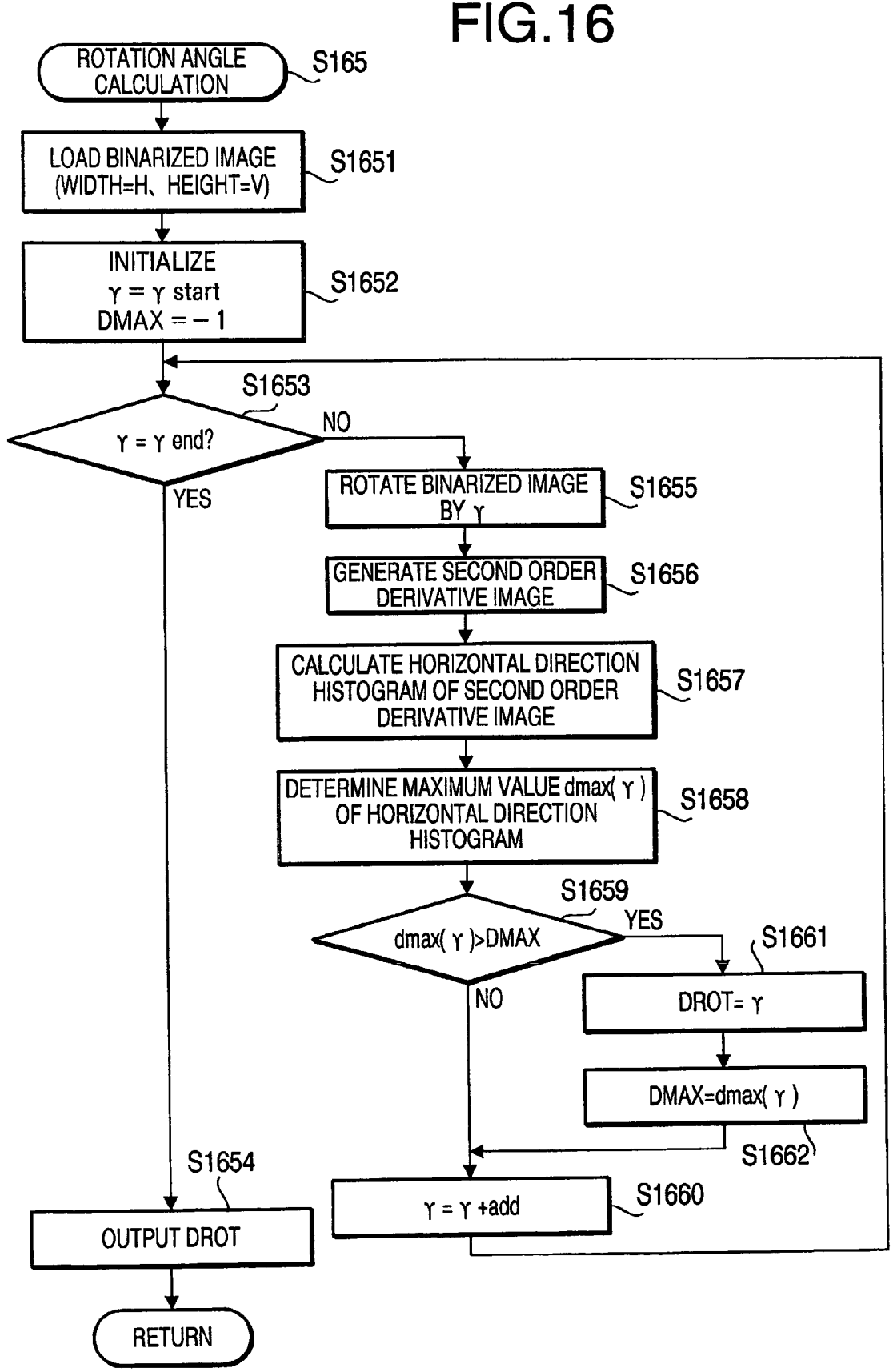

FIG. 16 is a flow chart showing the procedure of rotation angle calculation.

Figure 17:
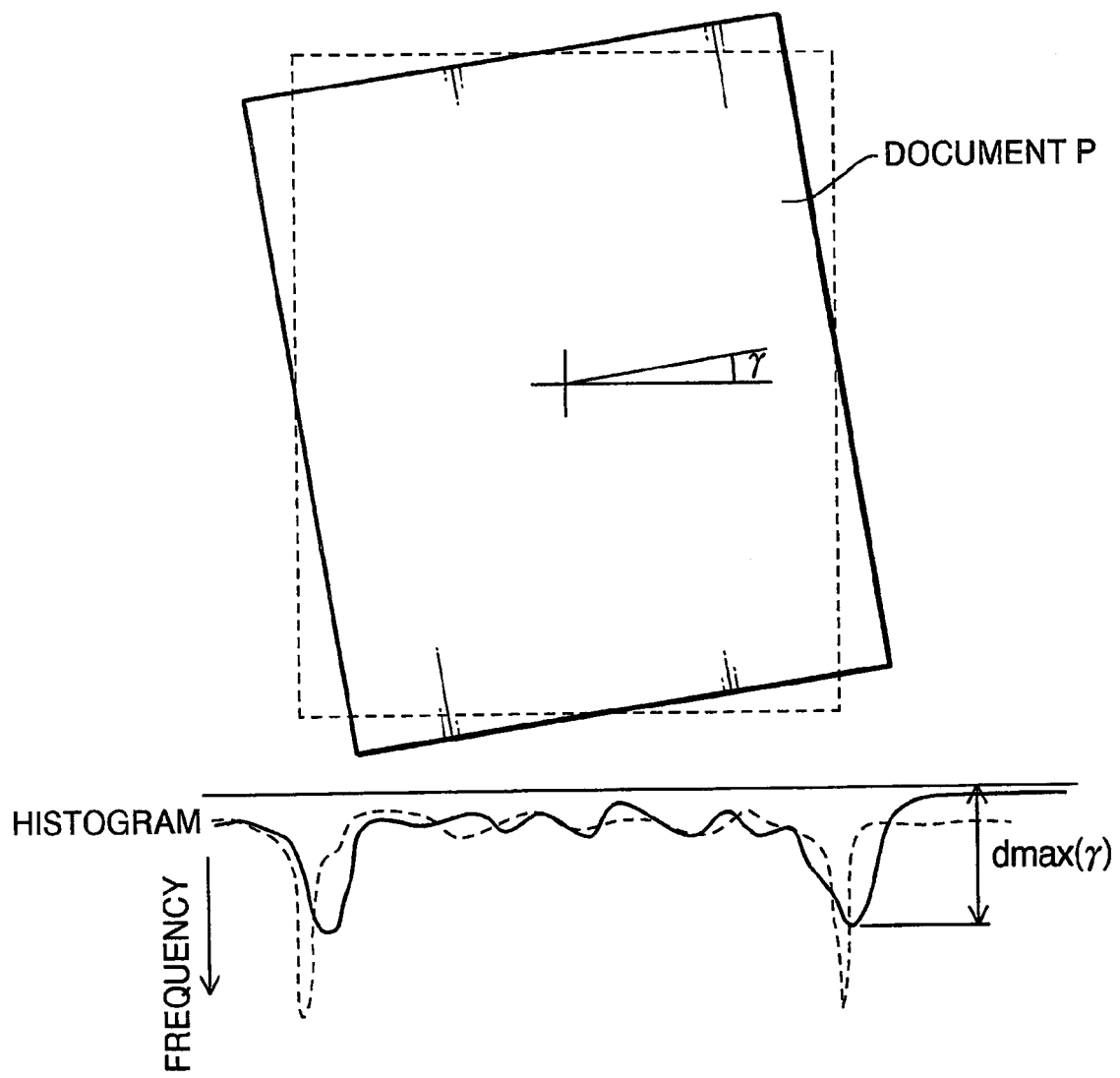

FIG. 17 is a schematic diagram showing a histogram of a second order derivative image regarding an image in which a document has been captured.

Figure 18:
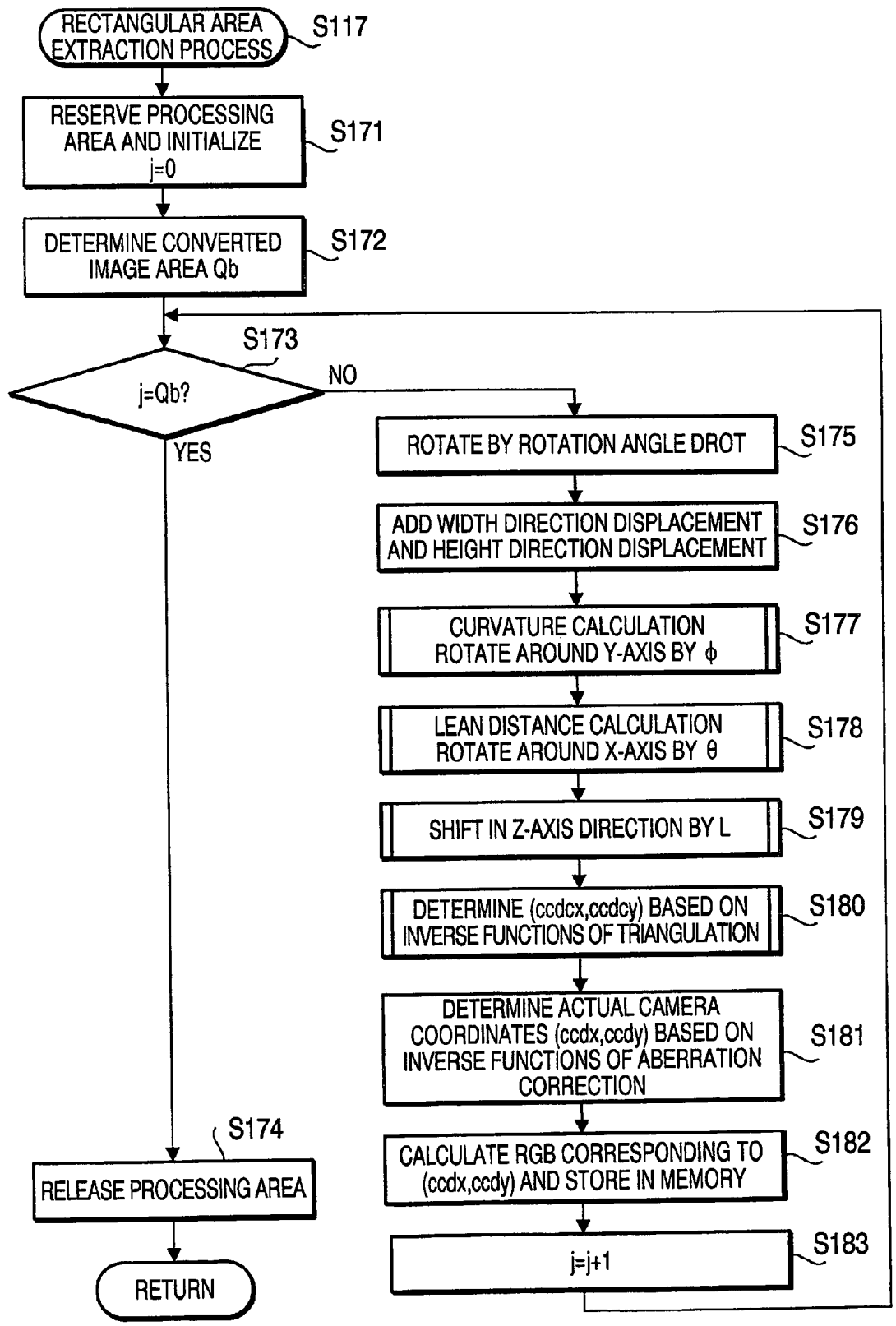

FIG. 18 is a flow chart showing the procedure of a rectangular area extraction process.

Figure 19:
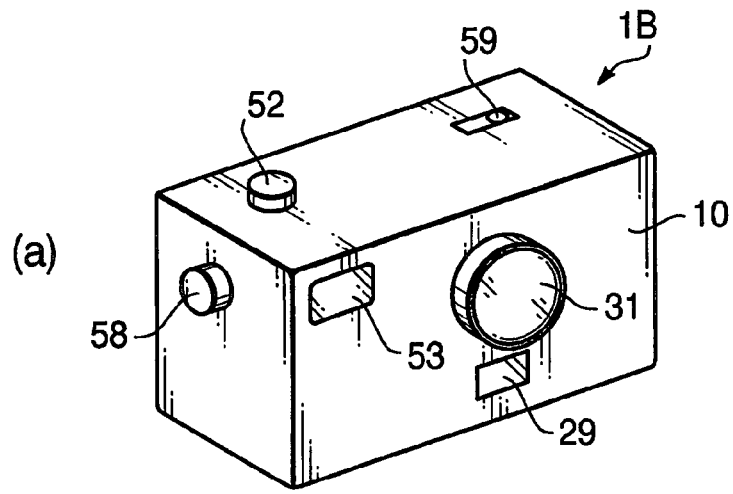
Figure 19:
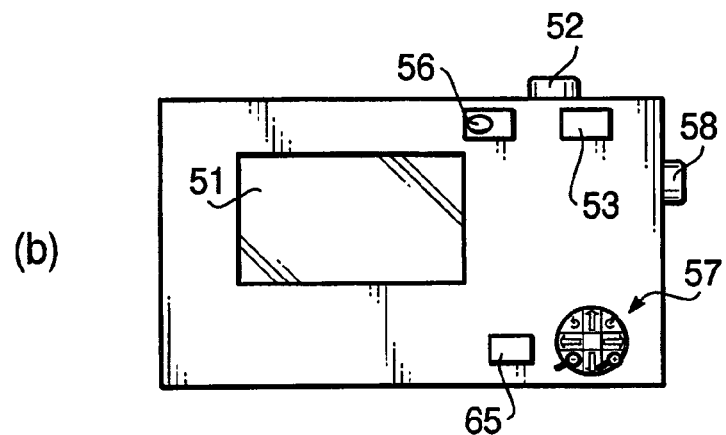
Figure 19:
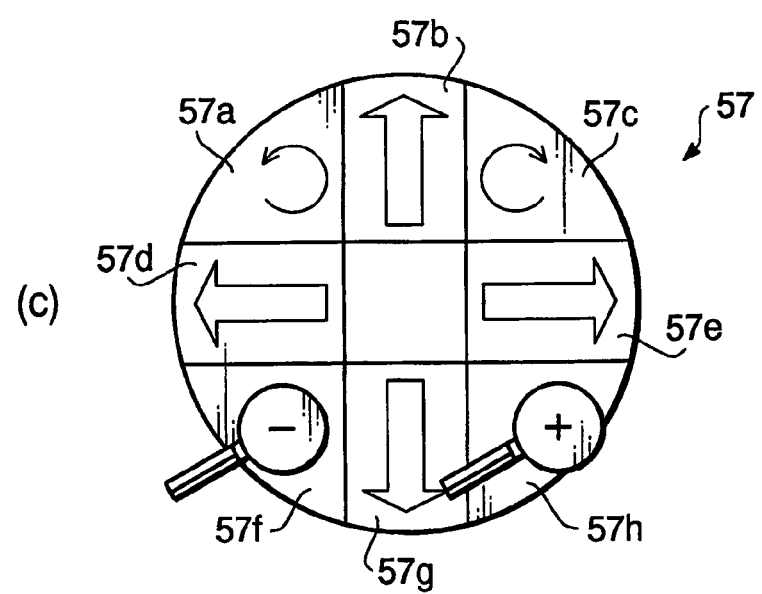

FIG. 19(a) is a perspective view of an image capturing device in accordance with a second embodiment.

FIG. 19(b) is a rear view of the image capturing device of the second embodiment.

FIG. 19(c) is an enlarged view of an operation button of the image capturing device of the second embodiment.

Figure 20:
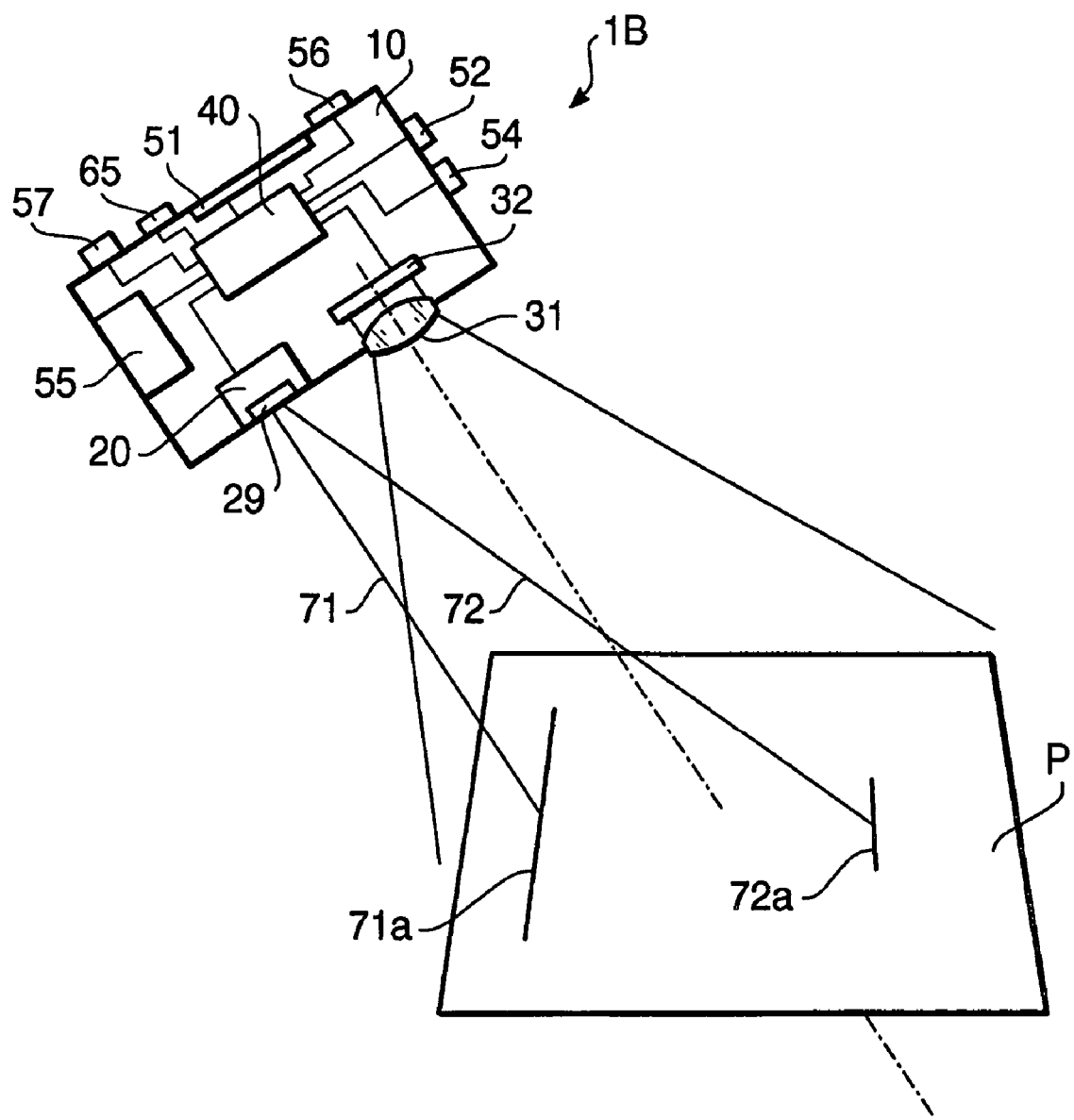

FIG. 20 is a schematic sectional view of the image capturing device of the second embodiment.

Figure 21:
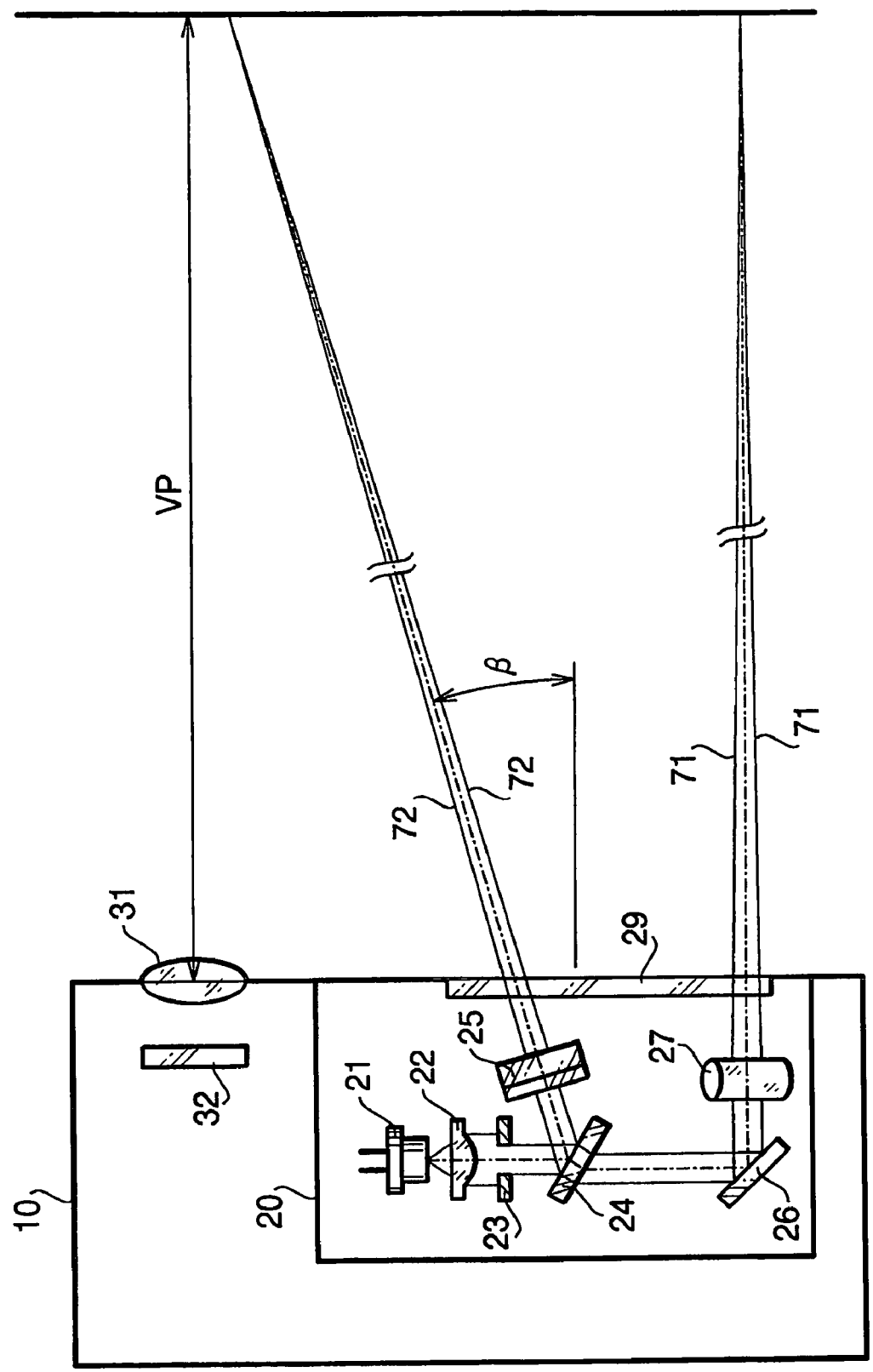

FIG. 21 is a cross-sectional view showing the composition of a slit beam projection unit of the image capturing device of the second embodiment.

FIGS. 22(a) and 22(b) are schematic diagrams for explaining angular width of slit beams.

Figure 23:
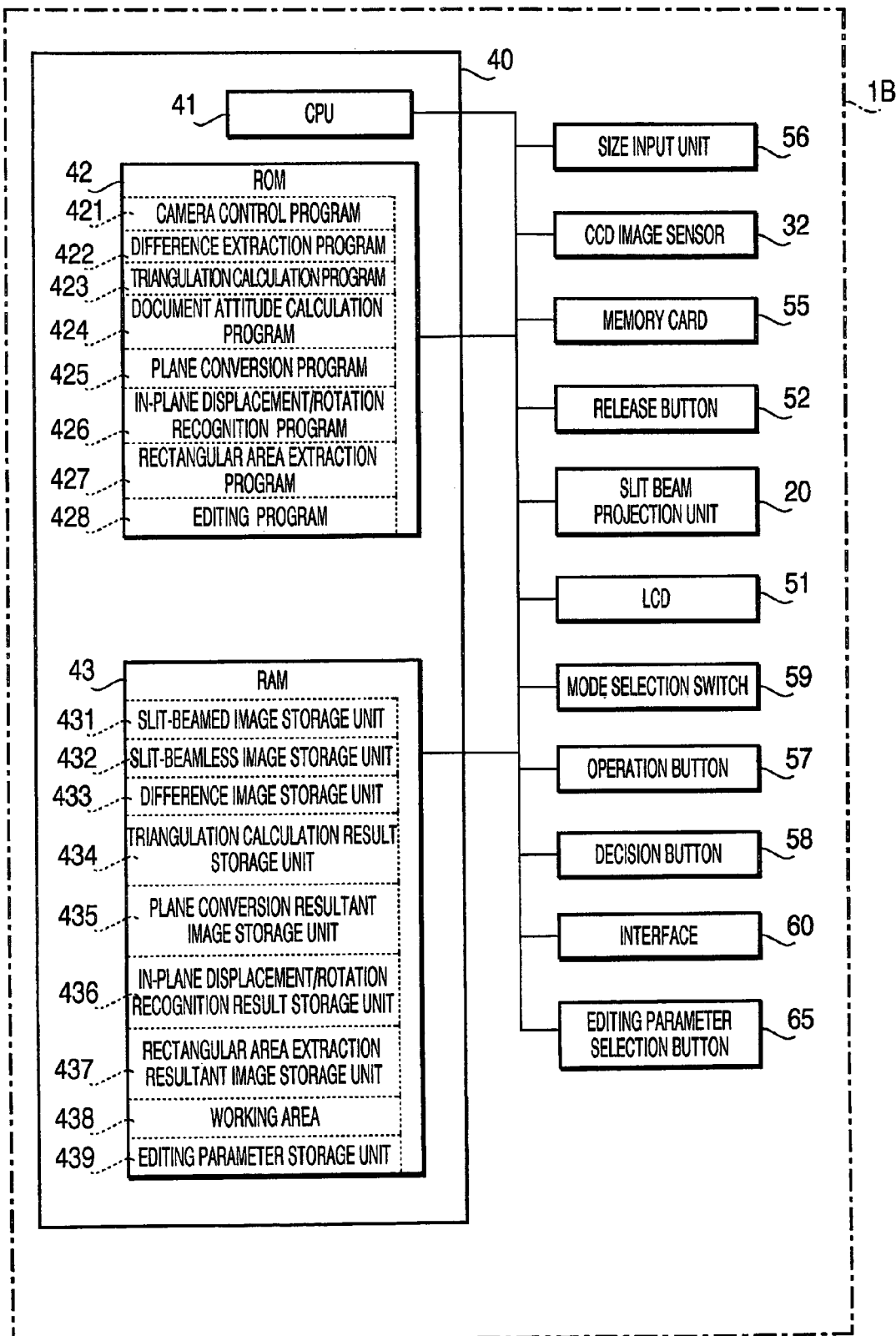

FIG. 23 is a block diagram showing the electric configuration of the image capturing device of the second embodiment.

Figure 24:
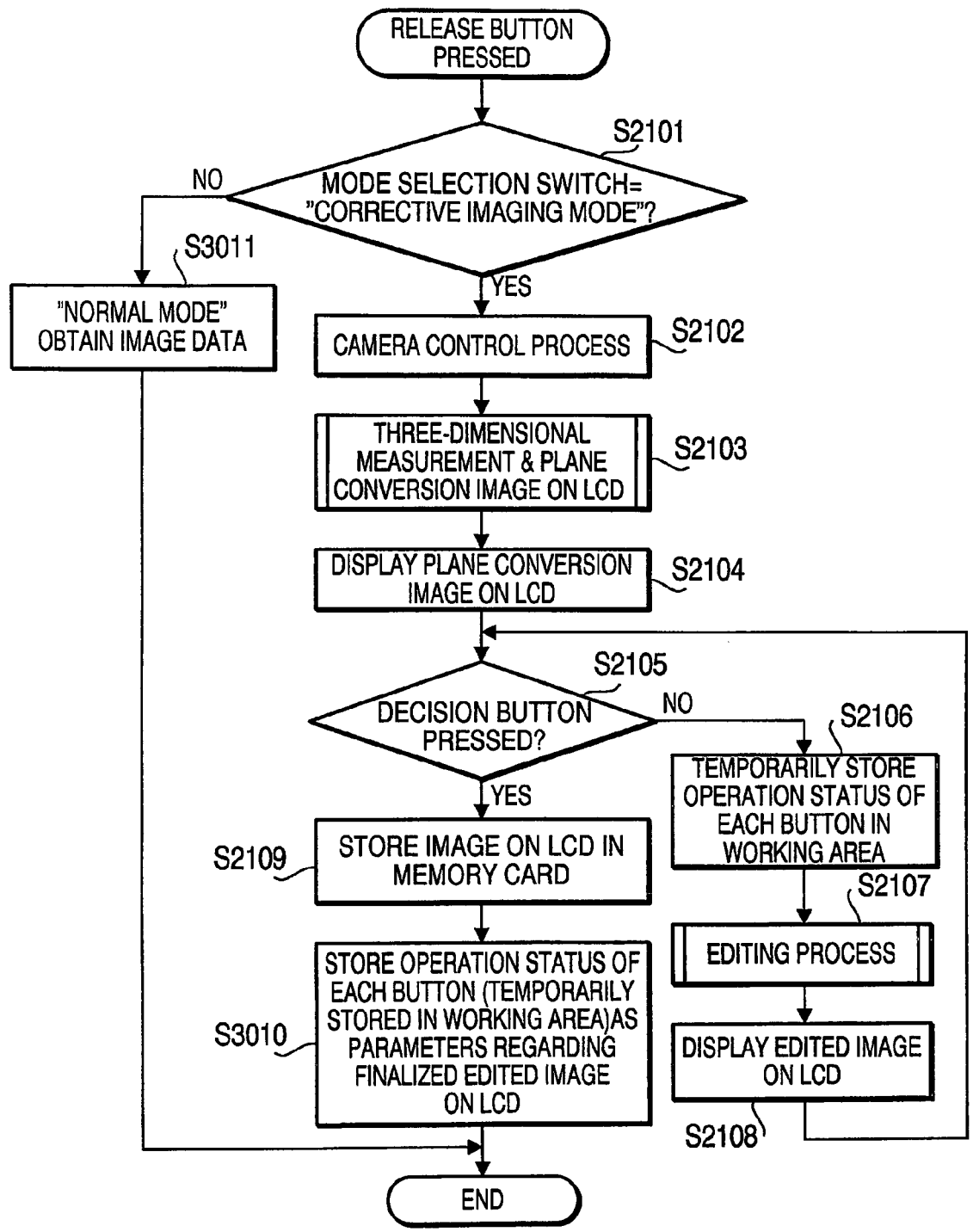

FIG. 24 is a flow chart showing the operation of the image capturing device of the second embodiment after a release button is pressed.

FIGS. 25(a) and 25(b) are schematic diagrams showing slit-beamed images.

Figure 26:
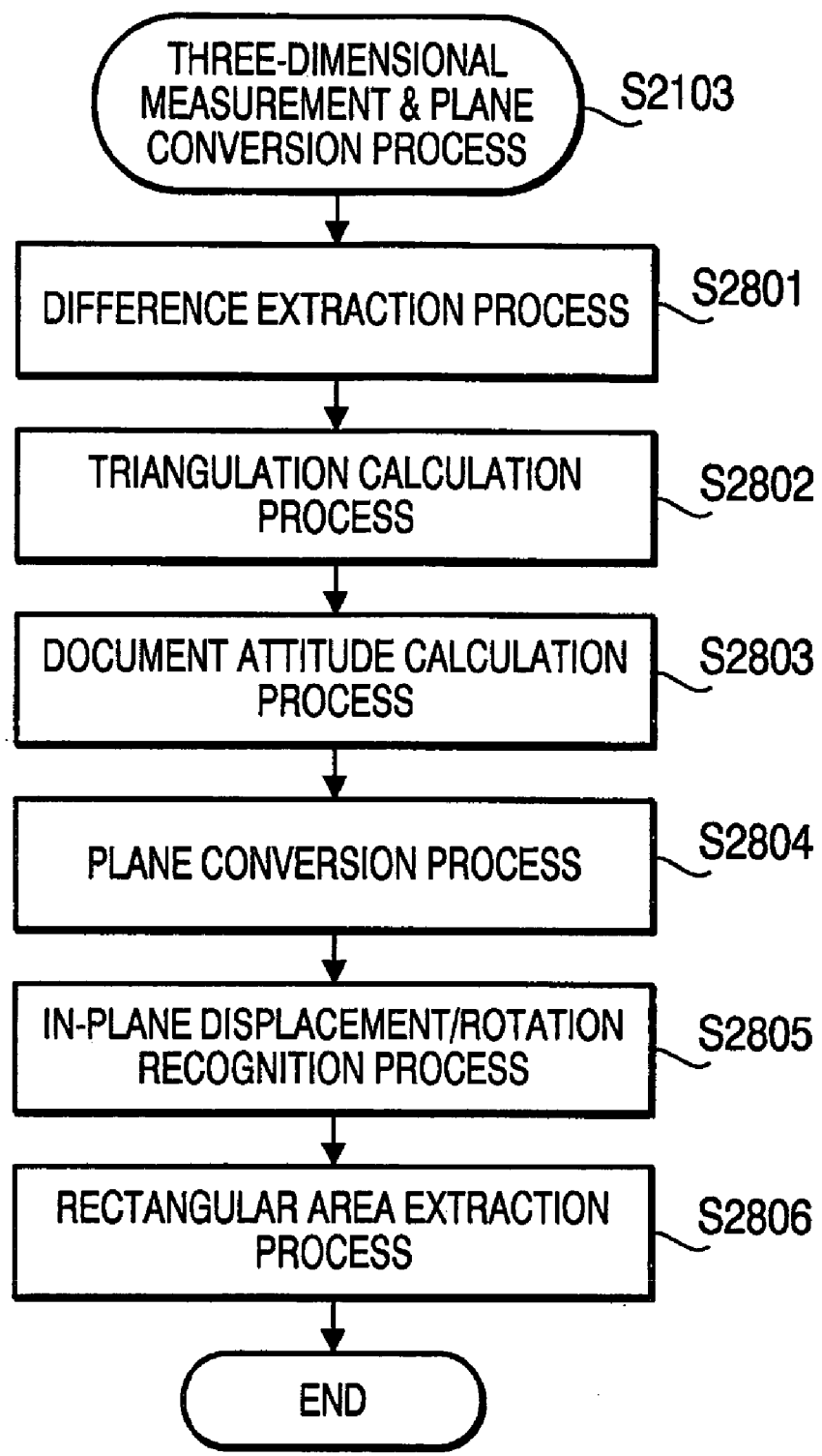

FIG. 26 is a flow chart showing three-dimensional measurement and a plane conversion process executed by the image capturing device of the second embodiment.

FIG. 27(a) is a table showing data stored in a difference image storage unit.

FIG. 27(b) is a table showing data stored in a triangulation calculation result storage unit.

FIGS. 28(a), 28(b) and 28(c) are schematic diagrams for explaining image data being processed by the image capturing device of the second embodiment.

Figure 29:
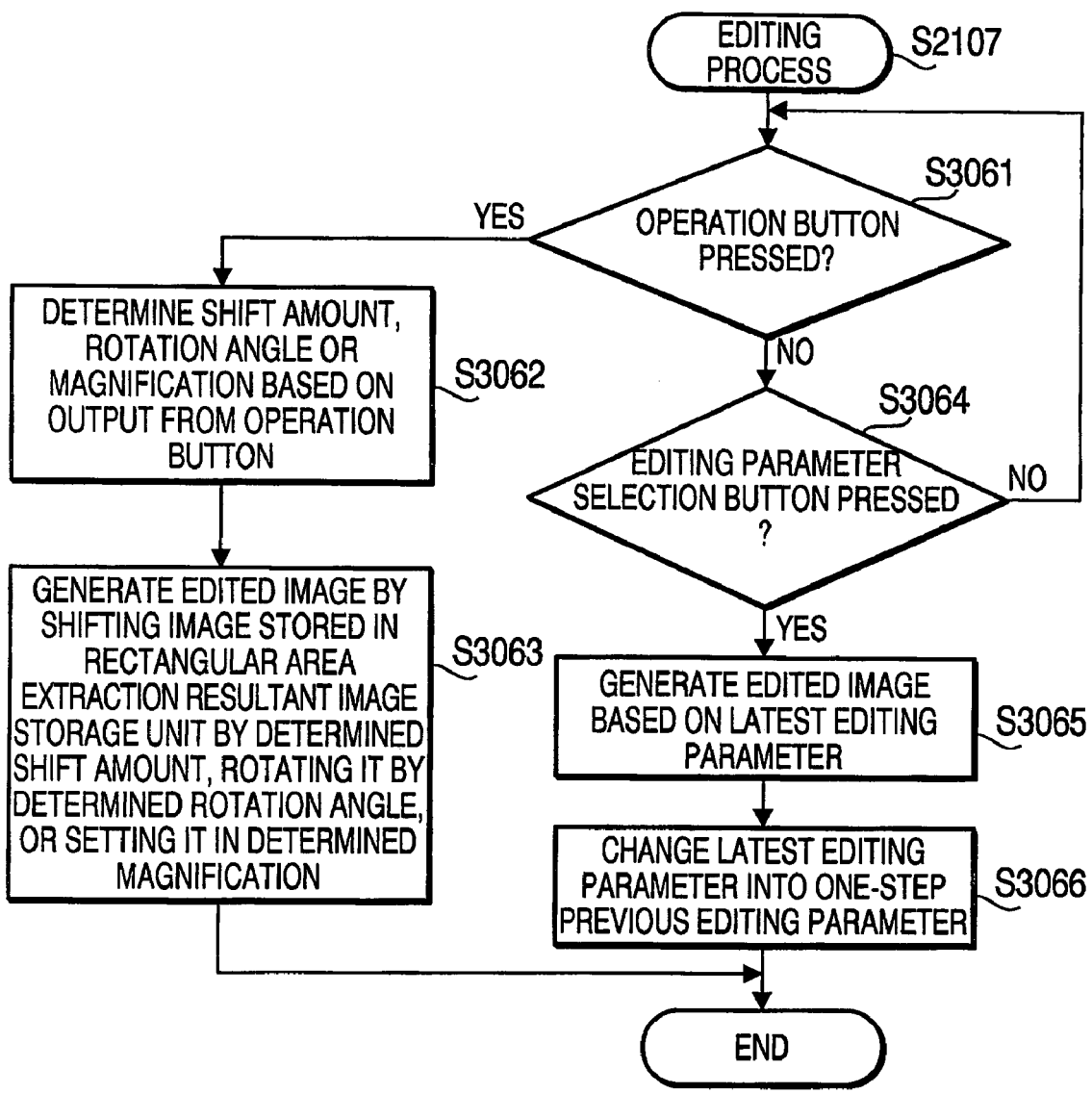

FIG. 29 is a flow chart showing an editing process executed by the image capturing device of the second embodiment.

FIGS. 30(a)-30(h) are schematic diagrams for explaining how to operate an operation button.

FIGS. 31(a)-31(d) are schematic diagrams for explaining how to operate the operation button, in which status of images edited by operating the operation button is shown.

Figure 32:
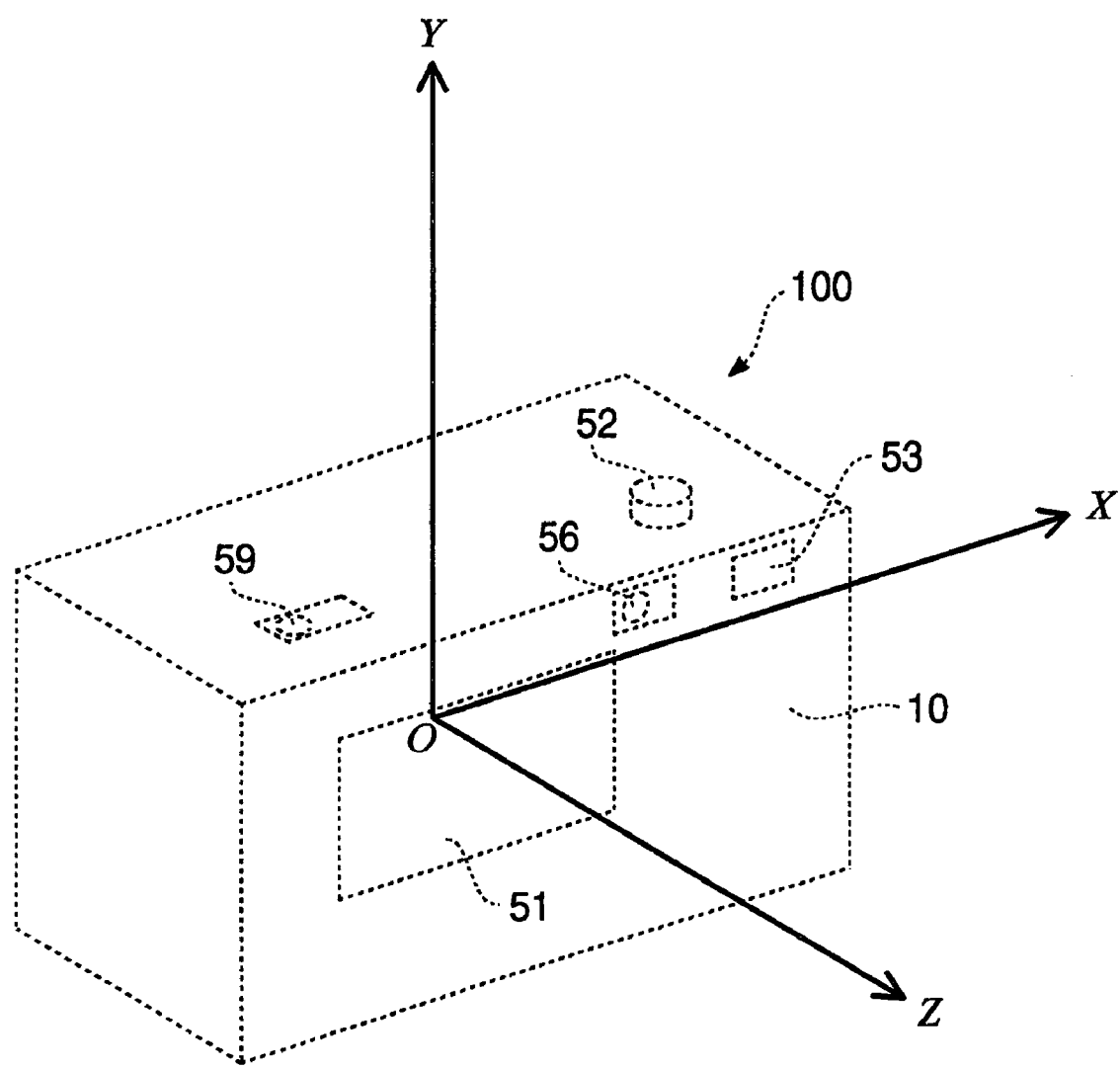

FIG. 32 is a schematic diagram showing three-dimensional coordinates defined for the image capturing device in accordance with a third embodiment.

Figure 33:
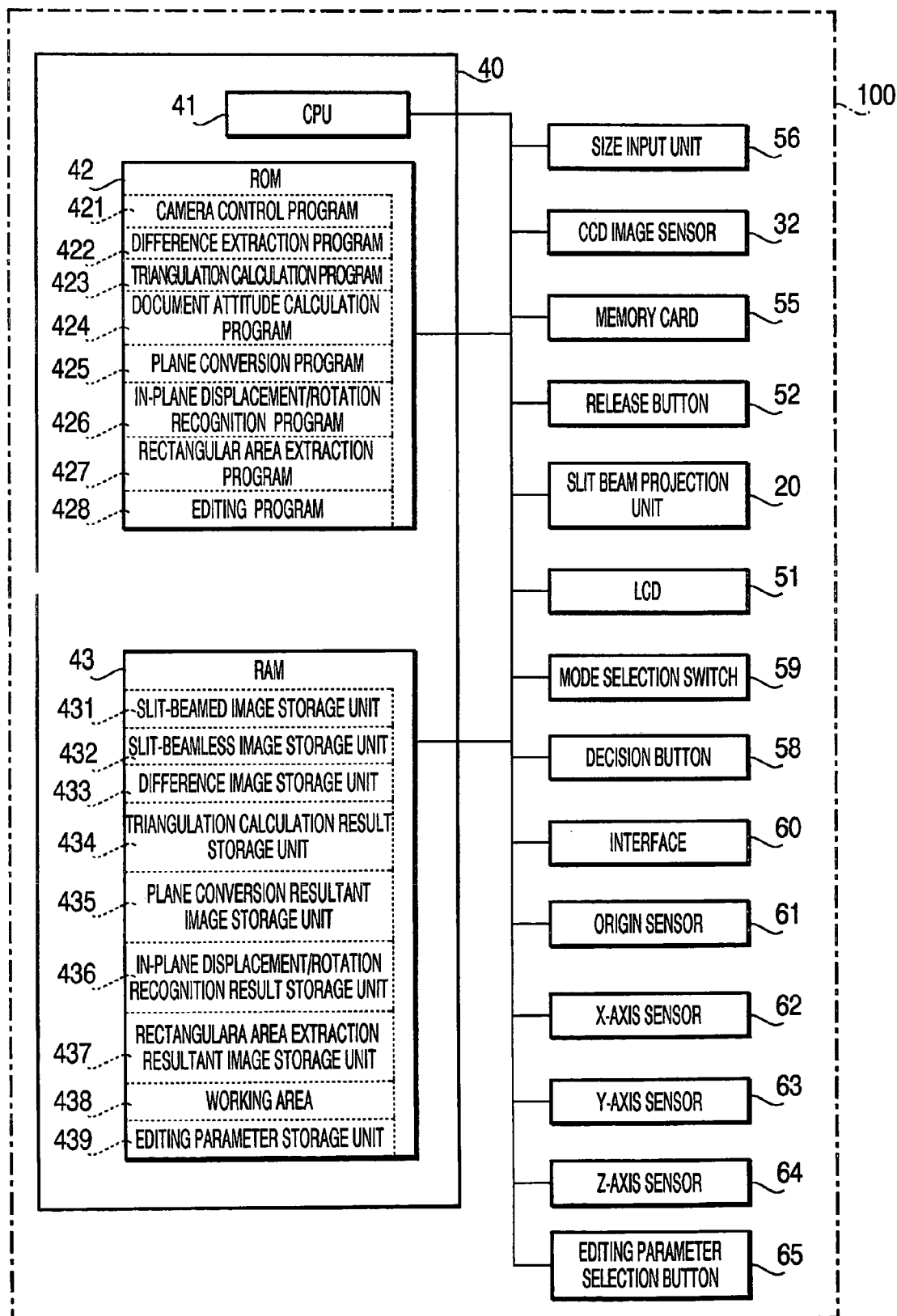

FIG. 33 is a block diagram showing the electric configuration of the image capturing device of the third embodiment.

FIGS. 34(a)-34(f) are schematic diagrams showing editing patterns for an image displayed on an LCD.

Figure 35:
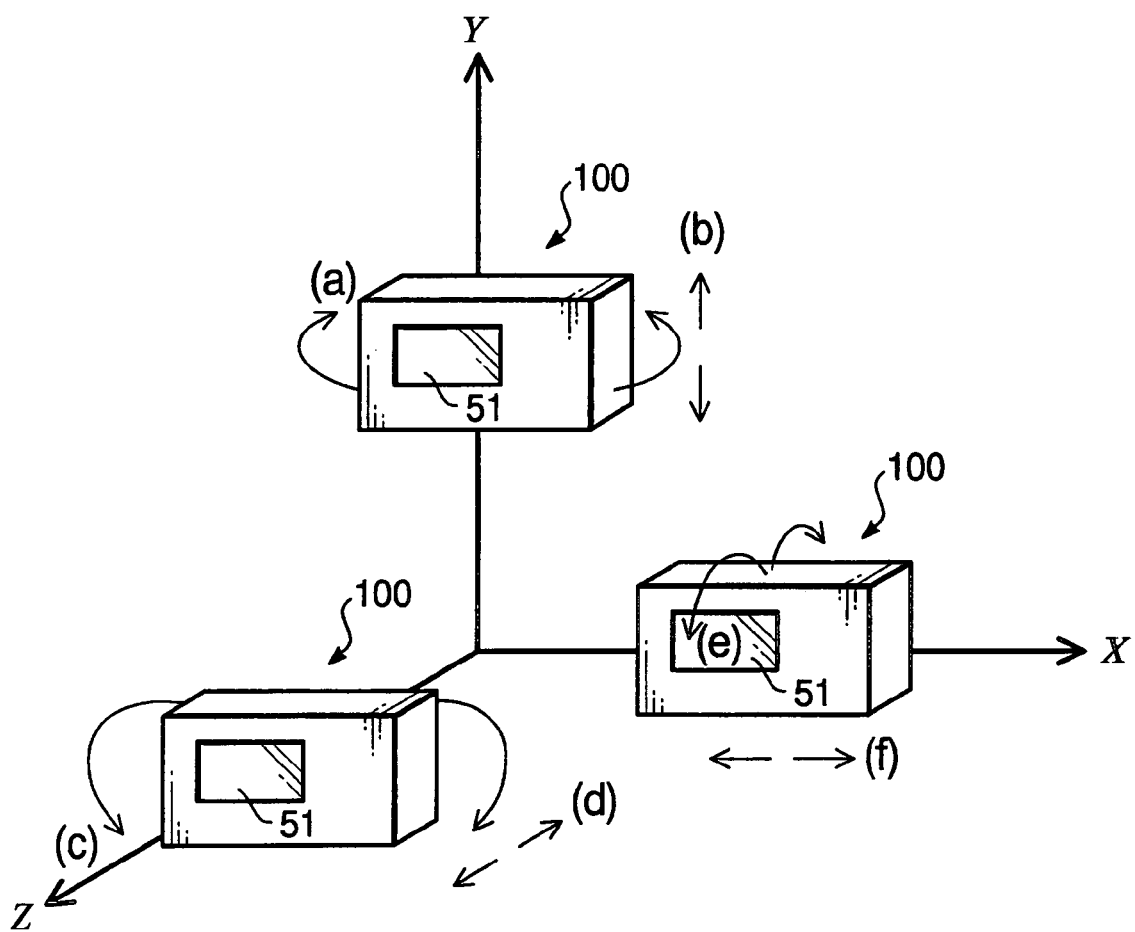

FIG. 35 is a schematic diagram for explaining how to move and rotate the image capturing device of the third embodiment for image editing.

Figure 36:
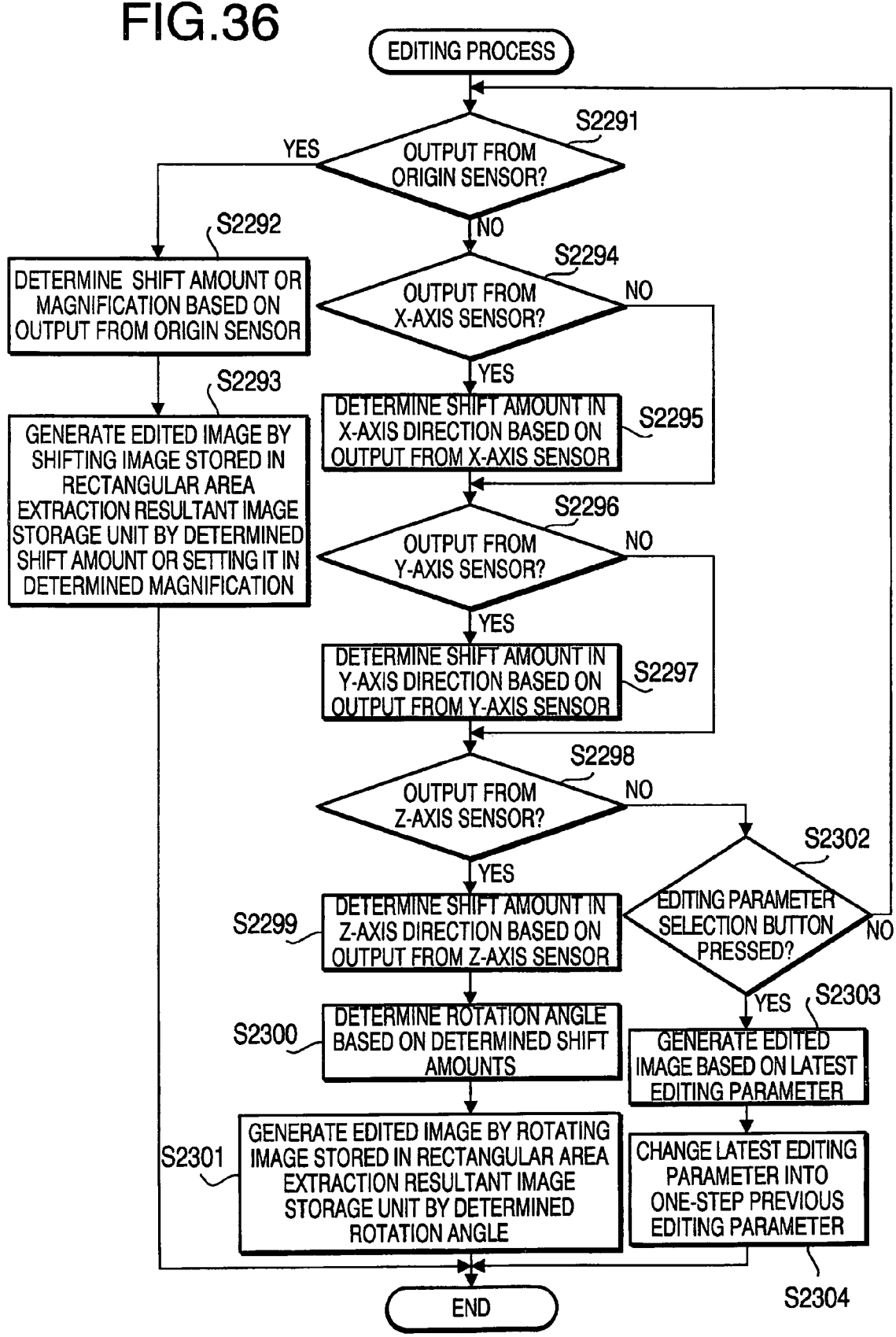

FIG. 36 is a flow chart showing an editing process executed by the image capturing device of the third embodiment.

DESCRIPTION OF REFERENCE CHARACTERS 1 image capturing device
10 body case
20 slit beam projection unit
21 laser diode
22 collimator lens
23 aperture
24 transparent flat plate
25 cylindrical lens
26 reflecting mirror
27 rod lens
29 window
31 imaging lens
32 CCD image sensor
40 processor
52 release button
53 finder
55 card memory
56 size input unit
59 mode selection switch
70 laser beam
71 first slit beam
72 second slit beam
421 camera control program
422 difference extraction program
423 triangulation calculation program
424 document attitude calculation program
425 plane conversion program
426 in-plane displacement/rotation recognition program
427 rectangular area extraction program
431 slit-beamed image storage unit
432 slit-beamless image storage unit
433 difference image storage unit
434 triangulation calculation result storage unit
435 plane conversion resultant image storage unit
436 in-plane displacement/rotation recognition result storage unit
437 rectangular area extraction resultant image storage unit
438 working area

DETAILED DESCRIPTION OF THE EMBODIMENTS

Referring now to the drawings, a description will be given in detail of preferred embodiments in accordance with the present invention.

First Embodiment

FIG. 1(a) is an overall perspective view of an image capturing device 1 in accordance with a first embodiment of the present invention. FIG. 1(b) is a schematic sectional view of the image capturing device 1. FIG. 2 is a block diagram showing the composition of a control system of the image capturing device 1.

Figure 1:
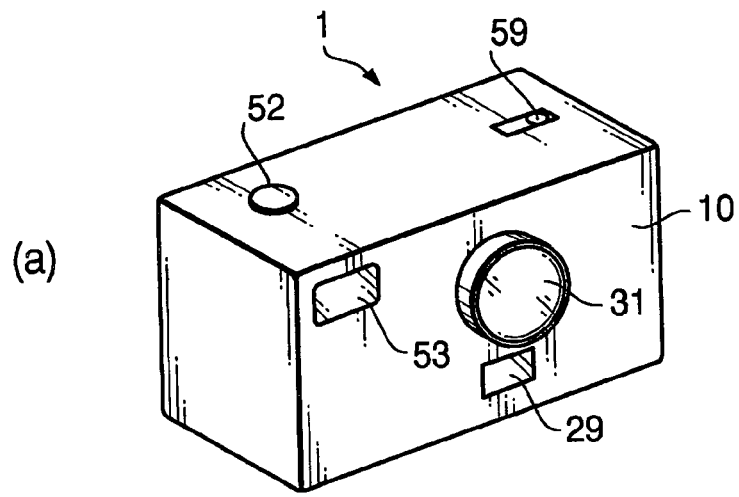
FIG. 1(a) is an overall perspective view of an image capturing device in accordance with a first embodiment of the present invention.
FIG. 1(b) is a schematic sectional view of the image capturing device.
Figure 1:
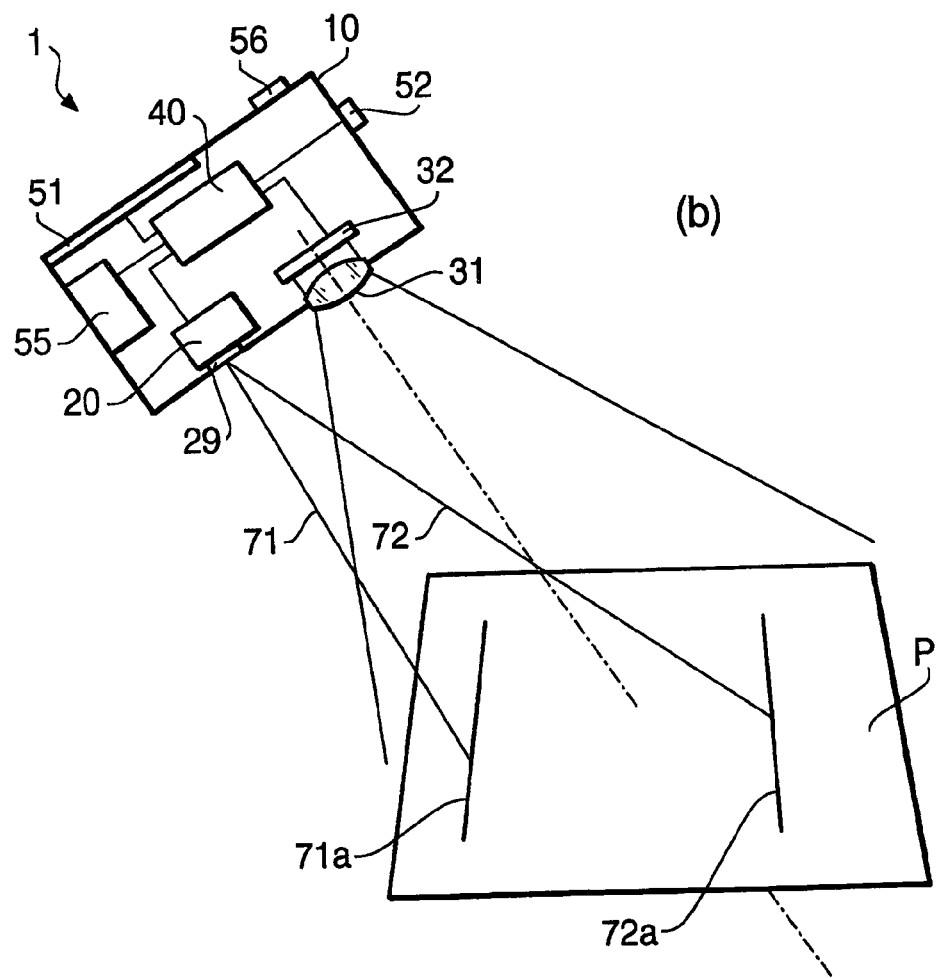
Figure 2:
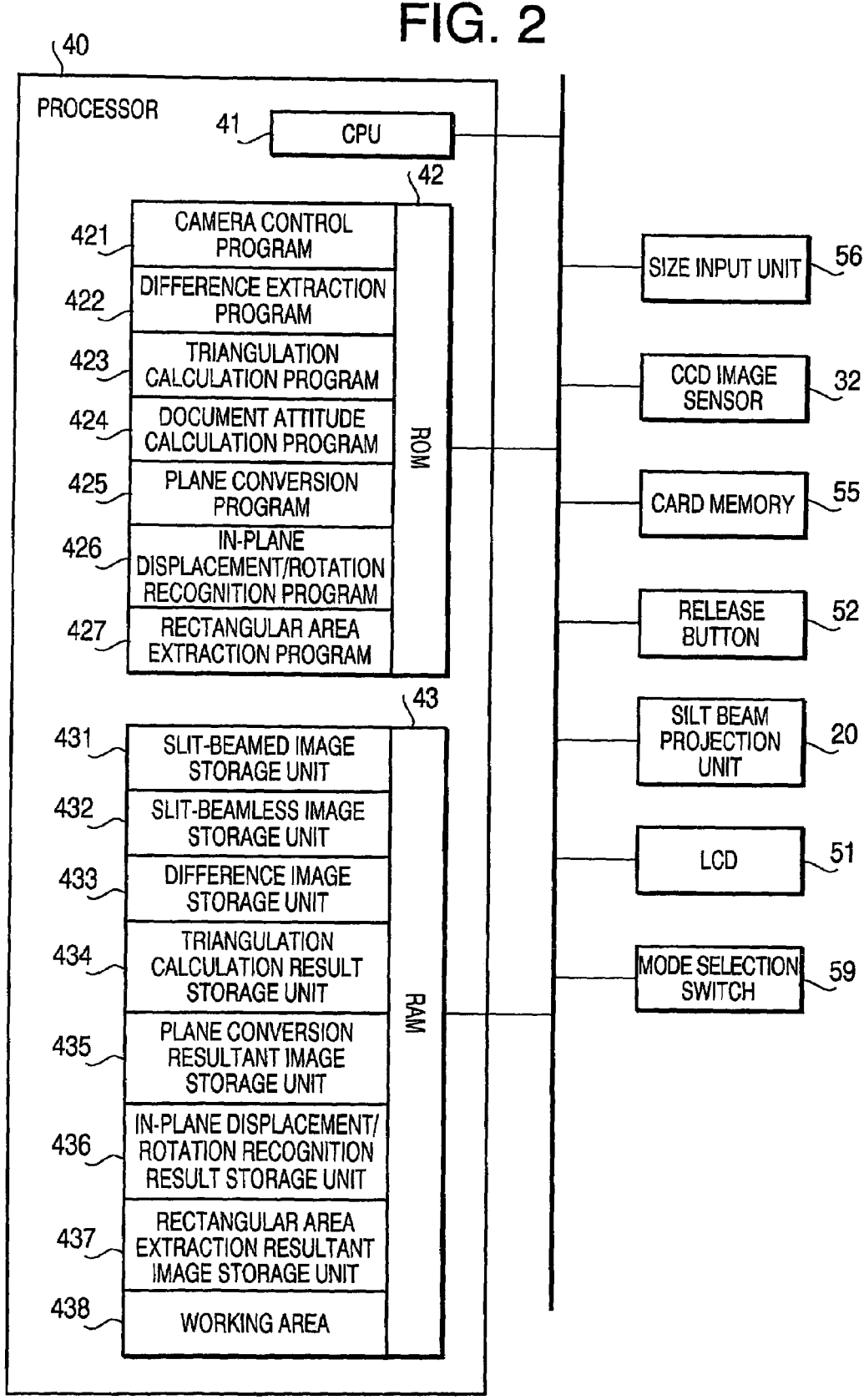
FIG. 2 is a block diagram showing the overall composition of the image capturing device of FIG. 1.

As shown in FIG. 1, the image capturing device 1 includes a body case 10 in a box shape, an imaging lens 31 provided at the front of the body case 10, a CCD image sensor 32 placed at the rear of the imaging lens 31 (inside the image capturing device 1) and a slit beam projection unit 20 placed underneath the imaging lens 31. The image capturing device 1 further includes a processor 40 installed in the body case 10, a release button 52 and a mode selection switch 59 placed on top of the body case 10, a card memory 55 inserted in the body case 10, and a size input unit 56 provided on the back of the body case 10. The above components of the image capturing device 1 are connected together by signal lines (see FIG. 2).

The image capturing device 1 is further equipped with an LCD (Liquid Crystal Display) 51 provided on the back of the body case 10 and a finder 53 provided to penetrate the body case 10 from its back to front. The LCD 51 and the finder 53 are used when the user decides an imaging range to be captured by the image capturing device 1.

The LCD 51 includes a liquid crystal display for displaying images. The LCD 51 displays images in response to image signals supplied from the processor 40. The processor 40 sends a variety of image signals to the LCD 51 depending on the situation, such as image signals for displaying real-time images captured by the CCD image sensor 32, image signals for displaying images stored in the card memory 55, image signals for displaying characters indicating the settings of the device, etc.

In the image capturing device 1, when the release button 52 is pressed by the user, an image formed by external light entering the imaging lens 31 and focusing on the CCD image sensor 32 via the imaging lens 31 is captured and written into the card memory 55. Such a mode in which the image capturing device 1 functions as a so-called digital camera will hereinafter be referred to as "normal mode". In addition to the normal mode, the image capturing device 1 has a function of "corrective imaging mode". The "corrective imaging mode" is an operation mode used when a document P as a subject is shot from an oblique direction, in which an image of the document P is corrected as if the document P were shot from the front and the corrected image data is stored the in the card memory 55.

Figure 3:
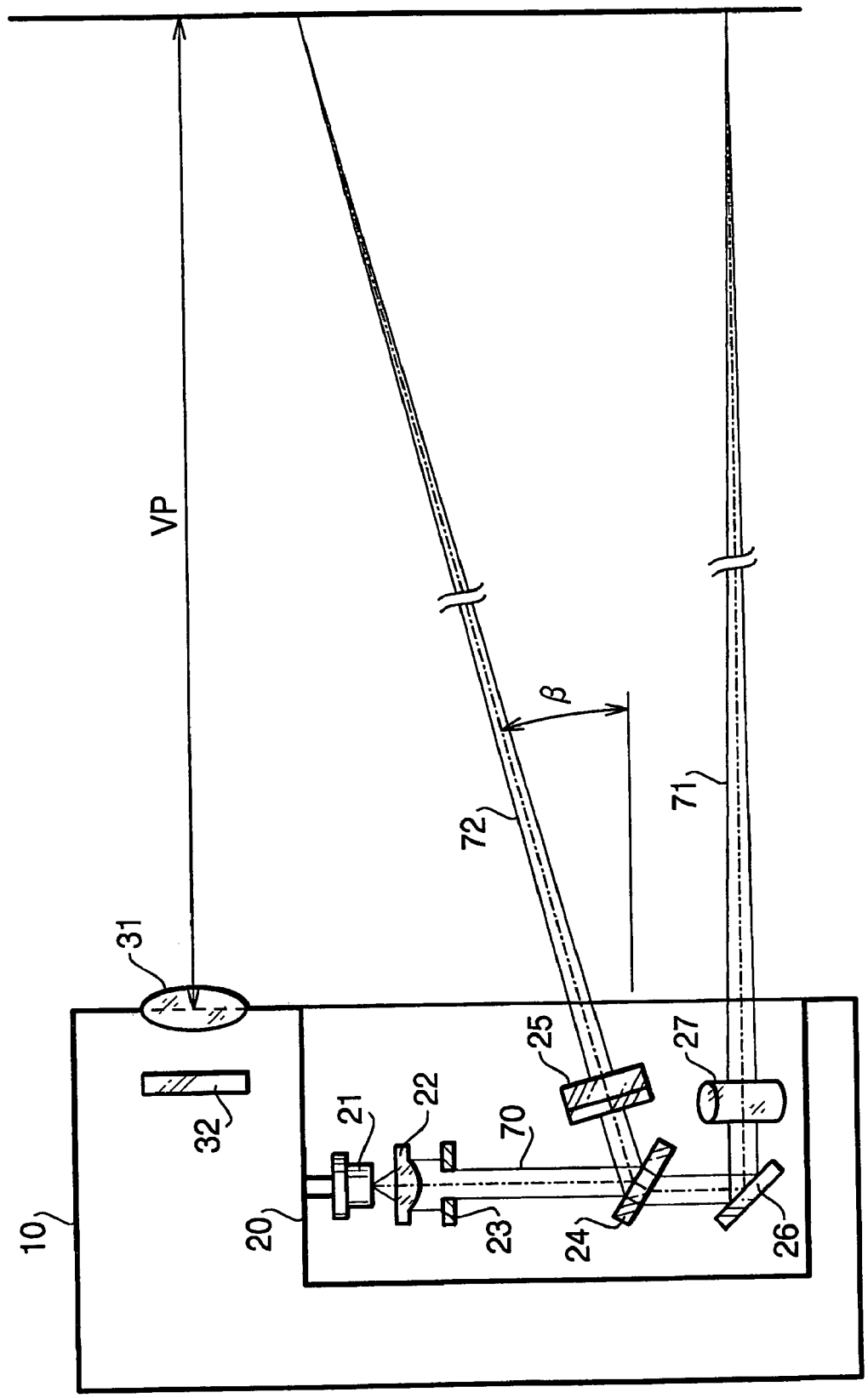
FIG. 3 is a schematic sectional view of the image capturing device of FIG. 1, showing the composition of a slit beam projection unit.

FIG. 3 shows the detailed composition of the slit beam projection unit 20 of the image capturing device 1. The slit beam projection unit 20 includes a laser diode 21, a collimator lens 22, an aperture 23, a transparent flat plate 24, a cylindrical lens 25, a reflecting mirror 26 and a rod lens 27.

The laser diode 21 emits a red laser beam. The ON-OFF switching of the laser beam emission by the laser diode 21 is controlled according to instructions outputted by the processor 40. The collimator lens 22 condenses the laser beam emitted by the laser diode 21 so that the beam will focus at a point a reference distance VP away from the slit beam projection unit 20.

The aperture 23 is formed by a plate having a rectangular opening part. The laser beam from the collimator lens 22 incident upon the aperture 23 is shaped into a rectangular shape while passing through the opening part and thereafter emerges from the aperture 23 as a laser beam 70. The transparent flat plate 24 is composed of a transparent flat plate made of pure glass material, for example. The back of the transparent flat plate 24 is provided with an AR coat (antireflection coating). The transparent flat plate 24 is tilted toward the front of the body case 10 by a prescribed angle β (e.g. 33 degrees) with respect to a plane orthogonal to the optical axis of the laser beam 70. The transparent flat plate 24 reflects a prescribed ratio (e.g. 5%) of the laser beam 70 by its surface while transmitting the rest of the laser beam 70. The direction into which the laser beam 70 is reflected by the transparent flat plate 24 will hereinafter be referred to as a "second direction".

The reflecting mirror 26 includes a member (mirror, etc.) totally reflecting the laser beam. The reflecting mirror 26 is placed on the downstream side of the transparent flat plate 24 transmitting the laser beam 70, while being tilted toward the front of the body case 10 by 45 degrees. The reflecting mirror 26 totally reflects the laser beam 70 penetrating the transparent flat plate 24 and changes its optical path direction by 90 degrees. The direction into which the laser beam 70 is reflected by the reflecting mirror 26 will hereinafter be referred to as a "first direction".

The rod lens 27 is formed by a lens of a cylindrical shape having a short positive focal length. The rod lens 27 is placed on the downstream side of the reflecting mirror 26 reflecting the laser beam 70 so that the axis of the cylindrical shape will be in the upright direction. Since the focal length of the rod lens 27 is short, the laser beam passing through the rod lens 27 immediately spreads after crossing a focal point in the vicinity of the rod lens 27 and thereafter travels in the first direction as a spreading slit beam having a prescribed spread angle. The slit beam emerging from the rod lens 27 will hereinafter be referred to as a "first slit beam 71".

The cylindrical lens 25 is a lens having a concave shape on its one side to have a negative focal length. The cylindrical lens 25 is placed on the downstream side of the transparent flat plate 24 reflecting the laser beam 70 so that its lens surface will be orthogonal to the second direction. The cylindrical lens 25 receives the laser beam 70 reflected by the transparent flat plate 24 and outputs the laser beam 70 as a slit beam traveling in the second direction with a prescribed spread angle. The slit beam emerging from the cylindrical lens 25 will hereinafter be referred to as a "second slit beam 72".

With the above configuration, the slit beam projection unit 20 lets the laser diode 21 emit the laser beam according to instructions from the processor 40 and thereby outputs the first and second slit beams 71 and 72 in the first and second directions respectively through a window 29 of the body case 10 formed under the imaging lens 31.

Figure 4:
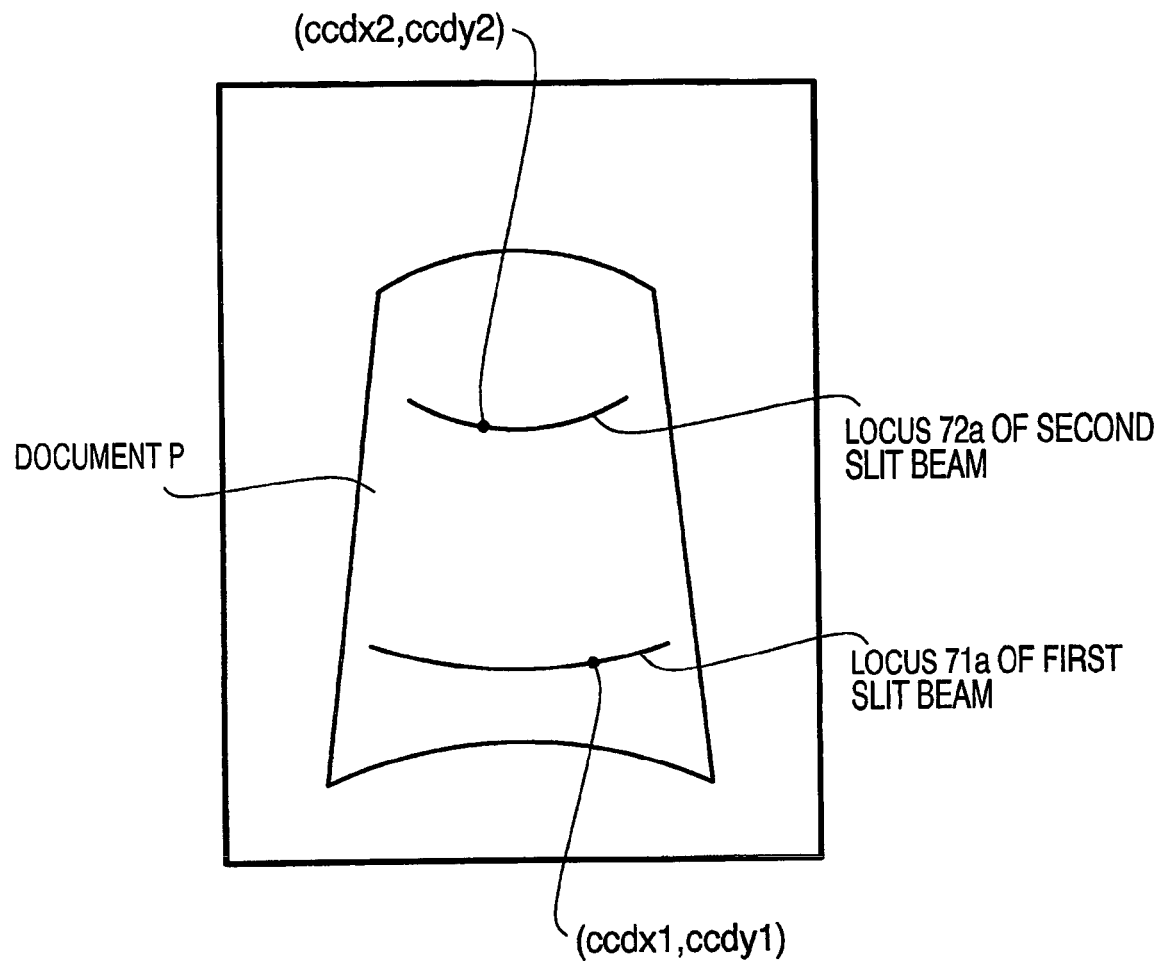
FIG. 4 is a schematic diagram for explaining a slit-beamed image.

FIG. 4 shows a state of the first and second slit beams 71 and 72 projected on a document P as a sheet-like material. By the first and second slit beams 71 and 72, a locus 71a of the first slit beam and a locus 72a of the second slit beam are formed on the document P. The lengths, slopes and interval of the loci 71a and 72a of the first and second slit beams change depending on the position and attitude of the document P as shown in FIG. 4.

The imaging lens 31 is formed by a plurality of lenses. The focal length is automatically adjusted by the imaging lens 31 and light from the outside is focused on the CCD image sensor 32. The CCD image sensor 32 includes a matrix-like array of photoelectric transducers like CCDs (Charge Coupled Devices). The CCD image sensor 32 generates signals corresponding to colors and intensities of light of the image forming on its surface, converts the signals into digital data, and outputs the digital data to the processor 40. Data outputted by one photoelectric transducer is pixel data corresponding to one pixel of the image. A piece of image data includes the same number of pixel data as the photoelectric transducers.

The CCD image sensor 32 generates image data including 1200 pixels (in the width direction)×1600 pixels (in the height direction). A "width direction position" ccdx and a "height direction position" ccdy as coordinates in the image data are represented by the numbers of pixels. A pixel at the upper left corner of the image is defined as the origin (position "0"). Therefore, the width direction position ccdx ranges between "0" and "1199" while the height direction position ccdy ranges between "0" and "1599".

The interval between the CCD pixels corresponds to a resolution of 100 dpi (dot per inch) on the document. The image data includes pixel information about each pixel, represented by 256 steps of luminance of red (R), green (G) and blue (B).

The release button 52, made of a push button switch, is connected to the processor 40. The pressing of the release button 52 by the user is detected by the processor 40.

The card memory 55, implemented by a nonvolatile rewritable memory, is attachable and detachable to/from the body case 10. The mode selection switch 59, implemented by a slide switch that is switchable between two positions, for example, is connected to the processor 40. The position of the switch of the mode selection switch 59 is detected by the processor 40, by which one of the two positions of the mode selection switch 59 is recognized as the "normal mode" while the other is recognized as the "corrective imaging mode".

The processor 40 is formed by a CPU (Central Processing Unit) 41, a ROM (Read Only Memory) 42 and a RAM (Random Access Memory) 43. The CPU 41 executes various processes according to programs stored in the ROM 42 while using the RAM 43. The processes executed by the CPU 41 include the detection of the pressing of the release button 52, the detection of the status of the mode selection switch 59, the reading of image data from the CCD image sensor 32, the writing of image data into the card memory 55, the switching of the slit beam emission from the slit beam projection unit 20, etc.

The ROM 42 stores a camera control program 421, a difference extraction program 422, a triangulation calculation program 423, a document attitude calculation program 424, a plane conversion program 425, an in-plane displacement/rotation recognition program 426 and a rectangular area extraction program 427. The camera control program 421 is a program for the overall control of the image capturing device 1, including a process shown in a flow chart of FIG. 5 (details will be explained later). The difference extraction program 422 is a program for generating image data in which loci of the slit beams are extracted from the image of the document P onto which the slit beams are projected. The triangulation calculation program 423 is a program for calculating a three-dimensional spatial position for each pixel of the loci of the slit beams. The document attitude calculation program 424 is a program for estimating the position and three-dimensional shape of the document P. The plane conversion program 425 is a program for converting image data stored in a slit-beamless image storage unit 432 into image data of the document P shot from the front. The in-plane displacement/rotation recognition program 426 is a program for detecting a displacement and a rotation angle of the document P in the image data. The rectangular area extraction program 427 is a program for converting an area in the image data in which the document P is captured (an area representing the document P).

In the RAM 43, a slit-beamed image storage unit 431, the slit-beamless image storage unit 432 and a difference image storage unit 433 (each of which has a size for storing data of a certain image data format outputted by the CCD image sensor 32) are reserved as storage areas. A triangulation calculation result storage unit 434 having a size for storing the calculation result of the position of each point of the slit-beamed image, a plane conversion resultant image storage unit 435 having a size for storing the result of the conversion of the image data, and an in-plane displacement/rotation recognition result storage unit 436 for storing the result of an in-plane displacement/rotation recognition process which will be explained later are also reserved in the RAM 43. Further, a rectangular area extraction resultant image storage unit 437 for storing the result of a rectangular area extraction process which will be explained later and a working area 438 having a size for temporarily storing data for the calculations by the CPU 41 are also reserved in the RAM 43.

The finder 53 includes an optical lens. The user looking into the finder 53 from the rear of the image capturing device 1 can view a range substantially equal to the range of the image formed by the imaging lens 31 on the CCD image sensor 32.

The size input unit 56, including a slide switch that is switchable among a plurality of positions, is connected to the processor 40. The size of the document P to be shot is judged by the processor 40 according to the position of the switch of the size input unit 56 operated by the user. For example, the processor 40 recognizes the far left position of the switch of the size input unit 56 operated by the user as "no designation", the next position as "A4 size", and the far right position as "A3 size".

Figure 5:
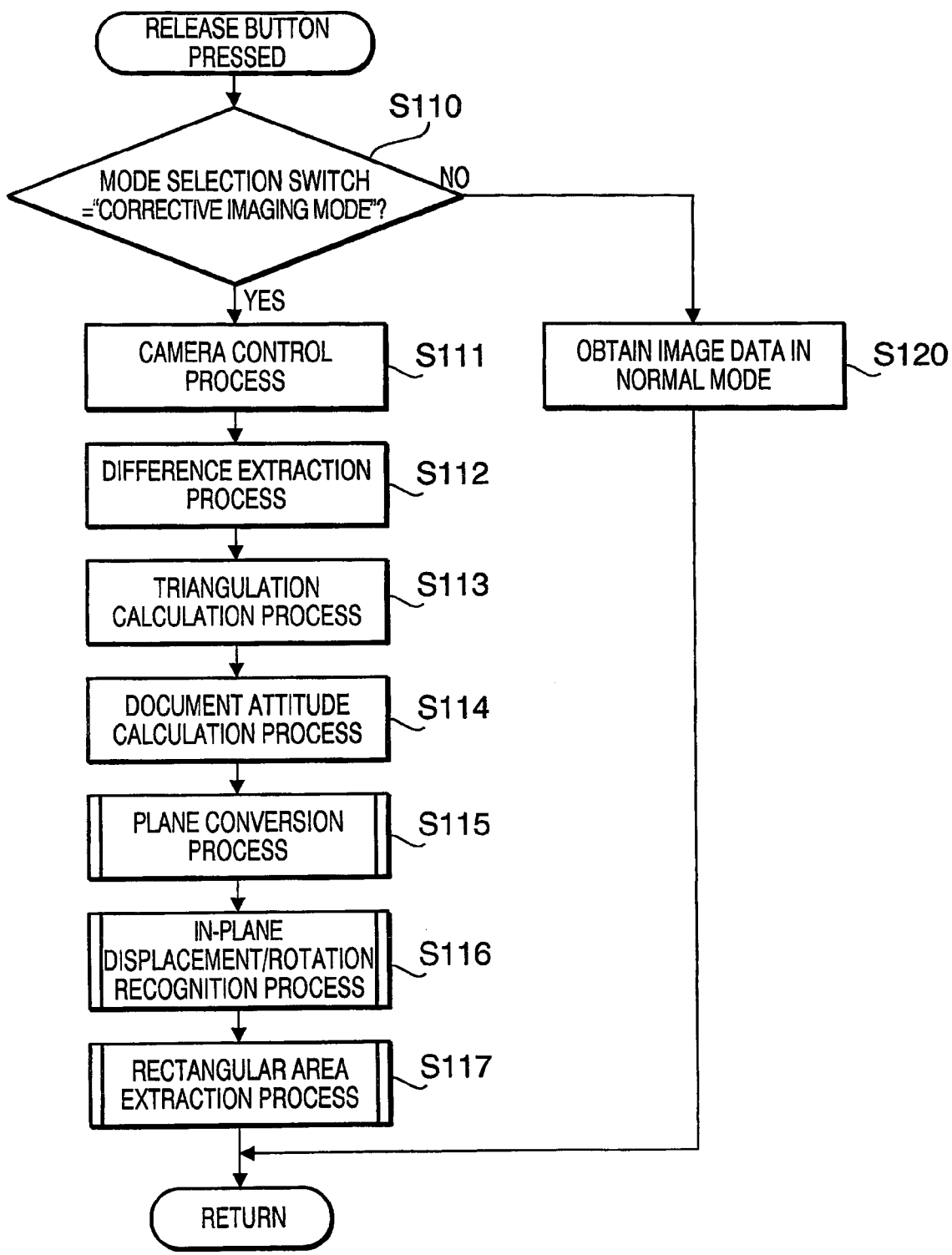
FIG. 5 is a flow chart showing the operation of the image capturing device after a release button is pressed.

In the following, the operation of the image capturing device 1 after the release button 52 is pressed by the user for a document P as the subject will be explained referring to the flow chart of FIG. 5 showing a process executed by the processor 40 of the image capturing device 1.

First, in S110, whether the mode selection switch 59 is at the position of the "corrective imaging mode" or not is judged. If the mode selection switch 59 is at the "corrective imaging mode" (S110:YES), the process advances to S111. If the mode selection switch 59 is not at the "corrective imaging mode" but at the "normal mode" (S110: NO), the process advances to S120.

In S111, a camera control process for obtaining a slit-beamed image and a slit-beamless image is executed. Specifically, an instruction for the emission by the laser diode 21 is issued to the slit beam projection unit 20 and the first and second slit beams 71 and 72 are outputted from the slit beam projection unit 20. Image data of the document P on which the first and second slit beams 71 and 72 are projected as shown in FIG. 4 is obtained from the CCD image sensor 32 as the slit-beamed image. The obtained image data is stored in the slit-beamed image storage unit 431 of the RAM 43.

Subsequently, an instruction for stopping the emission by the laser diode 21 is issued to the slit beam projection unit 20 and image data, without the first and second slit beams 71 and 72 outputted from the slit beam projection unit 20, is obtained from the CCD image sensor 32 as the slit-beamless image. The obtained image data is stored in the slit-beamless image storage unit 432.

In the next step S112, a difference extraction process is executed. Specifically, image data, as the difference between the image data stored in the slit-beamed image storage unit 431 and the image data stored in the slit-beamless image storage unit 432 (i.e. the loci 71a and 72a of the first and second slit beams projected on the document P), is generated by the difference extraction program 422, and the difference image data is stored in the difference image storage unit 433.

As positional information on the image of the locus 71a of the first slit beam, in the lower half (height direction position ccdy: "800"-"1599") of the image data stored in the difference image storage unit 433, the position of a pixel having the maximum luminance level among a line of pixels arranged in the height direction is determined at a plurality of positions in the width direction (every 20 pixels between the width direction positions ccdx "0" and "1199"). An "index idx" as a number assigned in order of the determination of the position, the width direction position ccdx at which the position of the maximum-luminance pixel has been determined, and the height direction position ccdy of the maximum-luminance pixel are stored in the difference image storage unit 433 as slit beam image position data 433a as shown in FIG. 6(a). Incidentally, the position of the maximum-luminance pixel equals a position where an approximated curve connecting the luminance levels of the pixels arranged in the height direction takes on its maximum value. When the luminance level at the maximum-luminance position is less than a prescribed level, the locus 71a of the first slit beam is judged to be absent and the data are not stored as the slit beam image position data 433a. An "extracted pixel number N", as the total number of pixels extracted as the positional information on the locus 71a of the first slit beam, is set at the maximum value of the index idx.

Subsequently, as positional information on the image of the locus 72a of the second slit beam, in the upper half (height direction position ccdy: "0"-"799") of the image data, the position of a pixel having the maximum luminance level among a line of pixels arranged in the height direction is determined at the center (ccdx="599") of the width direction position ccdx, and data of the same format as the slit beam image position data 433a are stored in the difference image storage unit 433 as the positional information on the locus 72a of the second slit beam. Similarly to the positional information on the locus 71a of the first slit beam, when the luminance level at the maximum-luminance position is less than a prescribed level, the locus 72a of the second slit beam is judged to be absent and the data are not stored in the difference image storage unit 433.

In the next step S113, a triangulation calculation process is executed. Specifically, a three-dimensional spatial position in regard to each index idx is determined by the triangulation calculation program 423 for each of the points specified by the slit beam image position data 433a stored in the difference image storage unit 433 (details will be explained later), and an X value, Y value and Z value as the three-dimensional coordinates regarding each index idx are stored in the triangulation calculation result storage unit 434 as slit beam three-dimensional position data 434a as shown in FIG. 6(b).

In the next step S114, a document attitude calculation process is executed. Specifically, a three-dimensional spatial position (0, 0, L), a lean θ and a curvature φ of the document P are determined by the document attitude calculation program 424 by use of the slit beam three-dimensional position data 434a (details will be explained later).

In the next step S115, a plane conversion process is executed. Specifically, a process shown in a flow chart of FIG. 10 (details will be explained later) is executed by the plane conversion program 425, by which the image stored in the slit-beamless image storage unit 432 is converted into a plane image of the document P observed substantially from the orthogonal direction (an image in which the document P is in a rectangular shape as shown in FIG. 7(a), for example) and the plane image as the result of conversion is stored in the plane conversion resultant image storage unit 435.

In the next step S116, an in-plane displacement/rotation recognition process is executed. Specifically, a process shown in a flow chart of FIG. 13 (details will be explained later) is executed by the in-plane displacement/rotation recognition program 426 for the plane image stored in the plane conversion resultant image storage unit 435, by which an image area in the plane image representing the document P is recognized, a width direction displacement DH of the center of the image area of the document P from the center of the plane image, a height direction displacement DV of the center of the image area from the center of the plane image, and a rotation angle DROT of a prescribed side of the document P image area in the plane image are obtained as shown in FIG. 7(b), and the obtained data are stored in the in-plane displacement/rotation recognition result storage unit 436.

In the next step S117, a rectangular area extraction process is executed. Specifically, a process shown in a flow chart of FIG. 18 (details will be explained later) is executed by the rectangular area extraction program 427. The slit-beamless image stored in the slit-beamless image storage unit 432 is converted into an image in which only the image area of the document P observed substantially from the orthogonal direction (with the image area in the erect state) has been extracted as shown in FIG. 7(c). The extracted image is stored in the rectangular area extraction resultant image storage unit 437. After the step S117 is finished, the process of FIG. 5 is ended.

Meanwhile, in S120, image data is obtained in the "normal mode". Specifically, the emission instruction issued to the laser diode 21 of the slit beam projection unit 20 is stopped and image data is obtained from the CCD image sensor 32 with no emission of the first and second slit beams 71 and 72. The obtained image data is stored in the card memory 55. Thereafter, the process of FIG. 5 is ended.

A concrete process of the step S112 executed by the difference extraction program 422 is as follows. The RGB values of each pixel in the image data stored in the slit-beamless image storage unit 432 are subtracted from the RGB values of a corresponding pixel in the image data stored in the slit-beamed image storage unit 431, by which a multivalued image, in which only the loci 71a and 72a of the first and second slit beams have been extracted, is obtained.

A concrete process of the step S113 executed by the triangulation calculation program 423 is as follows. For example, a three-dimensional spatial position corresponding to each of the points specified by the slit beam image position data 433a is figured out as explained below.

Figure 8:
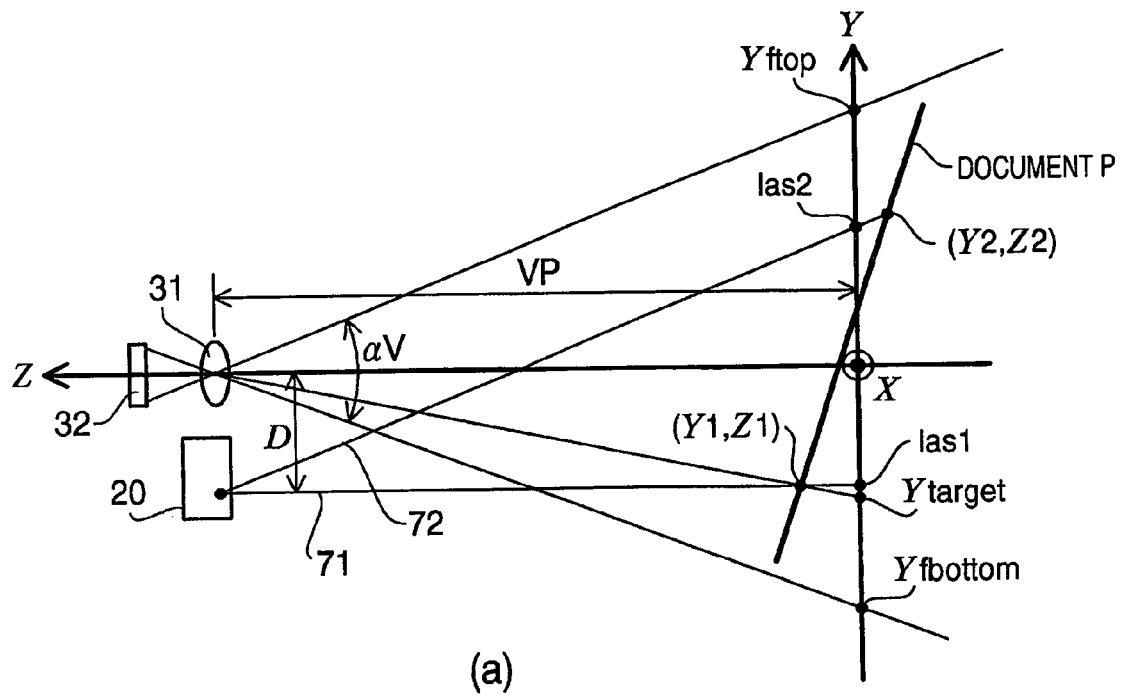
Figure 8:
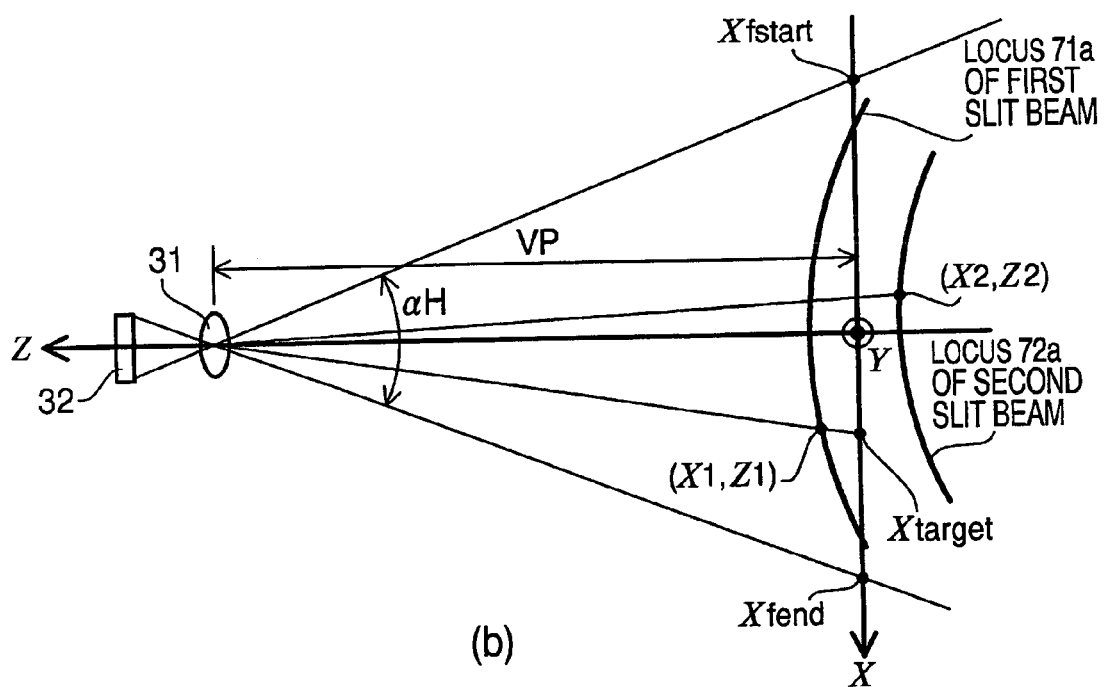

First, a coordinate system for shooting the document P curved in the width direction as shown in FIG. 4 is defined as follows. As shown in FIG. 8, the optical axis direction of the imaging lens 31 is defined as a Z-axis. A position that is a reference distance VP away from the image capturing device 1 is defined as the origin of X, Y and Z-axes. A horizontal direction and a vertical direction with respect to the image capturing device 1 are defined as an X-axis direction and a Y-axis direction, respectively.

The total number of pixels of the CCD image sensor 32 in the width direction will be called "ResX" and that in the height direction will be called "ResY". The upper end, lower end, left end and right end of the CCD image sensor 32 projected on the X-Y plane through the imaging lens 31 will be called "Yftop", "Yfbottom", "Xfstart" and "Xfend". The distance from the optical axis of the imaging lens 31 to the optical axis of the first slit beam 71 emitted from the slit beam projection unit 20 is assumed to be "D". The position of an intersection point of the first slit beam 71 and the X-Y plane measured in the Y-axis direction will be called "las1". The position of an intersection point of the second slit beam 72 and the X-Y plane measured in the Y-axis direction will be called "las2".

Under the above definitions, a three-dimensional spatial position (X1, Y1, Z1) corresponding to coordinates (ccdx1, ccdy1) of a point (specified by a particular piece of data in the slit beam image position data 433a) on the image is figured out from solutions of the following five simultaneous equations regarding triangles formed by the point on the imaging surface of the CCD image sensor 32, the emission point of the first and second slit beams 71 and 72, and intersection points with the X-Y plane.

$$Y1=-((las1+D)/VP)Z1+las1 \quad (1)$$

$$Y1=-(Ytarget/VP)Z1+Ytarget \quad (2)$$

$$X1=-(Xtarget/VP)Z1+Xtarget \quad (3)$$

$$Xtarget=Xfstart+(ccdx1/ResX)\times(Xfend-Xfstart) \quad (4)$$

$$Ytarget=Yftop-(ccdy1/ResY)\times(Yftop-Yfbottom) \quad (5)$$

Incidentally, las1=−D and thus Y1=−D in this embodiment since the first slit beam 71 is parallel to the Z-axis.

Similarly, a three-dimensional spatial position (X2, Y2, Z2) corresponding to coordinates (ccdx2, ccdy2) of a point (specified by the positional information on the locus 72a of the second slit beam) on the image is figured out from solutions of the following five simultaneous equations.

$$Y2=-((las2+D)/VP)Z2+las2 \quad (1)$$

$$Y2=-(Ytarget/VP)Z2+Ytarget \quad (2)$$

$$X2=-(Xtarget/VP)Z2+Xtarget \quad (3)$$

$$Xtarget=Xfstart+(ccdx2/ResX)\times(Xfend-Xfstart) \quad (4)$$

$$Ytarget=Yftop-(ccdy2/ResY)\times(Yftop-Yfbottom) \quad (5)$$

A concrete process of the step S114 executed by the document attitude calculation program 424 is as follows, for example. A regression curve is obtained for the three-dimensional spatial positions (points) specified by the slit beam three-dimensional position data 434a. Subsequently, a straight line connecting a point on the curve where the position in the X-axis direction is "0" and the point specified by the positional information on the locus 72a of the second slit beam is assumed. An intersection point of the straight line and the Z-axis (i.e. an intersection point of the optical axis and the document P) is obtained as the three-dimensional spatial position (0, 0, L) of the document P (hereinafter referred to as "position L") as shown in FIG. 9(a), and the angle of the straight line with respect to the X-Y plane is obtained as the lean θ of the document P.

Subsequently, as shown in FIG. 9(b), the regression curve of the locus 71a of the first slit beam is rotated by −θ (θ: the lean of the document P obtained above), that is, a state in which the document P is placed in parallel with the X-Y plane is assumed. As shown in FIG. 9(c), in regard to a cross section of the document P on the X-Z plane, displacements of the cross section in the Z-axis direction are obtained for a plurality of positions in the X-axis direction. Based on the displacements, curvature φ(X) indicating the gradient with respect to the X-axis direction is obtained as a function of the position X in the X-axis direction.

The step S115 is executed by the plane conversion program 425 according to a process shown in a flow chart of FIG. 10 which will be explained below, for example. First, a processing area for this process is reserved in the working area 438 of the RAM 43 and an initial value of a variable j used in this process (e.g. variable for a counter) is set (S121).

Subsequently, based on the position L, the lean θ and the curvature φ(X) of the document P calculated by the document attitude calculation program 424, four points at the four corners of the slit-beamless image stored in the slit-beamless image storage unit 432 are rotated around the Y-axis by the curvature φ(X), rotated around the X-axis by the lean θ, and shifted in the Z-axis direction by the position L, and an area formed by the four points as the result of the above conversion (i.e. an area (image) in which the surface of the document P with characters, etc. is observed substantially from the orthogonal direction (in which the document P is generally in a rectangular shape and the area (the whole image) is generally in a trapezoidal shape)) is obtained. A rectangular plane image area containing the obtained area is set (see FIG. 7(a)), and the number Qa of pixels contained in the area is determined (S122). Incidentally, each pixel in the plane image area is assumed to have a size corresponding to a resolution (25 dpi) that is ¼ of the resolution (100 dpi) of the slit-beamless image data stored in the slit-beamless image storage unit 432. Therefore, the above number Qa of pixels is 1/16 compared to a case where the resolution is set at that of the slit-beamless image.

Subsequently, coordinates on the slit-beamless image corresponding to each pixel of the plane image area set above are determined, and pixel information on each pixel of the plane image is set based on pixel information around the coordinates. Specifically, the position of each pixel of the plane image area is shifted in the Z-axis direction based on the curvature $\phi$ (X) (S125), rotated around the X-axis by the lean $\theta$ (S126), and shifted in the Z-axis direction by the position L (S127). The three-dimensional spatial position obtained by the above conversion is converted into coordinates (ccdx, ccdy) on the image data captured by the CCD image sensor 32 based on the aforementioned relational expressions of the triangulation calculation process (S128). If the converted coordinates are within the range of the image data stored in the slit-beamless image storage unit 432 (S129: YES), the pixel information at the converted coordinates is obtained by the nearest neighbor method based on pixel information on the slit-beamless image stored in the slit-beamless image storage unit 432, and the obtained pixel information is stored in the plane conversion resultant image storage unit 435 (S130). If the converted coordinates are outside the range of the image data stored in the slit-beamless image storage unit 432 (S129: NO), a value representing "black" is stored in the plane conversion resultant image storage unit 435 as the pixel information (S131). The above sequence is repeated until the variable j reaches the number Qa of pixels (S132, S123).

Incidentally, the nearest neighbor method is a technique assuming that the luminance at a point under consideration is equal to the luminance at a point nearest to the point under consideration (nearest neighbor point). For example, when pixel information exists at points of integer coordinates like (0, 0), (0, 1), (1, 0) and (1, 1) while the converted coordinates are (0.2, 0.8), the pixel information on the nearest neighbor point (0, 1) is used as the pixel information at the converted coordinates.

A concrete process of the curvature calculation in S125 is as follows. A point (X', Y', Z') shifted from a particular point in the plane image area (at three-dimensional coordinates (X, Y, Z)) in the Z-axis direction based on the curvature $\phi$ (X) is determined according to a procedure shown in a flow chart of FIG. 11(a) which will be explained below.

First, the coordinate X' is obtained from a relational expression: X'=cos $\phi \times$X+(-sin $\phi$)$\times$Z (S1251). The coordinate Y' is left unchanged from Y (S1252). The coordinate Z' is obtained from a relational expression: Z'=sin $\phi \times$X+cos $\phi \times$Z (S1253).

A concrete process of the lean distance calculation in S126 is as follows. A point (X", Y", Z") is determined by rotating the point (X', Y', Z') (determined by the curvature calculation process) around the X-axis by $\theta$, according to a procedure shown in a flow chart of FIG. 11(b).

First, the coordinate X" is left unchanged from X' (S1261). The coordinate Y" is obtained from a relational expression: Y"=cos $\theta \times$Y'+(-sin $\theta$)$\times$Z' (S1262). The coordinate Z" is obtained from a relational expression: Z"=sin $\theta \times$Y'+cos $\theta \times$Z' (S1263).

A concrete process of the Z direction shift in S127 is as follows. A point (X''', Y''', Z''') is determined by shifting the point (X", Y", Z") (determined by the above lean correction) in the Z-axis direction by the position L, according to a procedure shown in a flow chart of FIG. 12(a) which will be explained below.

The coordinate X''' is left unchanged from X" (S1271). The coordinate Y''' is also left unchanged from Y" (S1272). The coordinate Z''' is obtained by adding the position L to Z" (S1273).

The step S128 for converting the point (X''', Y''', Z''') (determined by the shift in the Z direction by the position L) into the coordinates (ccdx, ccdy) on the CCD image is executed according to a procedure shown in a flow chart of FIG. 12(b).

The X-axis direction position Xtarget on the document P is obtained from a relational expression: Xtarget=X'''/(1−(Z'''/L) (S1281). The Y-axis direction position Ytarget on the document P is obtained from a relational expression: Ytarget=Y'''/(1−(Z'''/L) (S1282).

The width direction position ccdx on the CCD image is obtained from a relational expression: ccdx=(ResX)$\times$(Xtarget−Xfstart)/(Xfend−Xfstart) (S1283). The height direction position ccdy on the CCD image is obtained from a relational expression: ccdy=(−ResY)$\times$(Ytarget−Yfstart)/(Yfend−Yfstart) (S1284).

The step S116 executed by the in-plane displacement/rotation recognition program 426 is a process shown in a flow chart of FIG. 13 which will be explained below, for example.

First, the plane image data stored in the plane conversion resultant image storage unit 435 is converted into monochrome luminance image data, that is, image data in which each pixel has a luminance value obtained by adding up luminance values of three colors (R, G, B) of the pixel in the plane image data (S161). Subsequently, a histogram regarding image luminance distribution in the whole monochrome plane image is calculated (e.g. a graph shown in FIG. 14 having a horizontal axis representing the luminance and a vertical axis representing the frequency, in which the frequency distribution splits into two groups: a high luminance region and a low luminance region) and the barycenter of the histogram is determined (S162). The plane image data is converted into a binarized image data in which each piece of pixel information on the high luminance side of the barycenter of the histogram is rounded to "1" (i.e. "white") while each piece of pixel information on the low luminance side of the barycenter is rounded to "0" (i.e. "black") (S163). Consequently, part of the binarized image representing the document P (brighter than the background) becomes "white" and the other part of the binarized image becomes "black".

Subsequently, a vertical/horizontal displacement calculation is executed (S164). Specifically, the width direction displacement DH and the height direction displacement DV of the center of a "white" area of the binarized image (i.e. an area corresponding to the document P) from the center of the binarized image are obtained according to a procedure shown in a flow chart of FIG. 15 (S164).

Subsequently, a rotation angle calculation is executed (S165). Specifically, the rotation angle DROT of a side of the "white" area (the area corresponding to the document P) of the binarized image (a size in the width direction of the "white" area) with respect to the width direction of the binarized image is obtained according to a procedure shown in a flow chart of FIG. 16 (S165). Thereafter, the process of FIG. 13 is ended.

FIG. 15 is a flow chart showing the vertical/horizontal displacement calculation of the step S164. The vertical/horizontal displacement calculation will be explained here. First, the barycentric position of the part of the binarized image (according to the binarized image data) containing the document P (i.e. the "white" area) is obtained (S1641). Subsequently, the width direction displacement DH and the height direction displacement DV are obtained as displacements of the barycentric position of the "white" area from the center of the image (S1642). The width direction displacement DH and the height direction displacement DV are stored in the in-plane displacement/rotation recognition result storage unit 436 (S1643). Thereafter, the process of FIG. 15 is ended.

FIG. 16 is a flow chart showing the rotation angle calculation of the step S165. The rotation angle calculation will be explained here. First, the binarized image data obtained by the conversion of S163 is loaded (S1651) and a parameter angle γ and a value DMAX are initialized (S1652). Subsequently, the image according to the binarized image data is rotated until the angle of rotation reaches the parameter angle γ (S1655). Subsequently, an image as the second order derivative of the image in regard to the width direction is generated (S1656). Consequently, an image retaining the outline of the document P area is generated.

Subsequently, a histogram regarding the number of "white" pixels (arranged in the height direction of the second order derivative image) with respect to the width direction of the second order derivative image is calculated (S1657), by which a histogram like a graph shown in FIG. 17 (having a horizontal axis representing the position in the width direction of the image and a vertical axis representing the frequency of "white" pixels arranged in the height direction) is obtained, in which the value of the histogram gets high at a position corresponding to a side of the document P in the height direction. The value of the histogram at the position is recorded as a maximum value dmax(γ) of the histogram at the parameter angle γ (S1658). The maximum value dmax(γ) is compared with the maximum value DMAX which has been obtained so far (S1659). If the maximum value dmax(γ) is larger than the maximum value DMAX (S1659: YES), the rotation angle DROT is updated to the parameter angle γ (S1661) and the maximum value DMAX is updated to the maximum value dmax(γ) at the parameter angle γ (S1662). If the parameter angle γ is not larger than the maximum value DMAX (S1659: NO), the rotation angle DROT and the maximum value DMAX are left unchanged.

The above sequence is repeated from an initial rotation angle γstart (e.g. −45 degrees) to a final rotation angle γend (e.g. 45 degrees) on every increment "add" (e.g. 5 degrees) (S1653, S1660).

By the above process, an angle capable of achieving the "maximum" maximum value of the histogram regarding the outline (while the image according to the binarized image data is rotated from the initial rotation angle γstart to the final rotation angle γend) can be determined. Specifically, when the left/right sides of the rectangular outline (deriving from the document P) become in parallel with the height direction of the image as indicated by dotted lines in FIG. 17, the histogram value at the width direction positions of the left/right sides of the outline hits its maximum. By use of the mechanism, the angle achieving the maximum histogram value during the rotation of the document P area is obtained as the rotation angle DROT of the document P.

The step S117 executed by the rectangular area extraction program 427 is a process shown in a flow chart of FIG. 18 which will be explained below, for example. First, a processing area for this process is reserved in the working area 438 of the RAM 43 and an initial value of a variable j used in this process (e.g. variable for a counter) is set (S171).

Subsequently, four points at the four corners of the slit-beamless image are rotated around the Y-axis by the curvature φ(X), rotated around the X-axis by the lean θ, and shifted in the Z-axis direction by the position L, while the X-Y plane is shifted by the width direction displacement DH and the height direction displacement DV and rotated around the Z-axis by the rotation angle DROT, by which the document P is positioned at the center of an area formed by the converted four points. Subsequently, an area (having the size inputted through the size input unit 56) extracted from the area formed by the four points (i.e. an extracted image area in which the surface of the document P with characters, etc. is observed substantially from the orthogonal direction, the rectangular shape of the document P has been rotated so as to let its sides be in parallel with the width/height directions of the image, and only the document P area has been extracted) is set, and the number of pixels Qb contained in the area is determined (S172). Incidentally, each pixel in the extracted image area is assumed to have a size corresponding to a resolution equal to the resolution (100 dpi) of the slit-beamless image data stored in the slit-beamless image storage unit 432.

Subsequently, the three-dimensional spatial position of each pixel contained in the extracted image area is rotated around the Z-axis by the rotation angle DROT (S175), shifted (coordinates of the pixel are changed) by the width direction displacement DH and the height direction displacement DV (S176), shifted in the Z-axis direction based on the curvature φ(x) (S177), rotated around the X-axis by the lean θ (S178), and shifted in the Z-axis direction by the position L (S179). The obtained three-dimensional spatial position is converted into coordinates (ccdcx, ccdcy) on a CCD image captured by an ideal camera according to the aforementioned relational expressions of triangulation (S180), and the coordinates (ccdcx, ccdcy) are converted into coordinates (ccdx, ccdy) on the image captured by the CCD image sensor 32 based on aberration characteristics of the imaging lens 31 being used (S181). Pixel information at the converted coordinates is determined from pixel information on the slit-beamless image by means of a bilinear method, and the determined pixel information is stored in the working area 438 of the RAM 43 as pixel information on the area set in S172 (S182).

The above sequence is repeated for the number Qb of pixels (for each pixel position in the area set in S172) (S183, S173). After the generation of image data is finished, the processing area is released (S174). Incidentally, the bilinear method is a technique in which correspondence between a point after conversion and an area (containing pixels) before conversion is figured out and an average of colors of the pixels in the area is regarded as the color of the point after conversion. For example, when pixel information exists at points of integer coordinates while calculated coordinates of a point before conversion are (0.2, 0.8), an average of four pieces of pixel information at surrounding four points (0, 0), (0, 1), (1, 0) and (1, 1) is obtained taking distances in consideration, and the obtained average is regarded as pixel information at the point after conversion.

Incidentally, the steps S177–S180 are identical with the steps S125–S128.

As explained above, the image capturing device 1 projects two slit beams (the first and second slit beams 71 and 72), captures an image of the document P with the slit beams projected thereon by use of the CCD image sensor 32, and thereafter captures an image of the document P with no slit beams projected thereon. Further, the image capturing device 1 extracts the loci of the slit beams by calculating the difference between the two pieces of image data, calculates the three-dimensional spatial position of each part of the loci of the slit beams according to the triangulation principle, and thereby determines the position L, the lean θ and the curvature φ(X) of the document P. Based on the estimation of the three-dimensional shape of the document P while regarding the shape of the locus 71a of the first slit beam as a cross-sectional form of the whole document P, the image capturing device 1 converts the image of the document P with no slit beams projected thereon (captured first) into image data representing the document P as if a flat document P were viewed from the front in the erect direction and only the document P were extracted, and records the image data in the card memory 55.

The user of the image capturing device 1 can check the results of shooting by letting the LCD 51 display the images stored in the card memory 55. The images stored in the card memory 55 can also be displayed or printed out by an external personal computer, for example, by removing the card memory 55 from the image capturing device 1 and attaching it to the external personal computer.

As above, with the image capturing device 1 of this embodiment, the user can obtain an image in which a flat document P is viewed from the front in the erect direction and only a part representing the document P has been extracted even when the user is shooting a curved document P from an oblique direction, by sliding the mode selection switch 59 to the "corrective imaging mode", setting the size input unit 56 to suit the size of the document P to be shot, and shooting the document P.

Further, the attitude of the document P is determined in this embodiment by analyzing limited parts of the image corresponding to the first and second slit beams 71 and 72, by which precise attitude detection of the document P can be performed with ease, without needing complicated image analysis. Therefore, various effects such as reduction of the time necessary for the processor 40 of the image capturing device 1 to execute the image analysis process, simplification of the processor 40, etc. can be achieved.

The in-plane displacement/rotation recognition process of S116, only requiring the recognition of the document P area, is irrelevant to color information. Therefore, by reducing the amount of processed information by the conversion of the plane image data into the binarized image data, the processing can be simplified and speeded up.

Meanwhile, in the rectangular area extraction process of S117 in which the converted image becomes easier to see as the resolution and the number of colors increase, the conversion of image is executed using the same resolution and the same number of colors as those of the slit-beamless image (realizing the maximum resolution and number of colors).

In this embodiment, the imaging lens 31, the CCD image sensor 32, the slit beam projection unit 20 and the camera control process (S111) executed by the processor 40 correspond to "image capturing means". The sequence in FIG. 5 between the difference extraction process and the document attitude calculation process (S112-S114) corresponds to "three-dimensional shape detection means". The plane conversion process (S115) in FIG. 5 corresponds to "plane conversion means". The in-plane displacement/rotation recognition process (S116) corresponds to "in-plane position detection means" and "in-plane angle detection means". The rectangular area extraction process (S117) corresponds to "first correction conversion means" and "second correction conversion means". The size input unit 56 corresponds to "range input means".

While a description has been given above of the first embodiment in accordance with the present invention, the present invention is not to be restricted by the particular illustrative embodiment but can be implemented in various other configurations.

For example, while both the in-plane displacement (in-plane position) and the in-plane rotation angle are detected and used for correction in the step S116 of FIG. 5 in this embodiment, the step S116 may also be configured to detect only one of the in-plane displacement and the in-plane rotation angle and use the detected data for the correction.

While the three-dimensional shape of the subject is detected in this embodiment by use of two slit beams (first and second slit beams 71 and 72) projected by the slit beam projection unit 20, the three-dimensional shape may also be detected using three or more slit beams, or using beams having particular radiation patterns instead of the slit beams.

While the image data to be stored in the card memory 55 (as final image data) is extracted in this embodiment in the size of the document P specified through the size input unit 56, the method for specifying the extracting range is not restricted to that of the embodiment. For example, the extracting range may also be set based on the document P area ("white" area) recognized from the binarized image data obtained by the conversion by the in-plane displacement/rotation recognition process of S116 in cases where no size input unit 56 is employed.

While the range of the final image data is set as an area having the size inputted through the size input unit 56 that is extracted from the area formed by the conversion of the four corner points of the slit-beamless image in S172 of the rectangular area extraction process (S117), the range (area) of the final image data is not restricted to such a range. For example, it is possible to leave out the size input unit 56 and set the range of the final image data as a rectangular range (area) containing the area formed by converting the four corner points of the slit-beamless image, without extracting the area having the size inputted through the size input unit 56 from the area set in S172 of the rectangular area extraction process (S117). Further, the range of the final image data may also be set to leave out the step S175 (as an area not rotated by the rotation angle DROT in S172), or to leave out the step S176 (as an area not vertically/horizontally shifted by the width direction displacement DH and the height direction displacement DV in S172).

Also in the plane conversion process of S115, in regard to the area formed by the points obtained by converting the four corner points of the slit-beamless image by use of the curvature φ(X), the lean θ and the position L, the area to be converted may be restricted by the size inputted through the size input unit 56 and the conversion may be performed to pixels contained in the restricted area. With such a configuration, the number of pixels of the plane image is reduced, by which the workload on the plane conversion process can be lightened, the workload on the in-plane displacement/rotation recognition process of S116 can also be lightened, and the whole processing by the processor 40 can be speeded up.

While the plane conversion process of S115 converts the slit-beamless image data into monochrome image data of ¼ resolution, the conversion in the process may also be executed without reducing the resolution from that of the slit-beamless image or without reducing the number of colors from three (directly processing the three pieces of color information).

However, by the conversion in the plane conversion process of S115 into a monochrome plane image of reduced resolution and reduced number of colors compared to the slit-beamless image as in the above embodiment, the workload on the process and the workload on the in-plane displacement/rotation recognition process (S116) using the plane image can be reduced in comparison with the case where the resolution and the number of colors are kept at those of the slit-beamless image, by which the total processing time of the processor 40 can be reduced.

The subject shot by the image capturing device 1 is not limited to a subject in a rectangular shape like the document P explained in the above embodiment. However, the above embodiment shooting a rectangular subject is simpler and better since the rotation angle calculation (S165) in the in-plane displacement/rotation recognition process of S116 requires a complicated shape judgment process (e.g. searching for a matching shape by pattern matching against multiple pieces of shape data) in such cases where the subject is not rectangular.

While the whole process from image capturing to data conversion is executed by only one device (the image capturing device 1) in the above embodiment, the steps S112-S117 may also be divided and executed by separate devices, by implementing data transfer from the image capturing device 1 to one or more external image processing devices like a personal computer.

In regard to the first embodiment of the present invention, the following modifications are possible.

In an embodiment of the present invention, the image processing device may further comprise first correction conversion means which converts the subject image into a corrected image in which the subject is viewed from a prescribed direction and placed substantially at the center based on the shape information and the position of the subject determined by the in-plane position detection means.

In an embodiment of the present invention, the image processing device may further comprise in-plane angle detection means which recognizes the subject area in the plane image and determines an angle of a prescribed side of the subject area with respect to a prescribed direction in the plane image.

In an embodiment of the present invention, the first correction conversion means may be configured to convert the subject image into a corrected image in which the subject is viewed from a prescribed direction and placed substantially at the center and a prescribed side of the subject is oriented in a prescribed direction in the image based on the shape information, the position of the subject determined by the in-plane position detection means, and the angle determined by the in-plane angle detection means.

With the above configuration, by setting the direction of the prescribed side of the subject in the corrected image so that characters in the document (subject) will be in parallel with the width direction of the corrected image, for example, the characters become easier to read and a corrected image that is easier to see can be obtained.

The first correction conversion means may be configured to execute the conversion into the corrected image only for an area in the subject image that represents the subject.

With the above configuration, a corrected image that is easier to see can be obtained since part of the subject image not representing the subject (e.g. the background) is not converted and the corrected image represents the subject only. Further, the total amount of image data can be reduced by deleting image data of the unnecessary part, by which the image processing workload for obtaining the data and using the data can be reduced.

When the subject image is a multicolor image, the first correction conversion means may be configured to make the conversion into the corrected image that has the same number of colors as pixels of the subject image.

With the above configuration, a corrected image that is easy to see can be obtained by the conversion thanks to the effective use of color information on the inputted subject image. Incidentally, the in-plane position detection means and the in-plane angle detection means for detecting the position and the angle of the subject in the image are capable of detecting these parameters without using the color information, and thus each of the detection means may be configured to process an image having a reduced number of pixel colors than the subject image, in order to reduce the amount of data to be processed.

In an embodiment of the present invention, the image processing device may further comprise image extraction means which extracts an image by cutting out a part of the corrected image representing the subject in a prescribed shape.

In an embodiment of the present invention, the image processing device may further comprise range input means for inputting a range specifying an area in the subject image to be converted by the plane conversion means. In this case, the plane conversion means converts the area in the subject image specified by the range inputted via the range input means into the plane image.

With the above configuration, the amount of image processing can be reduced by restricting the range of conversion, by which the time necessary for the image processing can be shortened or the image processing device can be simplified.

In an embodiment of the present invention, the subject is in a rectangular shape when its particular surface is viewed from an orthogonal direction.

Thanks to the rectangular shape of the subject, the in-plane position detection means and the in-plane angle detection means are allowed to recognize the subject area with ease, by use of a characteristic of the rectangular shape that it is formed by four sides crossing at right angles.

In an embodiment of the present invention, the plane conversion means may be configured to make the conversion into the plane image that has a lower resolution than the subject image.

With the above configuration, the number of pixels of the plane image can be reduced and the number of calculations in the conversion by the plane conversion means and in processes using the plane image can be reduced. Incidentally, since the resolution of the plane image affects the detection accuracy of the in-plane position detection means and the in-plane angle detection means, it is desirable that the resolution of the plane image be set as low as possible within an extent having no significant effect on the detection accuracy.

When the subject image is a multicolor image, the plane conversion means may be configured to make the conversion into the plane image that is made of monochrome pixels.

With the above configuration, the amount of information on the pixels of the plane image can be reduced and the workload on the conversion into the plane image by the plane conversion means and processes using the plane image can be reduced.

In an embodiment of the present invention, an image capturing device may comprise: the image processing device configured as above; projection means which projects pattern light; image capturing means which obtains the subject image by shooting the subject; and three-dimensional shape detection means which figures out shape information about three-dimensional shape of the subject based on an image obtained by letting the image capturing means shoot the subject on which the pattern light is projected. In this case, the subject image obtained by the image capturing means and the shape information figured out by the three-dimensional shape detection means are inputted to the image processing device.

In an embodiment of the present invention, an image capturing device may comprise: the image processing device configured as above; projection means which projects pattern light; image capturing means which obtains the subject image by shooting the subject and inputs the subject image to the image processing device; three-dimensional shape detection means which figures out shape information about three-dimensional shape of the subject based on an image obtained by letting the image capturing means shoot the subject on which the pattern light is projected and inputs the shape information to the image processing device; display means which displays the corrected image obtained by the first correction conversion means; input means for inputting a display status modification parameter for modifying display status of the corrected image displayed on the display means; and modification means which modifies the display status of the corrected image displayed on the display means based on the display status modification parameter inputted through the input means.

In an embodiment of the present invention, an image capturing device may comprise: the image processing device configured as above; projection means which projects pattern light; image capturing means which obtains the subject image by shooting the subject and inputs the subject image to the image processing device; three-dimensional shape detection means which figures out shape information about three-dimensional shape of the subject based on an image obtained by letting the image capturing means shoot the subject on which the pattern light is projected and inputs the shape information to the image processing device; display means which displays the corrected image obtained by the second correction conversion means; input means for inputting a display status modification parameter for modifying display status of the corrected image displayed on the display means; and modification means which modifies the display status of the corrected image displayed on the display means based on the display status modification parameter inputted through the input means.

Second Embodiment

In the following, a second embodiment in accordance with the present invention will be described. Since images are converted according to a preset program in the conventional image conversion technique (described in Japanese Patent Provisional Publication No. 2002-334327), even if the image obtained by the conversion is an image exactly planned by the program, it has been impossible for some users to edit the image according to the user's requests (enlarging and extracting a particular part of a document, etc.). The second embodiment is configured to be also capable of resolving such a problem. By the second embodiment described below, an image capturing device, capable of automatically converting an image of a subject shot from an oblique direction into an image of the subject shot from the front and thereafter editing the image into an image according to the user's intention, is realized.

In figures regarding the second embodiment which will be explained below, the same reference characters as those of the first embodiment will be used for components equivalent to those of the first embodiment. FIG. 19(a) is a perspective view showing the external appearance of an image capturing device 1B in accordance with the second embodiment of the present invention. FIG. 19(b) is a rear view of the image capturing device 1B. FIG. 19(c) is an enlarged view of an operation button 57. FIG. 20 is a schematic sectional view of the image capturing device 1B, in which a document P being shot by the image capturing device 1B is also shown.

The image capturing device 1B has the ordinary function of "normal mode" and the function of "corrective imaging mode". In the normal mode, the image capturing device 1B functions as a normal, so-called digital camera. In the "corrective imaging mode", the image capturing device 1B functions as a device capable of automatically generating an image of the document P as the subject shot from the front even when the document P is shot from an oblique direction, while editing the corrected image according to the user's intention.

The image capturing device 1B includes a body case 10 in a box shape, an imaging lens 31 provided at the front of the body case 10, a window 29 formed under the imaging lens 31, and a release button 52 and a mode selection switch 59 placed on top of the body case 10. The image capturing device 1B further includes an LCD (Liquid Crystal Display) 51, a size input unit 56, an operation button 57 and an editing parameter selection button 65 which are provided on the back of the body case 10, a finder 53 provided to penetrate the body case 10 from its back to front, and a decision button 58 formed on a side face of the body case.

The operation button 57 is a button for editing an image being displayed on the LCD 51. As shown in FIG. 19(c), the operation button 57 is composed of eight independent buttons 57a-57h arranged in a circular outer shape. Specifically, the operation button 57 includes a counterclockwise rotation button 57a for rotating the image being displayed on the LCD 51 counterclockwise, an upward shift button 57b for shifting the image upward, a clockwise rotation button 57c for rotating the image clockwise, a leftward shift button 57d for shifting the image leftward, a rightward shift button 57e for shifting the image rightward, a scale-down button 57f for scaling down the image, a downward shift button 57g for shifting the image downward, and a scale-up button 57h for scaling up the image.

As shown in FIG. 20, a CCD image sensor 32 is placed at the rear of the imaging lens 31 (inside the image capturing device 1B) and a slit beam projection unit 20 is placed underneath the imaging lens 31. The image capturing device 1B further includes a processor 40 and a memory card 55. Incidentally, the finder 53 (not connected to the processor 40) and the decision button 58 (formed on a side face of the body case) are not shown in FIG. 20.

The imaging lens 31 is formed by a plurality of lenses. By the autofocus function of the image capturing device 1B, the focal length and aperture are adjusted automatically in the imaging lens 31 and light from the outside is focused on the CCD image sensor 32.

The CCD image sensor 32 includes a matrix-like array of photoelectric transducers like CCDs (Charge Coupled Devices). The CCD image sensor 32 generates signals corresponding to colors and intensities of light of the image forming on its surface, converts the signals into digital data, and outputs the digital data to the processor 40. Data outputted by one CCD is pixel data corresponding to one pixel of the image. A piece of image data includes the same number of pixel data as the CCDs.

The CCD image sensor 32 in this embodiment generates image data including 1200 pixels (in the width direction)× 1600 pixels (in the height direction). A width direction position ccdx and a height direction position ccdy as coordinates in the image data are represented by the numbers of pixels. A pixel at the upper left corner of the image is defined as the origin (position "0"). Therefore, the width direction position ccdx ranges between "0" and "1199" while the height direction position ccdy ranges between "0" and "1599". The interval between the CCD pixels corresponds to a resolution of 100 dpi (dot per inch) on the document. The image data includes pixel information about each pixel, represented by 256 steps of luminance of red (R), green (G) and blue (B).

The release button 52, made of a push button switch, is connected to the processor 40, and the pressing of the release button 52 by the user is detected by the processor 40.

The mode selection switch 59 is implemented by a slide switch that is switchable between two positions, for example. The two positions of the mode selection switch 59 have been assigned by the processor 40 to the two functions of the image capturing device 1B so that one will be recognized as the "normal mode" and the other as the "corrective imaging mode". The "normal mode" is a mode in which image data is directly generated from an image of the document P being shot, while the "corrective imaging mode" is a mode in which the image data is corrected into image data representing the document P shot from the front when the document P is shot from an oblique direction.

The memory card 55, implemented by a nonvolatile rewritable memory, is attachable and detachable to/from the body case 10.

The LCD 51, including a liquid crystal display for displaying images, displays images in response to image signals supplied from the processor 40. The processor 40 sends a variety of image signals to the LCD 51 depending on the situation, such as image signals for displaying real-time images captured by the CCD image sensor 32, image signals for displaying images stored in the memory card 55, image signals for displaying characters indicating the settings of the device, etc.

The size input unit 56, including a slide switch that is switchable among a plurality of positions, is connected to the processor 40. The size of the document P to be shot is judged by the processor 40 according to the position of the size input unit 56 set by the user. For example, the processor 40 recognizes the far left position of the switch of the size input unit 56 operated by the user as "no designation", the next position as "A4 size", and the far right position as "A3 size".

The editing parameter selection button 65 is a button for selecting a particular editing parameter from a plurality of editing parameters stored in an editing parameter storage unit 439 which will be explained later. The editing parameter selection button 65, made of a push button switch, is connected to the processor 40, and the pressing of the editing parameter selection button 65 by the user is detected by the processor 40. When a particular editing parameter is selected by the user by pressing the editing parameter selection button 65, the image displayed on the LCD 51 is edited according to the selected editing parameter.

Each button 57a-57h of the operation button 57, made of a push button switch, is connected to the processor 40, and the pressing of each button 57a-57h by the user is detected by the processor 40. An image shifting distance or scale-up/scale-down ratio corresponding to one pressing of each button 57a-57h has been preset, and the total image shifting distance or scale-up/scale-down ratio is set depending on the number of times each button 57a-57h is pressed.

The finder 53, including an optical lens, is configured so that the user looking into the finder 53 from the rear of the image capturing device 1B can view a range substantially equal to the range of the image formed by the imaging lens 31 on the CCD image sensor 32.

The decision button 58 is a button pressed for deciding whether to save the image being displayed on the LCD 51. The decision button 58, made of a push button switch, is connected to the processor 40, and the pressing of the decision button 58 by the user is detected by the processor 40. By pressing the decision button 53 with an image being displayed on the LCD 51, the user can save the image exactly in the state displayed on the LCD 51.

Figure 22:
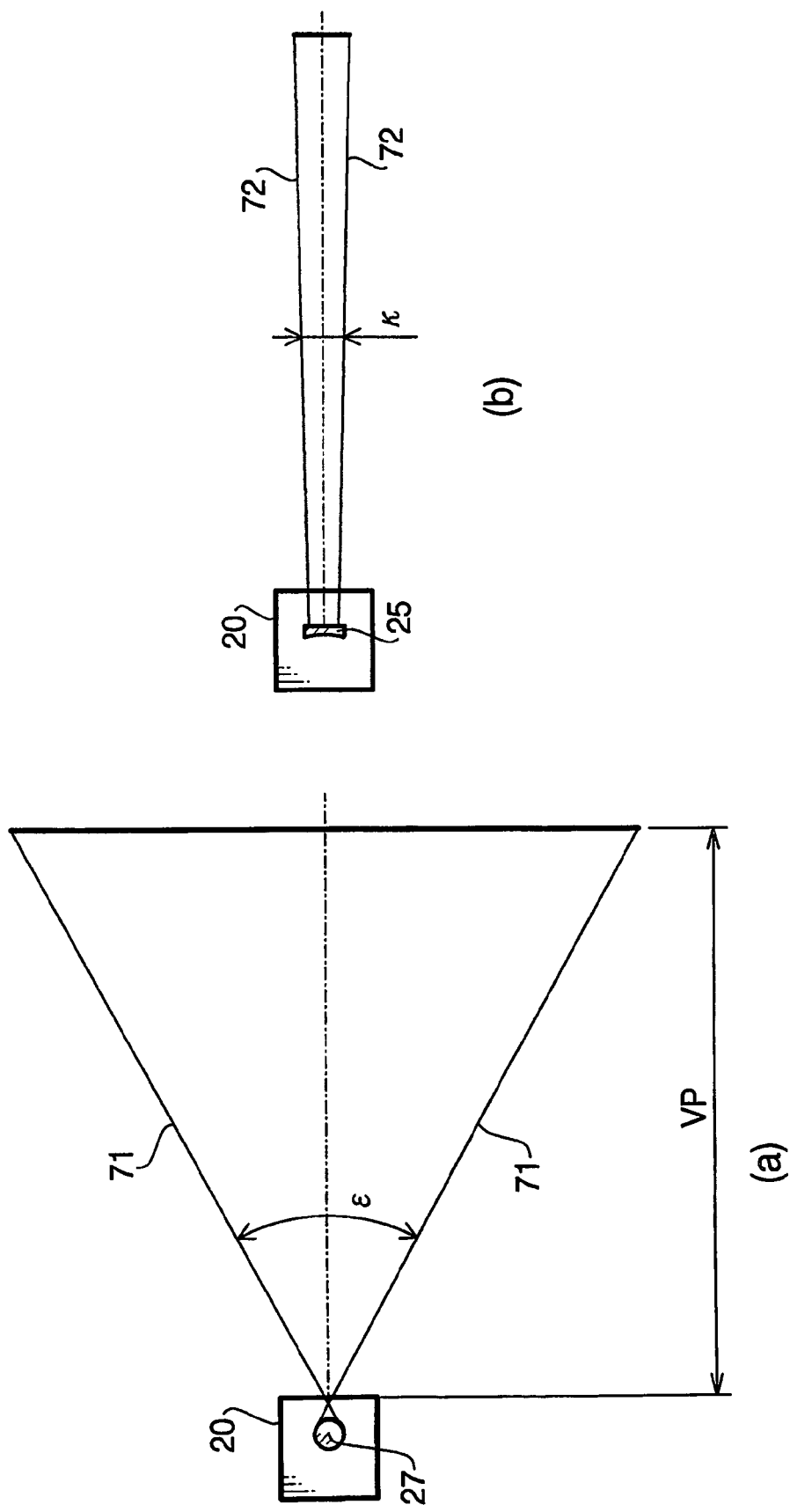

The slit beam projection unit 20 will be explained below referring to FIGS. 21, 22(*a*) and 22(*c*). FIG. 21 is a schematic diagram showing the composition of the slit beam projection unit 20. FIGS. 22(*a*) and 22(*b*) are schematic diagrams for explaining the angular widths of the slit beams. The slit beam projection unit 20 includes a laser diode 21, a collimator lens 22, an aperture 23, a transparent flat plate 24, a cylindrical lens 25, a reflecting mirror 26 and a rod lens 27.

The laser diode 21 emits a red laser beam. The ON-OFF switching of the laser beam emission by the laser diode 21 is controlled according to instructions outputted by the processor 40. The output level (rated power) of the laser diode 21 is adjusted so that a prescribed output level (e.g. 1 mW) can be achieved at a position just after the aperture 23 relative to the maximum rated power (e.g. 5 mW), in consideration of individual differences in the spread angle of the laser beam.

The collimator lens 22 condenses the laser beam emitted by the laser diode 21 so that the beam will focus at a point a reference distance VP (e.g. 330 mm) away from the slit beam projection unit 20.

The aperture 23 is formed by a plate having a rectangular opening part. The laser beam from the collimator lens 22 passing through the opening part of the aperture 23 is shaped into a beam having a rectangular cross section.

The transparent flat plate 24 is composed of a transparent flat plate made of pure glass material, for example. The back of the transparent flat plate 24 is provided with an AR coat (antireflection coating). The transparent flat plate 24 is tilted toward the front of the body case 10 by a prescribed angle β (e.g. 33 degrees) with respect to a plane orthogonal to the optical axis of the laser beam from the aperture 23. The transparent flat plate 24 reflects approximately 5% (approximately 50 μW) of the power of the laser beam from the aperture 23 by its surface while transmitting approximately 95% (approximately 950 μW). Incidentally, the direction into which the laser beam is reflected by the transparent flat plate 24 (frontward from the image capturing device 1B and 33 degrees upward relative to the horizontal plane) will hereinafter be referred to as a "second direction".

Thanks to the AR coat provided on the back of the transparent flat plate 24, reflection occurring when the laser beam entering the transparent flat plate 24 emerges therefrom is suppressed, by which loss of the laser beam inside the transparent flat plate 24 is reduced. Further, by setting the ratio of the laser beam reflected by the transparent flat plate 24 at a surface reflectance 5% which is determined by the refractive index of the material of the transparent flat plate 24, a process for forming a vapor-deposited metal film on the reflecting surface (necessary when the component is implemented by an ordinary half mirror) can be left out.

The reflecting mirror 26 includes a member (mirror, etc.) totally reflecting the laser beam. The reflecting mirror 26 is placed on the downstream side of the transparent flat plate 24 transmitting the laser beam, while being tilted toward the front of the body case 10 by 45 degrees. The reflecting mirror 26 totally reflects the laser beam and changes its optical path direction by 90 degrees. The direction into which the laser beam is reflected by the reflecting mirror 26 (frontward from the image capturing device 1B and at 0 degrees relative to the horizontal plane) will hereinafter be referred to as a "first direction".

The rod lens 27, formed by a lens of a cylindrical shape having a short positive focal length, is placed on the downstream side of the reflecting mirror 26 reflecting the laser beam so that the axis of the cylindrical shape will be in the vertical direction. Since the focal length of the rod lens 27 is short, the laser beam passing through the rod lens 27 spreads after crossing a focal point in the vicinity of the rod lens 27 and thereafter travels in the first direction as a spreading slit beam having a prescribed spread angle ϵ (e.g. 48 degrees). Incidentally, the slit beam emerging from the rod lens 27 will hereinafter be referred to as a "first slit beam 71".

The cylindrical lens 25, having a concave shape on its one side to have a negative focal length, is placed on the downstream side of the transparent flat plate 24 reflecting the laser beam so that its lens surface will be orthogonal to the second direction. The cylindrical lens 25 receives the laser beam incident from the transparent flat plate 24 and outputs the laser beam as a slit beam having a spread angle κ (see FIG. 22(b)). The slit beam emerging from the cylindrical lens 25 will hereinafter be referred to as a "second slit beam 72". Specifically, the spread angle ϵ of the second slit beam 72 is set so that the ratio between the spread angle ϵ of the first slit beam 71 and the spread angle κ of the second slit beam 72 will be substantially equal to the power ratio between the laser beams split by the transparent flat plate 24. Therefore, the spread angle κ of the second slit beam 72 is 5% of the spread angle ϵ (κ=2.4 degrees).

With the configuration described above, the slit beam projection unit 20 lets the laser diode 21 emit the laser beam according to instructions from the processor 40 and thereby outputs the first and second slit beams 71 and 72 in the first and second directions respectively through a window 29 of the body case 10 formed under the imaging lens 31.

In the slit beam projection unit 20 configured as above, the power of the second slit beam 72 relative to the total power outputted by the laser diode 21 is as small as approximately 5% while the power of the first slit beam 71 split by the transparent flat plate 24 is 95%. However, the power of the first slit beam 71 (spread angle: 48 degrees) per unit angular width (approximately 20 μW/degree) is substantially equal to that (approximately 21 μW/degree) of the second slit beam 72 (spread angle: 2.4 degrees). When the document P is white paper that is placed the reference distance VP (330 mm) away from the slit beam projection unit 20, the illumination intensity achieved by the first and second slit beams 71 and 72 is approximately 1260 lux. Therefore, a sufficient difference in luminance can be secured between the document P and the loci of the slit beams even in places where the illumination intensity is 500-1000 lux (average room illumination) and the locus image of the slit beams can be extracted reliably by a difference extraction program 422 which will be explained later.

FIG. 23 is a block diagram showing the electric configuration of the image capturing device 1B. The processor 40 installed in the image capturing device 1B includes a CPU 41, a ROM 42 and a RAM 43.

The CPU 41 executes various processes according to programs stored in the ROM 42 while using the RAM 43. The processes executed by the CPU 41 include the detection of the pressing of the release button 52, the reading of image data from the CCD image sensor 32, the writing of image data into the memory card 55, the detection of the status of the mode selection switch 59, the switching of the slit beam emission from the slit beam projection unit 20, the detection of the pressing of the operation button 57 and the decision button 58, etc.

The ROM 42 stores a camera control program 421, a difference extraction program 422, a triangulation calculation program 423, a document attitude calculation program 424, a plane conversion program 425, an in-plane displacement/rotation recognition program 426, a rectangular area extraction program 427 and an editing program 428.

The camera control program 421 is a program for the overall control of the image capturing device 1B, including a process shown in a flow chart of FIG. 24 (details will be explained later). The difference extraction program 422 is a program for generating image data in which loci of the slit beams are extracted from the image of the document P onto which the slit beams are projected. The triangulation calculation program 423 is a program for calculating a three-dimensional spatial position for each pixel of the loci of the slit beams extracted by the difference extraction program 422.

The document attitude calculation program 424 is a program for estimating the three-dimensional shape of the document P based on the three-dimensional spatial positions of the loci 71a and 72a of the first and second slit beams. The plane conversion program 425 is a program for converting image data stored in a slit-beamless image storage unit 432 into an image of the document P shot from the front based on the position and attitude of the document P. The in-plane displacement/rotation recognition program 426 is a program for detecting a displacement and a rotation angle of the document P in the image data. The rectangular area extraction program 427 is a program for extracting an area in the image data in which the document P is captured (an area representing the document P). The editing program 428 is a program for generating an edited image according to the user's operation to the operation button 57.

In the RAM 43, a slit-beamed image storage unit 431, the slit-beamless image storage unit 432, a difference image storage unit 433, a triangulation calculation result storage unit 434, a plane conversion resultant image storage unit 435, an in-plane displacement/rotation recognition result storage unit 436, a rectangular area extraction resultant image storage unit 437, a working area 438 and an editing parameter storage unit 439 are reserved as storage areas.

The slit-beamed image storage unit 431 and the slit-beamless image storage unit 432 store image data of a slit-beamed image and a slit-beamless image which are supplied from the CCD image sensor 32, respectively. The triangulation calculation result storage unit 434 stores the calculation result of the position of each point of the slit-beamed image. The document attitude calculation result storage unit 435 stores image data converted by the plane conversion program 425. The in-plane displacement/rotation recognition result storage unit 436 stores the result of an in-plane displacement/rotation recognition process which will be explained later. The rectangular area extraction resultant image storage unit 437 stores the result of a rectangular area extraction process which will be explained later. The working area 438 stores data that are temporarily used for the calculations by the CPU 41. The editing parameter storage unit 439 stores operation status of the buttons 57a-57h operated by the user for image editing of the edited image edited by the editing program 428, as the editing parameters.

In the following, the operation of the image capturing device 1B (configured as above) after the release button 52 is pressed by the user will be explained referring to FIGS. 24 and 25(a). FIG. 24 is a flow chart showing a process executed by the processor 40 of the image capturing device 1B. FIG. 25(a) shows a slit-beamed image obtained by shooting a document P on which the slit beams are projected.

First, whether the mode selection switch 59 is at the position of the "corrective imaging mode" or not is judged (S2101). If the mode selection switch 59 is not at the "corrective imaging mode" (S2101: NO), image data is obtained in the "normal mode" (S3011). Specifically, the emission instruction issued to the laser diode 21 of the slit beam projection unit 20 is stopped and image data is obtained from the CCD image sensor 32 with no emission of the first and second slit beams 71 and 72. The obtained image data is stored in the card memory 55. Thereafter, the process of FIG. 24 is ended.

Figure 25:
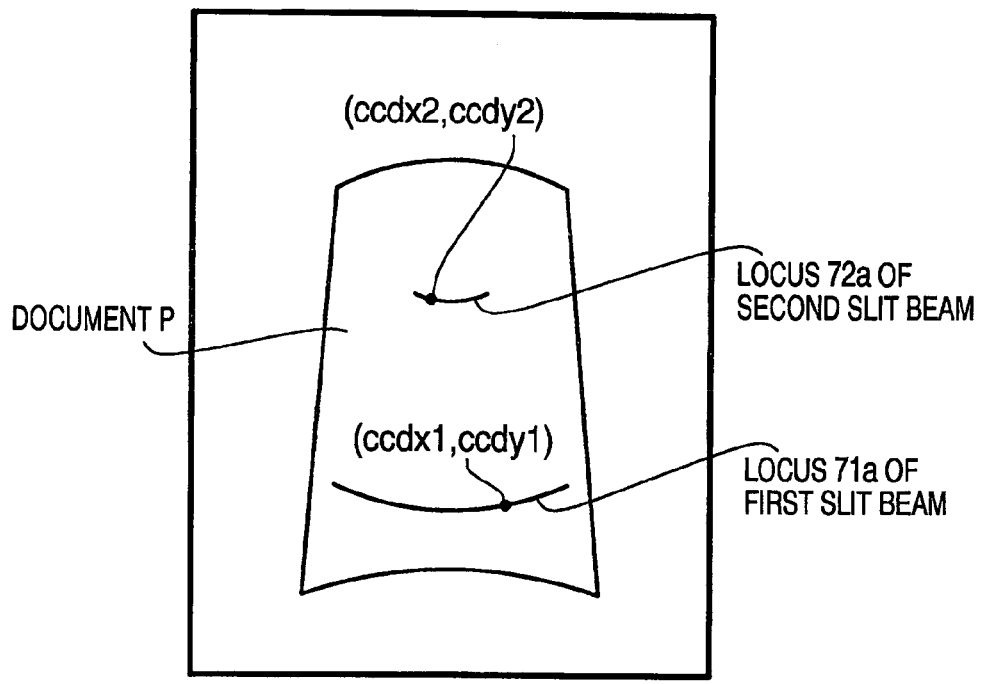
Figure 25:
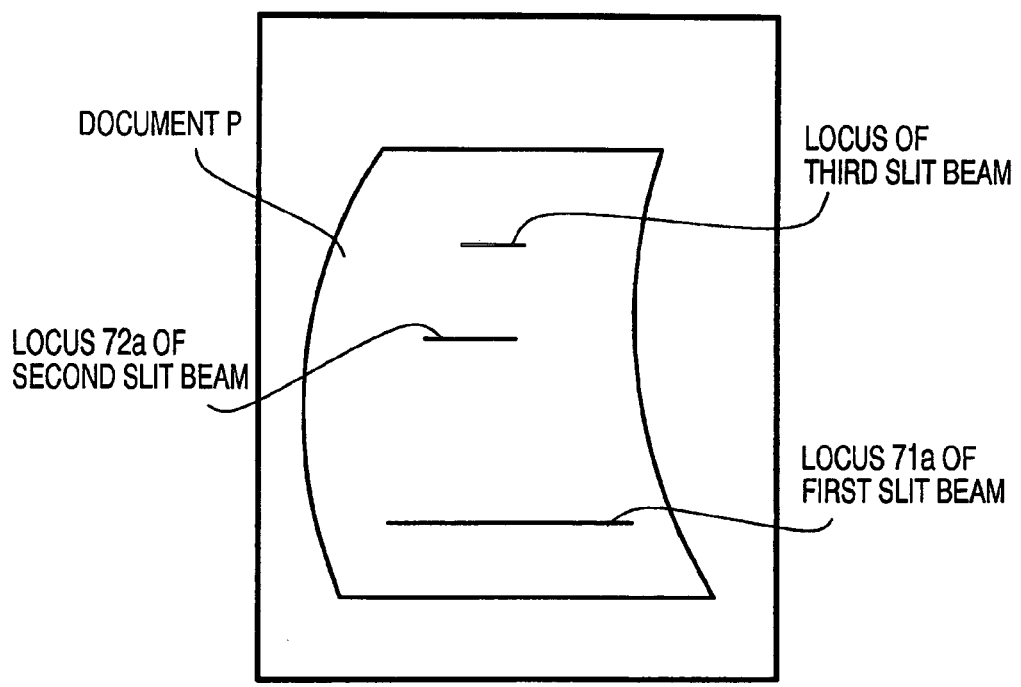

Meanwhile, if the mode selection switch 59 is at the position of the "corrective imaging mode" (S2101: YES), a camera control process for obtaining a slit-beamed image and a slit-beamless image is executed (S2102). Specifically, an instruction for the emission by the laser diode 21 is issued to the slit beam projection unit 20 and the first and second slit beams 71 and 72 are outputted from the slit beam projection unit 20. In this state, the slit-beamed image, in which the document P on which the first and second slit beams 71 and 72 are projected as shown in FIG. 25($a$) is shot, is obtained from the CCD image sensor 32. The obtained image data is stored in the slit-beamed image storage unit 431 of the RAM 43. Subsequently, an instruction for stopping the emission by the laser diode 21 is issued to the slit beam projection unit 20. In this state without the first and second slit beams 71 and 72 outputted from the slit beam projection unit 20, the slit-beamless image, in which the document P on which no first and second slit beams 71 and 72 are projected is shot, is obtained from the CCD image sensor 32. The obtained image data is stored in the slit-beamless image storage unit 432.

After the slit-beamed image and the slit-beamless image have been obtained, a three-dimensional measurement & plane conversion process is executed (S2103). In this process, the position L, the lean θ and the curvature φ(X) are determined as shape information on the document P, based on the obtained slit-beamed image and slit-beamless image. Further, based on the shape information, the slit-beamless image is converted into a plane image in which only the document P viewed from the front in the erect direction is positioned at the center of the image. In this process, the plane image is converted into an image having a resolution lower than that of the slit-beamless image. Therefore, the number of calculations necessary for the conversion into the plane image can be reduced and the process for the conversion can be speeded up. The plane image generated as above is displayed on the LCD 51 (S2104).

When the user viewing the plane image displayed on the LCD 51 hopes to edit the plane image, that is, while the decision button 58 is not pressed by the user (S2105: NO), operation status of each button 57$a$-57$h$ by the user is temporarily stored in the working area 438 (S2106). According to the operation status of each button 57$a$-57$h$, the editing program 428 for performing an editing process (S2107) is executed, by which the user can edit the plane image being displayed on the LCD 51.

An edited image, which has been edited in the editing process (S2107), is displayed on the LCD 51 (S2108). When the user viewing the edited image further hopes to edit the edited image, the decision button 58 is not pressed by the user (S2105: NO), by which the sequence from S2106 is repeated.

On the other hand, when the user hopes to save the image displayed on the LCD 51 and presses the decision button 58 (S2105: YES), the image displayed on the LCD 51 is stored in the card memory 55 (S2109). In the storage in the memory card 55, the image is stored in a resolution higher than the resolution set before. Therefore, the image stored in the memory card 55 can be outputted as a sharp image. Incidentally, the plane image generated by the three-dimensional measurement & plane conversion process (S2103) may be deleted when the edited image is stored in the memory card 55, by which the memory can be utilized efficiently.

When the plane image or the edited image is stored in the memory card 55 (S2109), the operation status of the buttons 57$a$-57$h$ which has been temporarily stored in the working area is stored in the editing parameter storage unit 439 as an editing parameter regarding the edited image stored in the memory card 55 (S3010). By the storage of the editing parameter, when the user hopes to edit a similar image (shot in the same attitude as the edited image edited this time) in the same way as this time, for example, the editing of the similar image in the same way as this time can be executed based on the editing parameter stored in the editing parameter storage unit 439 without the need of newly operating the buttons 57$a$-57$h$, by which the operability of the device is enhanced. After the step S3010 is finished, the process of FIG. 24 is ended.

Figure 28:
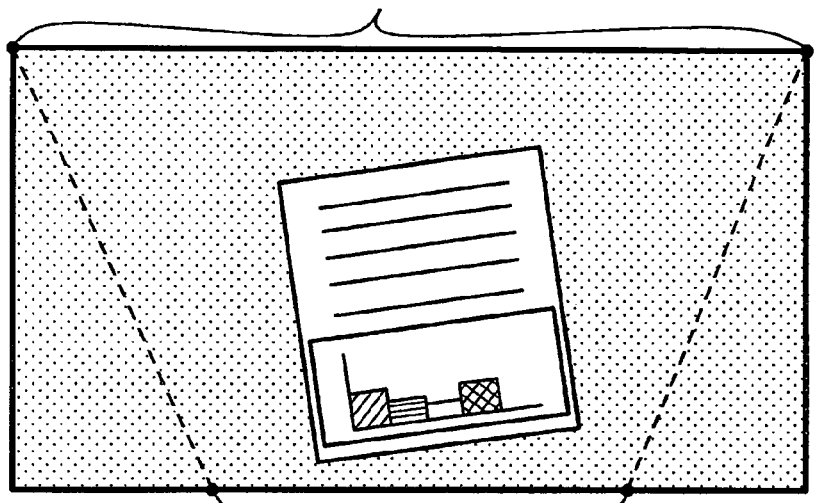
Figure 28:
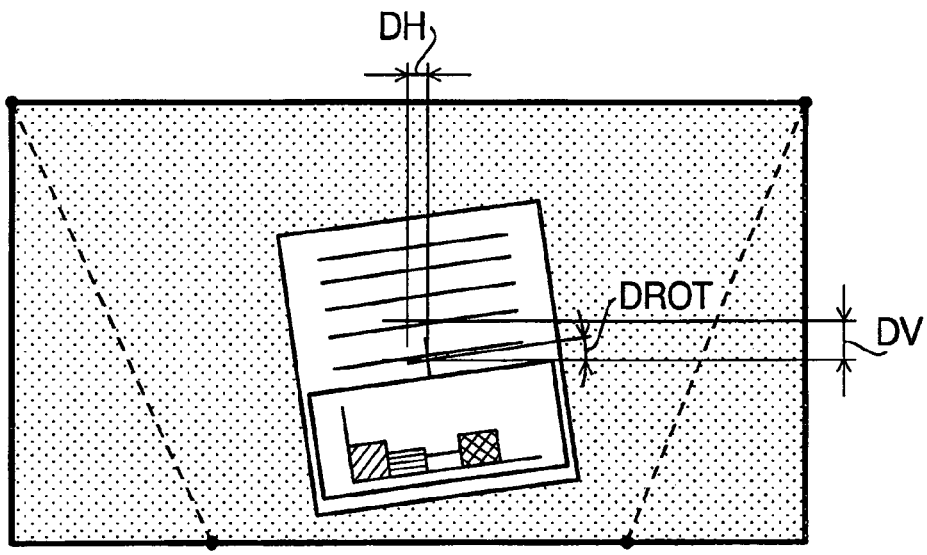
Figure 28:
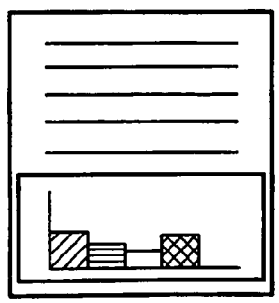

Next, the three-dimensional measurement & plane conversion process (S2103 in FIG. 24) will be explained in detail referring to FIGS. 26, 27($a$), 27($b$) and 28($a$)-28($c$). FIG. 26 is a flow chart showing the three-dimensional measurement & plane conversion process. FIG. 27($a$) is a table schematically showing the data stored in the difference image storage unit. FIG. 27($b$) is a table schematically showing the data stored in the triangulation calculation result storage unit. FIGS. 28($a$)-28($c$) are schematic diagrams showing image data obtained by image processing.

At the start of the process of FIG. 26, a difference extraction process is executed (S2801). In the difference extraction process, positional information on the loci 71$a$ and 72$a$ of the first and second slit beams captured in the slit-beamed image is obtained by the difference extraction program 422 shown in FIG. 23.

Specifically, image data representing the difference between the slit-beamed image and the slit-beamless image (i.e. the loci 71$a$ and 72$a$ of the first and second slit beams projected on the document P) is generated. Subsequently, in the lower half (height direction position ccdy: "800"-"1599") of the generated image data, the position of a pixel having the maximum luminance level among a line of pixels arranged in the height direction is determined at a plurality of positions in the width direction (every 20 pixels between the width direction positions ccdx "0" and "1199"). An "index idx" as a number assigned in order of the determination of the position, the width direction position ccdx at which the position of the maximum-luminance pixel has been determined, and the height direction position ccdy of the maximum-luminance pixel are stored in the difference image storage unit 433 shown in FIG. 23 as slit beam image position data 433$a$ as shown in FIG. 27($a$).

Incidentally, the position of the maximum-luminance pixel equals a position where an approximated curve connecting the luminance levels of the pixels arranged in the height direction takes on its maximum value. When the luminance level at the maximum-luminance position is less than a prescribed level, the locus 71$a$ of the first slit beam is judged to be absent and the data are not stored as the slit beam image position data 433$a$. Subsequently, an "extracted pixel number N", as the total number of pixels extracted as the positional information on the locus 71$a$ of the first slit beam, is set at the maximum value of the index idx.

Meanwhile, as positional information on the locus 72$a$ of the second slit beam, in the upper half (height direction position ccdy: "0"-"799") of the image data generated as the difference between the slit-beamed image and the slit-beamless image, the position of a pixel having the maximum luminance level among a line of pixels arranged in the height direction is determined at the center (ccdx="599") of the width direction position ccdx. The determined position is stored in the difference image storage unit 433 in the same format as the slit beam image position data 433$a$, as the positional information on the locus 72$a$ of the second slit beam. Similarly to the positional information on the locus 71$a$ of the first slit beam, when the luminance level at the maximum-luminance position is less than a prescribed level, the locus 72a of the second slit beam is judged to be absent and the position is not stored in the difference image storage unit 433.

Subsequently, a triangulation calculation process is executed (S2802). In the triangulation calculation process, a three-dimensional spatial position in regard to each index idx is determined by the triangulation calculation program 423 shown in FIG. 23 for each of the points specified by the slit beam image position data 433a stored in the difference image storage unit 433. An X value, Y value and Z value as the three-dimensional coordinates regarding each index idx (calculation results) are stored in the triangulation calculation result storage unit 434 shown in FIG. 23 as slit beam three-dimensional position data 434a as shown in FIG. 27(b).

Subsequently, a document attitude calculation process is executed (S2803). In the document attitude calculation process, a three-dimensional spatial position (0, 0, L), a lean θ and a curvature φ of the document P are determined by the document attitude calculation program 424 shown in FIG. 23 by use of the slit beam three-dimensional position data 434a stored in the triangulation calculation result storage unit 434.

Subsequently, a plane conversion process is executed (S2804). In the plane conversion process, the slit-beamless image stored in the slit-beamless image storage unit 432 is converted into a plane image of the document P observed substantially from the orthogonal direction (an image in which the document P is in a rectangular shape as shown in FIG. 28(a), for example) by the plane conversion program 425 shown in FIG. 23. The obtained plane image is stored in the plane conversion resultant image storage unit 435 shown in FIG. 23.

Subsequently, an in-plane displacement/rotation recognition process is executed (S2805). In the in-plane displacement/rotation recognition process, an image area in the plane image representing the document P is recognized by the in-plane displacement/rotation recognition program 426 shown in FIG. 23, and a width direction displacement DH of the center of the image area of the document P from the center of the plane image, a height direction displacement DV of the center of the image area from the center of the plane image, and a rotation angle DROT of a prescribed side of the document P image area in the plane image are obtained as shown in FIG. 28(b). The results are stored in the in-plane displacement/rotation recognition result storage unit 436 shown in FIG. 23.

Subsequently, a rectangular area extraction process is executed (S2806). In the rectangular area extraction process, the slit-beamless image stored in the slit-beamless image storage unit 432 is converted into a plane image in which only the document P viewed from the front in the erect direction is positioned at the center of the image as shown in FIG. 28(c) by the rectangular area extraction program 427 shown in FIG. 23. The obtained image is stored in the rectangular area extraction resultant image storage unit 437 shown in FIG. 23. After the above steps are is finished, the three-dimensional measurement & plane conversion process (S2163) is ended.

Incidentally, the triangulation calculation process (S2802), the document attitude calculation process (S2803), the plane conversion process (S2804), the in-plane displacement/rotation recognition process (S2805) and the rectangular area extraction process (S2806) described above are identical with those in the first embodiment, and thus detailed explanation thereof is omitted here.

Next, the editing process (S2107 in FIG. 6) will be explained referring to FIG. 29. FIG. 29 is a flow chart showing the editing process. At the start of the editing process, whether the operation button 57 (each button 57a-57h) has been pressed or not is judged (S3061). In other words, whether or not operation status of the operation button 57 has been stored in the working area 438 in S2106 of FIG. 24 is judged. If the operation button 57 has been operated (S3061: YES), a shift amount, a rotation angle or a magnification is determined based on the output from the operation button 57 (S3062). Subsequently, the plane image displayed on the LCD 51 (the image stored in the rectangular area extraction resultant image storage unit 437) is shifted by the determined shift amount, rotated by the determined rotation angle, or set in the determined magnification, by which the edited image is generated (S3063). Thereafter, the process of FIG. 29 is ended.

On the other hand, if the operation button 57 has not been operated (S3061: NO), whether the editing parameter selection button 65 has been pressed or not is judged (S3064). If the editing parameter selection button 65 has been pressed (S3064: YES), the plane image displayed on the LCD 51 (the image stored in the rectangular area extraction resultant image storage unit 437) is shifted, rotated or set in a particular magnification according to the latest editing parameter stored in the editing parameter storage unit 439, by which the edited image is generated (S3065). By this sequence, the user can generate an edited image similar to the previous one only by performing a simple operation of pressing the editing parameter selection button 65, without the need of operating the buttons 57a-57h.

After the edited image is generated, the latest editing parameter is changed to the previous editing parameter (S3066). In other words, on each pressing of the editing parameter selection button 65, the plane image displayed on the LCD 51 is edited according to a one-step previous editing parameter. Thereafter, the process of FIG. 29 is ended.

FIGS. 30(a)-30(h) are schematic diagrams showing how to operate the operation button 57. In the figures, the status of the document P before the editing is indicated by two-dot chain lines while that after the editing is indicated by solid lines.

Figure 30:
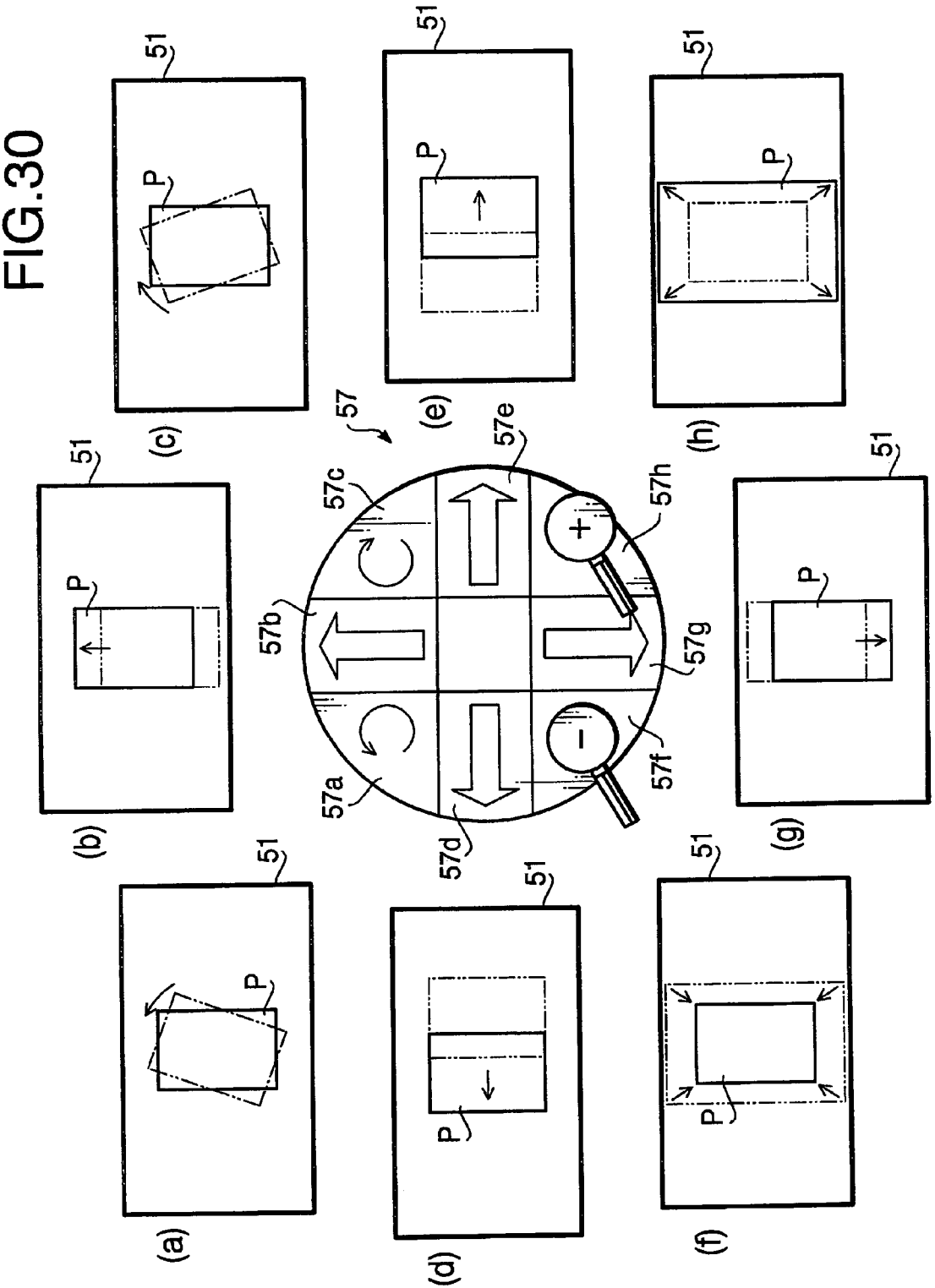

When the editing shown in FIG. 30(a) is necessary, the user presses the counterclockwise rotation button 57a until the document P indicated by two-dot chain lines rotates to the position indicated by solid lines. When the editing shown in FIG. 30(b) is necessary, the user presses the upward shift button 57b until the document P indicated by two-dot chain lines moves to the position indicated by solid lines. When the editing shown in FIG. 30(c) is necessary, the user presses the clockwise rotation button 57c until the document P indicated by two-dot chain lines rotates to the position indicated by solid lines. When the editing shown in FIG. 30(d) is necessary, the user presses the leftward shift button 57d until the document P indicated by two-dot chain lines moves to the position indicated by solid lines.

When the editing shown in FIG. 30(e) is necessary, the user presses the rightward shift button 57e until the document P indicated by two-dot chain lines moves to the position indicated by solid lines. When the editing shown in FIG. 30(f) is necessary, the user presses the scale-down button 57f until the document P indicated by two-dot chain lines shrinks to the size indicated by solid lines. When the editing shown in FIG. 30(g) is necessary, the user presses the downward shift button 57g until the document P indicated by two-dot chain lines moves to the position indicated by solid lines. When the editing shown in FIG. 30(h) is necessary, the user presses the scale-up button 57h until the document P indicated by two-dot chain lines expands to the size indicated by solid lines.

FIGS. 31(a)-31(d) are schematic diagrams showing how to operate the operation button 57 for image editing in order to obtain an image in which a particular part (graph part) of the document P has been enlarged.

Figure 31:
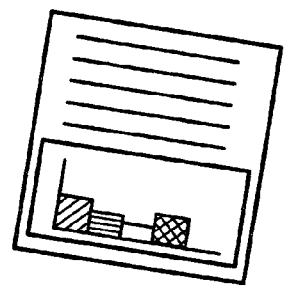
Figure 31:
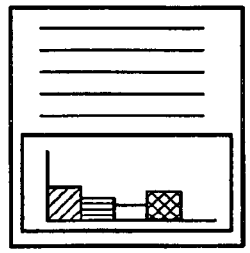
Figure 31:
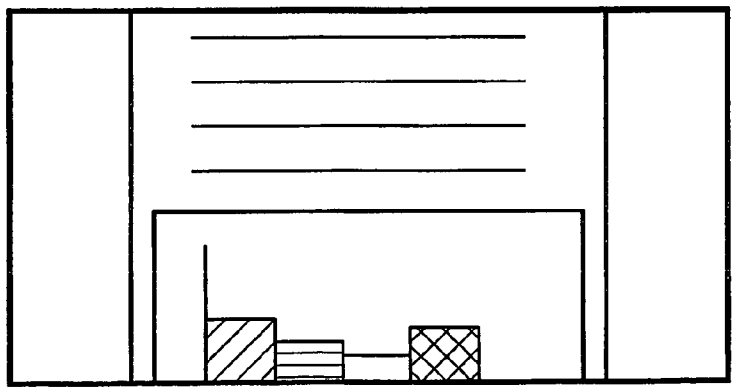
Figure 31:
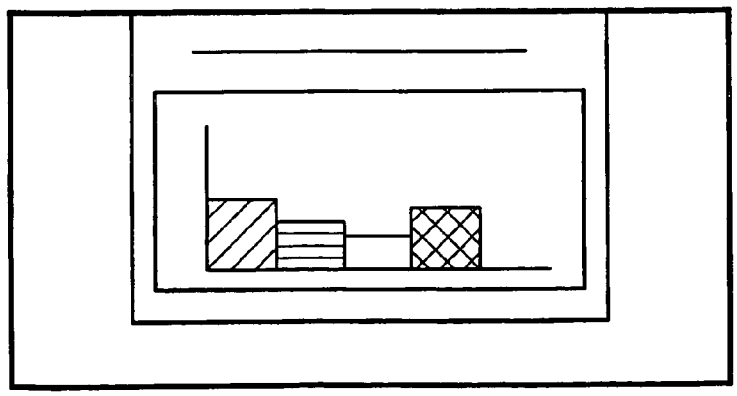

When the document P tilted clockwise is displayed on the LCD 51 as shown in FIG. 31(*a*), the user presses the counterclockwise rotation button 57*a* while checking the document P displayed on the LCD 51, by which the displayed document P rotates counterclockwise according to the number of times the counterclockwise rotation button 57*a* is pressed. At the point when the document P is judged to be facing frontward, the user stops operating the counterclockwise rotation button 57*a*.

Subsequently, the user continues pressing the scale-up button 57*h* in order to enlarge the graph part of the document P and at the point when the document P is in an appropriate size as shown in FIG. 31(*c*), the user stops operating the scale-up button 57*h*. Finally, the user presses the upward shift button 57*b* in order to place the enlarged graph part at the center of the image and at the point when the graph part is judged to be at the center of the image as shown in FIG. 31(*d*), the user stops operating the upward shift button 57*b*.

As above, with the image capturing device 1B of this embodiment, the plane image displayed on the LCD 51 can be edited by operating the operation button 57 in the editing process (S2107 in FIG. 24), by which the user can obtain an image exactly according to the user's intention. Further, with the image capturing device 1B of this embodiment, even when the document P is positioned off the center of the image due to erroneous recognition in the in-plane displacement/rotation recognition process (S2805 in FIG. 26), the user is allowed to correct the positioning.

Further, the user can obtain an image in which a flat document P is viewed from the front in the erect direction and only a part representing the document P has been extracted even when the user is shooting a curved document P from an oblique direction, by sliding the mode selection switch 59 to the "corrective imaging mode", setting the size input unit 56 to suit the size of the document P to be shot, and shooting the document P.

Furthermore, in this embodiment, the attitude of the document P is determined by analyzing limited parts of the image corresponding to the first and second slit beams 71 and 72, by which precise attitude detection of the document P can be performed with ease, without needing complicated image analysis. Therefore, the time necessary for the processor 40 of the image capturing device 1B to execute the image analysis process can be shortened, or the processor 40 can be implemented by a simple configuration.

Third Embodiment

In the following, an image capturing device 100 in accordance with a third embodiment of the present invention will be described. The image capturing device 100 of the third embodiment has a configuration equivalent to that of the image capturing device 1B of the second embodiment except for some characteristic parts which will be explained below. In the following explanation, the characteristic parts of the image capturing device 100 of the third embodiment in contrast with the image capturing device 1B of the second embodiment will be described one by one.

The image capturing device 1B of the second embodiment described above was configured to edit the plane image displayed on the LCD 51 according to the operations to the operation button 57 in the editing process (S2107) in FIG. 24. Instead of the operation button 57, the image capturing device 100 of the third embodiment is equipped with detection means which detects movement of the body case 10 in the three-dimensional space. The image capturing device 100 edits the plane image displayed on the LCD 51 in an editing process corresponding to the editing process (S2107) in FIG. 24, according to the movement detected by the detection means. Incidentally, components identical with those of the image capturing device 1B of the second embodiment will be indicated with the same reference characters in figures regarding the image capturing device 100 of the third embodiment which will be explained below, and repeated explanation of such components will be omitted.

FIG. 32 is a schematic diagram showing three-dimensional coordinates defined for the image capturing device 100 of the third embodiment. In this case where the body case 10 is placed with the release button 52 facing upward and the LCD 51 facing forward, three-dimensional coordinates, having the origin O at the internal center of the body case 10, the X-axis in the width direction of the image capturing device 100 (the rightward direction corresponds to positive X-coordinates), the Y-axis in the height direction of the device (the upward direction corresponds to positive Y-coordinates) and the Z-axis in the thickness direction of the device (the forward direction corresponds to positive Z-coordinates), are defined for the image capturing device 100.

FIG. 33 is a block diagram showing the electric configuration of the image capturing device 100 of the third embodiment. The image capturing device 100 of the third embodiment includes an origin sensor 61, an X-axis sensor 62, a Y-axis sensor 63 and a Z-axis sensor 64, instead of the operation button 57 of the image capturing device 1B of the second embodiment. These sensors are connected to the CPU 41 via signal lines.

Each sensor 61-64 is an acceleration sensor which outputs a signal indicating the level of acceleration by changing the duty ratio in a cycle of the waveform. The origin sensor 61 is a sensor for triaxial-direction measurement placed at the origin O of the coordinates, capable of detecting the acceleration in the X-axis direction, Y-axis direction and Z-axis direction. The X-axis sensor 62 is a sensor for monoaxial-direction measurement placed on the X-axis, capable of detecting the acceleration in the X-axis direction only. The Y-axis sensor 63 is a sensor for monoaxial-direction measurement placed on the Y-axis, capable of detecting the acceleration in the Y-axis direction only. The Z-axis sensor 64 is a sensor for monoaxial-direction measurement placed on the Z-axis, capable of detecting the acceleration in the Z-axis direction only.

The shift amount and rotation angle of the body case with respect to each coordinate are calculated based on each signal (representing acceleration) outputted by each sensor 61-64 and, although illustration and detailed explanation are omitted, a count of clock signals taken when each signal is outputted. In short, the shift amount and rotation angle are calculated by integrating acceleration.

Next, how to move and rotate the image capturing device 100 to edit the image displayed on the LCD 51 will be explained referring to FIGS. 34(*a*)-34(*f*) and 35. Each FIG. 34(*a*)-34(*f*) illustrates a case where a document P indicated by two-dot chain lines is edited as indicated by solid lines.

Figure 34:
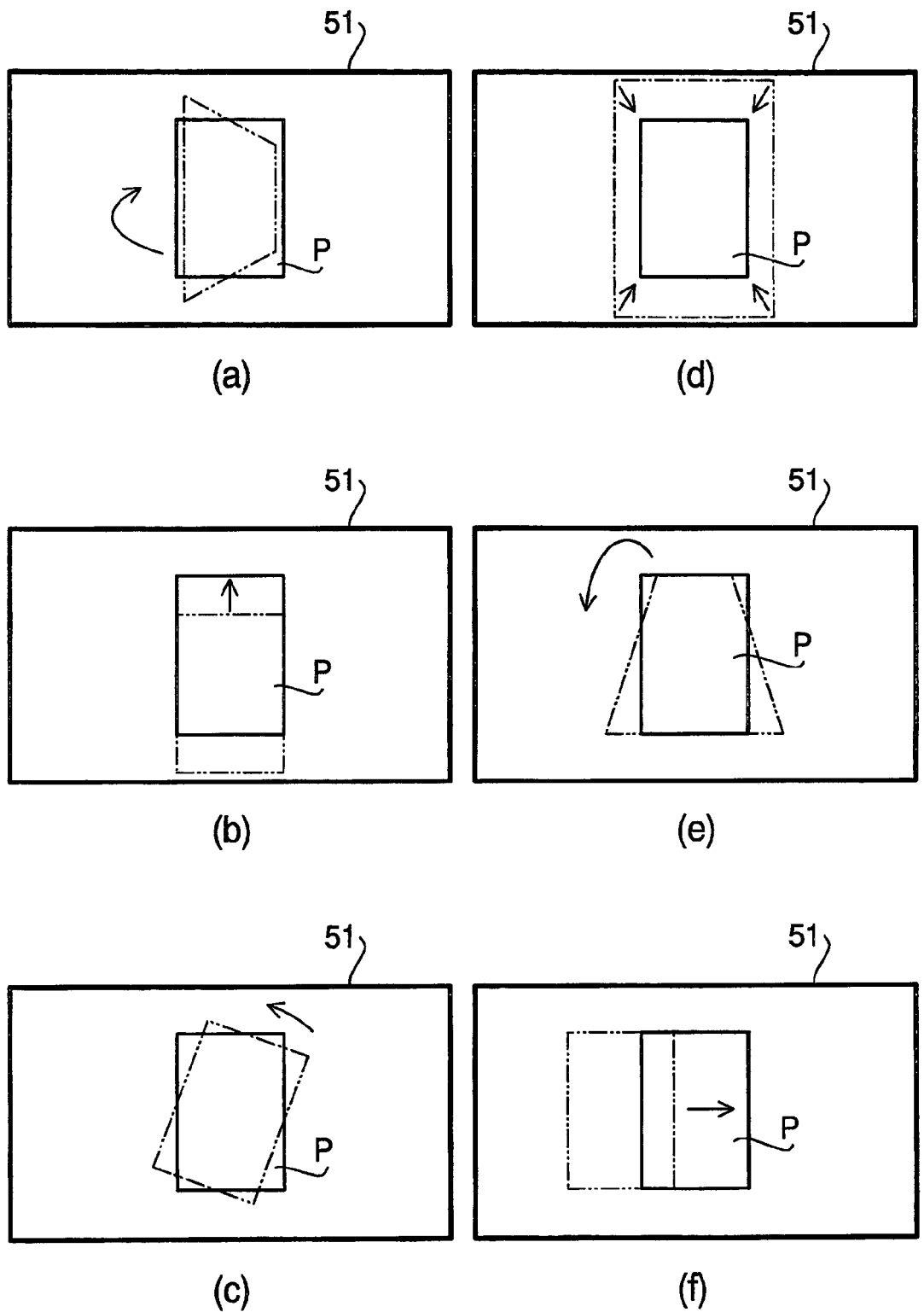

When the editing shown in FIG. 34(*a*) is necessary, the user rotates the image capturing device 100 clockwise around the Y-axis as indicated by an arrow (a) in FIG. 35 until the document P indicated by two-dot chain lines rotates to the position indicated by solid lines. On the other hand, when the image capturing device 100 is rotated counterclockwise around the Y-axis by a certain angle, the document P indicated by the two-dot chain lines rotates counterclockwise by the same angle.

When the editing shown in FIG. 34(b) is necessary, the user moves the image capturing device 100 in the Y(+) direction as indicated by an arrow (b) in FIG. 35 until the document P indicated by two-dot chain lines moves to the position indicated by solid lines. On the other hand, when the image capturing device 100 is moved in the Y(−) direction, the document P indicated by the two-dot chain lines moves downward on the LCD 51.

When the editing shown in FIG. 34(c) is necessary, the user rotates the image capturing device 100 counterclockwise around the Z-axis as indicated by an arrow (c) in FIG. 35 until the document P indicated by two-dot chain lines rotates to the position indicated by solid lines. On the other hand, when the image capturing device 100 is rotated clockwise around the Z-axis by a certain angle, the document P indicated by the two-dot chain lines rotates clockwise by the same angle.

When the editing shown in FIG. 34(d) is necessary, the user moves the image capturing device 100 in the Z(−) direction as indicated by an arrow (d) in FIG. 35 until the document P indicated by two-dot chain lines shrinks to the size indicated by solid lines. On the other hand, when the image capturing device 100 is moved in the Z(+) direction, the document P indicated by the two-dot chain lines expands.

When the editing shown in FIG. 34(e) is necessary, the user rotates the image capturing device 100 around the X-axis toward this side as indicated by an arrow (e) in FIG. 35 until the document P indicated by two-dot chain lines rotates moves to the position indicated by solid lines. On the other hand, when the image capturing device 100 is rotated around the X-axis toward the other side, the document P indicated by the two-dot chain lines rotates toward the other side.

When the editing shown in FIG. 34(f) is necessary, the user moves the image capturing device 100 in the X(+) direction as indicated by an arrow (f) in FIG. 35 until the document P indicated by two-dot chain lines moves to the position indicated by solid lines. On the other hand, when the image capturing device 100 is moved in the X(−) direction, the document P indicated by the two-dot chain lines moves leftward on the LCD 51.

FIG. 36 is a flow chart showing an editing process corresponding to the editing process (S2107) in FIG. 24. At the start of this process, whether there has been an output from the origin sensor 61 or not is judged (S2291). While the operation status of each button 57a-57h is temporarily stored in the working area 438 in S2106 of FIG. 24 in the second embodiment, the moving status of the body case (instead of the operation status of each button 57a-57h) is temporarily stored in the working area 438 in the third embodiment. Whether the moving status of the body case has been stored in the working area 438 or not is judged in this step.

If there has been the origin output (S2291: YES), the shift amount and the magnification of the image capturing device 100 are determined based on the output from the origin sensor (S2292). The existence of an output from the origin sensor 61 means that the image capturing device 100 has moved at least in one of the X, Y and Z directions (meaning no rotation). In this case where there is an output from the origin sensor 61, the outputs of other sensors 62-64 are reserved (not used) since the origin sensor 61 is capable of detecting acceleration in each of the X, Y and Z directions.

Subsequently, the plane image stored in the rectangular area extraction resultant image storage unit 437 is shifted by the determined shift amount or set in the determined magnification, by which the edited image is generated (S2293). Thereafter, this process is ended.

On the other hand, if there has been no output from the origin sensor 61(S2291: NO), that is, if the image capturing device 100 has been rotated, whether there has been an output from the X-axis sensor 62 or not is judged (S2294). If there has been an output from the X-axis sensor 62 (S2294: YES), the shift amount in the X direction is determined based on the output from the X-axis sensor 62 (S2295). Thereafter, the process advances to S2296. The process advances to S2296 also when there has been no output from the X-axis sensor 62 (S2294: NO).

In S2296, whether there has been an output from the Y-axis sensor 63 or not is judged. If there has been an output from the Y-axis sensor 63 (S2296: YES), the shift amount in the Y direction is determined based on the output from the Y-axis sensor 63 (S2297). Thereafter, the process advances to S2298. The process advances to S2298 also when there has been no output from the Y-axis sensor 63 (S2296: NO).

In S2298, whether there has been an output from the Z-axis sensor 64 or not is judged. If there has been an output from the Z-axis sensor 64 (S2298: YES), the shift amount in the Z direction is determined based on the output from the Z-axis sensor 64 (S2299).

Subsequently, the rotation angle is determined based on the shift amounts in the X, Y and Z directions determined in the steps S2295, S2297 and S2299 (S2300).

For example, when the image capturing device 100 is rotated as indicated by the arrow (a) in FIG. 35, there is no output from the origin sensor 61 and the Y-axis sensor 63, while the acceleration in the X-axis direction is detected by the X-axis sensor 62 and the acceleration in the Z-axis direction is detected by the Z-axis sensor 64. The shift amounts in the X-axis direction and the Z-axis direction are determined based on the outputs from the X-axis sensor 62 and the Z-axis sensor 64, respectively. Based on the shift amounts in the X-axis direction and the Z-axis direction, the rotation angle around the Y-axis is determined. Also when the image capturing device 100 is rotated around the X-axis or the Z-axis, the rotation angle around the X-axis or the Y-axis is determined by a similar process.

After the rotation angle is determined as above in S2300, the image stored in the rectangular area extraction resultant image storage unit 437 is rotated by the determined rotation angle, by which the edited image is generated (S2301). Thereafter, the process of FIG. 36 is ended.

Meanwhile, if there has been no output from the Z-axis sensor 64 (S2298: NO), that is, if there has been no output from any sensor 61-64, whether the editing parameter selection button 65 has been pressed or not is judged similarly to the steps S3064-S3066 (S2302). If the editing parameter selection button 65 has been pressed (S2302: YES), the plane image displayed on the LCD 51 is shifted, rotated or set in a particular magnification according to the latest editing parameter stored in the editing parameter storage unit 439, by which the edited image is generated (S2303). After the edited image is generated, the latest editing parameter is changed into the one-step previous editing parameter (S2304). Thereafter, the process of FIG. 36 is ended.

As above, with the image capturing device 100 of the second embodiment, the user can edit the image displayed on the LCD 51 by moving or rotating the image capturing device 100. The image is edited according to the movement of the image capturing device 100, by which even users who are unused to button operations, etc. are also allowed to generate edited images in an intuitive manner. Further, the image capturing device 100 needs no operation button 57 on the outer surface of the body case 10 differently from the image capturing device 1B of the second embodiment, by which the need of reserving a space for the operation button 57 is eliminated and design constraints are relaxed.

In the second and third embodiments which have been described above, the document attitude calculation process (S2803) in the flow chart of FIG. 26 corresponds to "three-dimensional shape calculation means". The plane conversion process (S2804) in the flow chart of FIG. 26 corresponds to "plane conversion means". The editing process (S2807) in FIG. 24 corresponds to "first modification means". The step S1065 in FIG. 29 corresponds to "selection means". The step S2805 in FIG. 26 corresponds to "in-plane position detection means". The step S2806 in FIG. 26 corresponds to "second modification means". The step S2805 in FIG. 26 corresponds also to "in-plane angle detection means".

While the present invention has been illustrated above with reference to the second and third embodiments, in can easily be inferred that the present invention is not to be restricted by the above second and third embodiments and various improvements and modifications are possible without departing from the scope and spirit of the present invention.

For example, while the image edited by the editing process (S2107 in FIG. 24) in the above embodiments is the image obtained by the rectangular area extraction process (S2806 in FIG. 26) by the extraction of the document P area, it is also possible to let the editing process (S2107 in FIG. 24) edit the image obtained by the plane conversion of the plane conversion process (S2804 in FIG. 26). In this case, the in-plane displacement/rotation recognition process (S2805 in FIG. 26) and the rectangular area extraction process (S2806 in FIG. 26) can be left out and the processing load for the processes can be lightened.

While the operation button 57 of the image capturing device 1B of the second embodiment includes the two buttons (the counterclockwise rotation button 57a and the clockwise rotation button 57c) as buttons for inputting directions of rotation of the document P, such buttons for inputting rotation directions of the document P are not restricted to the two buttons; the operation button 57 may also be provided with a button for rotating the document P around the Y-axis and a button for rotating the document P around the X-axis. In this case, an edited image exactly according to the user's intention can be generated with the increased number of available editing patterns.

While the image capturing device 100 of the third embodiment is configured to move/rotate the document P in the same direction as the movement/rotation of the body case 10, the image capturing device may also be configured to move/rotate the document P in the direction opposite to the movement/rotation of the body case 10.

While two slit beams (the first and second slit beams 71 and 72) are outputted by the slit beam projection unit 20 in the image capturing devices of the above embodiments, the image capturing device may also be configured to output three or more slit beams.

For example, the slit beam projection unit 20 may be configured so that a third slit beam (in addition to the first and second slit beams 71 and 72) similar to the second slit beam 72 will be projected onto a part of the document P above the second slit beam 72 as depicted in FIG. 25(b) showing a locus image of the slit beams projected onto the document P. In this case, a curved shape of the document P in its lengthwise direction can also be estimated based on the positions of points on the loci of the first through third slit beams, by which an image still easier to see can be obtained by the correction of the slit-beamless image.

While the laser diode 21 emitting a red laser beam is used as the light source in the above embodiments, various types of devices capable of outputting an optical beam (plane emission laser, LED, EL device, etc.) can be employed as the light source.

The transparent flat plate 24 may be replaced with a transparent flat plate having a surface provided with a diffraction grating diffracting a prescribed ratio of the power of the incident laser beam in a particular direction. In this case, a 0th order laser beam passing through the transparent flat plate and a 1st order laser beam diffracted by the diffraction grating can be used as the first and second slit beams 71 and 72, respectively. The shape of pattern light outputted by the slit beam projection unit 20 is not restricted to a thin line extremely narrowed in a direction orthogonal to its longitudinal direction. Various types of pattern light, such as a stripe-like beam pattern having a certain width, can be used.

The positional relationship between the first and second slit beams 71 and 72 may also be inverted, that is, the optical elements in the slit beam projection unit may be arranged so that the second slit beam 72 will be formed in the first direction (below the first slit beam 71 when viewed from the image capturing device 1B) and the first slit will be formed in the second direction.

While the image capturing device is configured to capture the slit-beamed image and the slit-beamless image by use of the imaging lens 31 and the CCD image sensor 32, the image capturing device may be provided with extra imaging lens and CCD image sensor for capturing the slit-beamed image in addition to the imaging lens 31 and the CCD image sensor 32. With such a configuration, the time lag between the capturing of the slit-beamed image and the capturing of the slit-beamless image (time for the transfer of image data from the CCD image sensor 32, etc.) can be eliminated. Consequently, deviation in the imaging range of the slit-beamless image from that of the slit-beamed image can be eliminated and the three-dimensional shape of the subject can be detected more precisely. However, compared to this example, the image capturing devices of the above embodiments are capable of realizing a reduced size, price, and number of components.

In an embodiment of the present invention, the input means may include an operation unit allowing the inputting of at least one of movement and magnification for the plane image displayed on the display means as the display status modification parameter.

With the above configuration in which the input means includes the operation unit which allows the inputting of at least one of movement and magnification for the plane image as the display status modification parameter, the user is allowed to input the display status modification parameter with a simple and easy operation of handling the operation unit.

In an embodiment of the present invention, the input means may include detection means which detects movement of a body of the image capturing device in three-dimensional space as the display status modification parameter. In this case, the first modification means modifies the display status of the plane image by associating the movement of the body of the image capturing device in the three-dimensional space detected by the detection means with at least one of movement and magnification for the plane image displayed on the display means.

With the above configuration in which the input means includes the detection means which detects the movement of the body of the image capturing device in the three-dimensional space as the display status modification parameter, the user is allowed to input the display status modification parameter with a simple and easy operation of moving the body of the image capturing device in the three-dimensional space.

While a space for providing the operation unit has to be reserved on the outer surface of the body of the image capturing device (a constraining factor on the design) in the case where the input means is implemented by the operation unit, such a design constraint can be eliminated by implementing the input means by the detection means since the detection means can be installed inside the body of the image capturing device.

In an embodiment of the present invention, the plane conversion means may be configured to convert the plane image into an image having a lower resolution than the captured image.

With the above configuration in which the plane conversion means converts the plane image into an image having a lower resolution than the captured image, the number of pixels of the plane image can be reduced and the number of calculations necessary for the conversion by the plane conversion means and processes using the plane image can be reduced.

In an embodiment of the present invention, the image capturing means may further comprise storage means which stores an image modified by the first modification means. The image is stored in the storage means in a higher resolution than the plane image.

With the above configuration, the image modified by the first modification means is stored in the storage means in a higher resolution than the plane image. Therefore, in the outputting of the image modified by the first modification means, the image can be outputted as a sharp and clear image.

In an embodiment of the present invention, the image capturing device may further comprise: display status modification parameter storage means which stores the display status modification parameter used for modifying the display status of the plane image displayed on the display means; and selection means for selecting a display status parameter to be used for modifying the display status of a different plane image displayed on the display means from the display status modification parameters stored in the display status modification parameter storage means. The first modification means modifies the display status of the different plane image displayed on the display means based on the display status modification parameter selected through the selection means.

With the above configuration, when the user hopes to change the display status of the plane image being displayed on the display means in the same way as a previous plane image that was modified before, the user selects a display status parameter (stored in the display status storage means) that was used for the modification of the previous plane image by use of the selection means, by which the display status of the plane image displayed on the display means can be modified based on the selected display status parameter. In the case where the user hopes to change the display status of the plane image displayed on the display means to a display status similar to a previous plane image that was modified before, the user does not need to input the same display status modification parameter through the selection means, by which improved operability is realized.

In an embodiment of the present invention, the image capturing device may further comprise: in-plane position detection means which recognizes a subject area representing the subject from the plane image and determines a position of the subject in the plane image before the plane image is displayed on the display means; and second modification means which modifies the plane image into an image in which the subject viewed from a prescribed direction is placed substantially at the center of the image based on the position determined by the in-plane position detection means and the shape information. In this case, the plane image displayed on the display means is the image modified by the second modification means.

With the above configuration, an editing process for placing the subject substantially at the center of the plane image can be left out since the plane image displayed on the display means is the image in which the subject viewed from a prescribed direction is placed substantially at the center of the image. Since many of the users generally intend to place the subject substantially at the center of the plane image, general versatility of the device can be increased by the automatic generation of such an image intended by many users.

In an embodiment of the present invention, the image capturing device may further comprise in-plane angle detection means which recognizes a subject area representing the subject from the plane image and determines an angle of a prescribed side of the subject area with respect to a prescribed direction in the plane image before the plane image is displayed on the display means. The second modification means modifies the plane image into an image in which the subject viewed from a prescribed direction is placed substantially at the center and a prescribed side of the subject is oriented in a prescribed direction in the image based on the angle determined by the in-plane angle detection means, the position determined by the in-plane position detection means and the shape information.

With the above configuration, the plane image displayed on the display means is the image in which the subject viewed from a prescribed direction is placed substantially at the center and a prescribed side of the subject is oriented in a prescribed direction in the image. Therefore, the aforementioned effect of increasing the general versatility of the device can be enhanced further.

What is claimed is:

1. An image processing device comprising:
    a plane conversion unit which receives a subject image in which a subject having a particular shape has been captured and shape information about three-dimensional shape of the subject and converts the subject image into a plane image in which the subject is viewed from a prescribed direction based on the shape information;
    an in-plane position detection unit which recognizes a subject area in the plane image as an area representing the subject and determines a position of the subject in the plane image;
    a first correction conversion unit which converts the subject image into a corrected image in which the subject is viewed from a prescribed direction and placed substantially at the center based on the shape information and the position of the subject determined by the in-plane position detection unit; and
    an in-plane angle detection unit which recognizes the subject area in the plane image and determines an angle of a prescribed side of the subject area with respect to a prescribed direction in the plane image,
    wherein the first correction conversion unit converts the subject image into a corrected image in which the subject is viewed from a prescribed direction and placed substantially at the center and a prescribed side of the subject is oriented in a prescribed direction in the image based on the shape information, the position of the subject determined by the in-plane position detection unit, and the angle determined by the in-plane angle detection unit.

2. The image processing device according to claim 1, wherein the first correction conversion unit executes the conversion into the corrected image only for an area in the subject image that represents the subject.

3. The image processing device according to claim 1, wherein:
the subject image is a multicolor image, and
the first correction conversion unit makes the conversion into the corrected image that has the same number of colors as pixels of the subject image.

4. The image processing device according to claim 1, further comprising an image extraction unit which extracts an image by cutting out a part of the corrected image representing the subject in a prescribed shape.

5. An image processing device comprising:
a plane conversion unit which receives a subject image in which a subject having a particular shape has been captured and shape information about three-dimensional shape of the subject and converts the subject image into a plane image in which the subject is viewed from a prescribed direction based on the shape information;
an in-plane angle detection unit which recognizes a subject area in the plane image as an area representing the subject and determines an angle between a prescribed side of the subject area and a prescribed direction in the plane image; and
a second correction conversion unit which converts the subject image into a corrected image in which the subject is viewed from a prescribed direction and a prescribed side of the subject is oriented in a prescribed direction in the image based on the shape information and the angle determined by the in-plane angle detection unit.

6. The image processing device according to claim 5, wherein the second correction conversion unit executes the conversion into the corrected image only for an area in the subject image that represents the subject.

7. The image processing device according to claim 5, wherein:
the subject image is a multicolor image, and
the second correction conversion unit makes the conversion into the corrected image that has the same number of colors as pixels of the subject image.

8. The image processing device according to claim 5, further comprising an image extraction unit which extracts an image by cutting out a part of the corrected image representing the subject in a prescribed shape.

9. The image processing device according to claim 1, further comprising a range input unit that inputs a range specifying an area in the subject image to be converted by the plane conversion unit, wherein:
the plane conversion unit converts the area in the subject image specified by the range inputted via the range input unit into the plane image.

10. The image processing device according to claim 1, wherein the subject is in a rectangular shape when its particular surface is viewed from an orthogonal direction.

11. The image processing device according to claim 1, wherein the plane conversion unit makes the conversion into the plane image that has a lower resolution than the subject image.

12. The image processing device according to claim 1, wherein:
the subject image is a multicolor image, and
the plane conversion unit makes the conversion into the plane image that is made of monochrome pixels.

13. An image capturing device comprising:
an image processing device, the image processing device including:
a plane conversion unit which receives a subject image in which a subject having a particular shape has been captured and shape information about three-dimensional shape of the subject and converts the subject image into a plane image in which the subject is viewed from a prescribed direction based on the shape information, and
an in-plane position detection unit which recognizes a subject area in the plane image as an area representing the subject and determines a position of the subject in the plane image;
a projector which projects pattern light;
an image capturing unit which obtains the subject image by shooting the subject; and
a three-dimensional shape detection unit which figures out shape information about three-dimensional shape of the subject based on an image obtained by letting the image capturing unit shoot the subject on which the pattern light is projected, wherein:
the subject image obtained by the image capturing unit and the shape information figured out by the three-dimensional shape detection unit are inputted to the image processing device.

14. An image capturing device comprising:
an image processing device, the image Processing device including:
a plane conversion unit which receives a subject image in which a subject having a particular shape has been captured and shape information about three-dimensional shape of the subject and converts the subject image into a plane image in which the subject is viewed from a prescribed direction based on the shape information,
an in-plane position detection unit which recognizes a subject area in the plane image as an area representing the subject and determines a position of the subject in the plane image, and
a first correction conversion unit which converts the subject image into a corrected image in which the subject is viewed from a prescribed direction and placed substantially at the center based on the shape information and the position of the subject determined by the in-plane position detection unit;
a projector which projects pattern light;
an image capturing unit which obtains the subject image by shooting the subject and inputs the subject image to the image processing device;
a three-dimensional shape detection unit which figures out shape information about three-dimensional shape of the subject based on an image obtained by letting the image capturing unit shoot the subject on which the pattern light is projected and inputs the shape information to the image processing device;
a display unit which displays the corrected image obtained by the first correction conversion unit;
an input unit that inputs a display status modification parameter for modifying display status of the corrected image displayed on the display unit; and
a modification unit which modifies the display status of the corrected image displayed on the display unit based on the display status modification parameter inputted through the input unit.

15. An image capturing device comprising:
the image processing device according to claim 5;
a projector which projects pattern light;

an image capturing unit which obtains the subject image by shooting the subject and inputs the subject image to the image processing device;

a three-dimensional shape detection unit which figures out shape information about three-dimensional shape of the subject based on an image obtained by letting the image capturing unit shoot the subject on which the pattern light is projected and inputs the shape information to the image processing device;

a display unit which displays the corrected image obtained by the second correction conversion unit;

an input unit that inputs a display status modification parameter for modifying display status of the corrected image displayed on the display unit; and a modification unit which modifies the display status of the corrected image displayed on the display unit based on the display status modification parameter inputted through the input unit.

16. An image capturing device comprising:

a projector which projects pattern light;

an image capturing unit which obtains a captured image of a subject by shooting the subject;

a three-dimensional shape calculation unit which figures out shape information about three-dimensional shape of the subject based on an image obtained by letting the image capturing unit shoot the subject on which the pattern light is projected;

a plane conversion unit which converts the captured image of the subject into a plane image in which the subject is viewed from a prescribed direction based on the shape information figured out by the three-dimensional shape calculation unit;

a display unit which displays the plane image converted by the plane conversion unit;

an input unit that inputs a display status modification parameter for modifying display status of the plane image displayed on the display unit; and a first modification unit which modifies the display status of the plane image displayed on the display unit based on the display status modification parameter inputted through the input unit.

17. The image capturing device according to claim 16, wherein the input unit includes an operation unit allowing the inputting of at least one of movement and magnification for the plane image displayed on the display unit as the display status modification parameter.

18. The image capturing device according to claim 16, wherein:

the input unit includes a detector which detects movement of a body of the image capturing device in three-dimensional space as the display status modification parameter, and the first modification unit modifies the display status of the plane image by associating the movement of the body of the image capturing device in the three-dimensional space detected by the detector with at least one of movement and magnification for the plane image displayed on the display unit.

19. The image capturing device according to claim 16, wherein the plane conversion unit converts the plane image into an image having a lower resolution than the captured image.

20. The image capturing device according to claim 16, further comprising a storage unit which stores an image modified by the first modification unit, wherein:

the image is stored in the storage unit in a higher resolution than the plane image.

21. The image capturing device according to claim 16, further comprising:

a display status modification parameter storage unit which stores the display status modification parameter used for modifying the display status of the plane image displayed on the display unit; and a selection unit that selects a display status parameter to be used for modifying the display status of a different plane image displayed on the display unit from the display status modification parameters stored in the display status modification parameter storage unit, wherein:

the first modification unit modifies the display status of the different plane image displayed on the display unit based on the display status modification parameter selected through the selection unit.

22. The image capturing device according to claim 16, further comprising:

an in-plane position detection unit which recognizes a subject area representing the subject from the plane image and determines a position of the subject in the plane image before the plane image is displayed on the display unit; and a second modification unit which modifies the plane image into an image in which the subject viewed from a prescribed direction is placed substantially at the center of the image based on the position determined by the in-plane position detection unit and the shape information, wherein:

the plane image displayed on the display unit is the image modified by the second modification unit.

23. The image capturing device according to claim 22, further comprising an in-plane angle detection unit which recognizes a subject area representing the subject from the plane image and determines an angle of a prescribed side of the subject area with respect to a prescribed direction in the plane image before the plane image is displayed on the display unit, wherein:

the second modification unit modifies the plane image into an image in which the subject viewed from a prescribed direction is placed substantially at the center and a prescribed side of the subject is oriented in a prescribed direction in the image based on the angle determined by the in-plane angle detection unit, the position determined by the in-plane position detection unit and the shape information.

* * * * *